(12) United States Patent
Gupta et al.

(10) Patent No.: US 11,820,534 B2
(45) Date of Patent: Nov. 21, 2023

(54) BAGGAGE WEIGHT PREDICTION

(71) Applicant: ACCENTURE GLOBAL SOLUTIONS LIMITED, Dublin (IE)

(72) Inventors: Anshul Gupta, Ghaziabad (IN); Meeta Lal Budhrani, Bangalore (IN); Akshay Tutika, Hyderabad (IN); Vipin Anilkumar Bhasin, Pune (IN); Bolaka Mukherjee, Howrah (IN); Ankur Garg, Meerut (IN); Pallav Chourey, Pune (IN); Richa Sahrawat Malik, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 792 days.

(21) Appl. No.: 16/934,941

(22) Filed: Jul. 21, 2020

(65) Prior Publication Data
US 2021/0380278 A1 Dec. 9, 2021

(30) Foreign Application Priority Data
Jun. 9, 2020 (IN) .............................. 202011024178

(51) Int. Cl.
*B64F 1/36* (2017.01)
*G01G 19/414* (2006.01)
*B64D 9/00* (2006.01)
(52) U.S. Cl.
CPC ................ *B64F 1/368* (2013.01); *B64D 9/00* (2013.01); *G01G 19/414* (2013.01)

(58) Field of Classification Search
CPC .......... B64F 1/368; B64D 9/00; G01G 19/414
See application file for complete search history.

(56) References Cited

U.S. PATENT DOCUMENTS 6,923,375 B2 * 8/2005 Stefani ............... G01G 23/3735
235/487
2004/0226996 A1 * 11/2004 Stefani ................... G01G 19/44
235/384
(Continued)

FOREIGN PATENT DOCUMENTS

WO 2015050929 4/2015
WO 2020067433 4/2020

*Primary Examiner* — Kyle O Logan
(74) *Attorney, Agent, or Firm* — Mannava & Kang, P.C.

(57) ABSTRACT

Examples for the baggage weight prediction system are provided. The system may create a baggage prediction model in response to a carrier baggage weight prediction requirement requesting a total baggage weight to be carried in a future transportation operation by a carrier. The baggage prediction model may be used to determine a predicted baggage to be carried by a plurality of future passengers associated with a future transportation operation. The system may determine a predicted weight for the predicted baggage. The system may sort the predicted baggage into checked baggage and a carry-on baggage. The system may determine a carry-on baggage weight associated with the carry-on baggage based on the baggage prediction model. The system may determine a baggage weight ratio associated with the predicted baggage. The system may generate a baggage prediction result for performing a baggage management action.

20 Claims, 30 Drawing Sheets

(56) References Cited

U.S. PATENT DOCUMENTS

| | | | | |
|---|---|---|---|---|
| 2009/0192756 | A1* | 7/2009 | Bodin | G01G 19/12 |
| | | | | 702/129 |
| 2009/0276267 | A1* | 11/2009 | Padan | G06Q 50/30 |
| | | | | 705/5 |
| 2013/0211864 | A1* | 8/2013 | Sanderson | B65G 43/08 |
| | | | | 705/5 |
| 2017/0315014 | A1* | 11/2017 | Regan | B64D 45/00 |
| 2018/0016027 | A1* | 1/2018 | Cheatham, III | B64U 10/25 |
| 2020/0023811 | A1 | 1/2020 | Herman et al. | |
| 2021/0319455 | A1* | 10/2021 | Nance | G06Q 30/018 |
| 2021/0354851 | A1* | 11/2021 | Kim | B64F 1/36 |
| 2022/0339672 | A1* | 10/2022 | Pfeifer | B07C 3/08 |

* cited by examiner

BAGGAGE WEIGHT PREDICTION

PRIORITY

The present application claims priority under 35 U.S.C. 119(a)-(d) to Indian patent application number 202011024178, having a filing date of Jun. 9, 2020, the disclosure of which is hereby incorporated by reference in its entirety.

BACKGROUND

The importance of ancillary revenue generation operations has been increasing across the transportation industry such as the aviation sector. The ancillary revenue operations such as baggage fees, on-board food, various allied services, and the like may contribute significantly towards boosting the ancillary revenue pipeline for an airline. Additionally, requirements, such as, for example, continuous fluctuation in fuel prices and stringent norms on carbon footprint create a demand for fuel optimization, thereby further adding to the importance of optimizing ancillary revenue operations such as baggage fees for optimal aviation operations. Specifically, there has been a tremendous increase in cases where congestion of a carry-on baggage space have been reported, resulting in negative passenger experience and sub-optimal aircraft space management. In most of the aforementioned cases of the carry-on baggage space congestion, the checked-in luggage compartment space of an air carrier may be sub-optimally utilized due to lack of prior information on weight and volume of cabin luggage.

Presently, various organizations have been deploying various tools for analyzing baggage weight for a flight. These tools may rely on input from industry norms such as maximum baggage allowances. Additionally, these tools may not provide insights into how to predict the potential weight of baggage that may be carried by a passenger for a future transportation operation so that optimal strategic decisions may be made for effective baggage management operations. Furthermore, the tools may only calculate a flat average weight per bag as per standard industry allowance, which may result in sub-optimal efficiency and reduce the effectiveness of baggage management decisions based thereon.

There is a requirement for a system that may predict in advance the potential weight of baggage expected to be on a flight based on the identification of various factors other than cabin class-based allowances while decreasing uncertainty in predicted outcomes. Furthermore, there is a requirement for a system for determination of a correlation between a checked baggage and a carry-on baggage as carried by various types of passengers for efficient aircraft space management.

Accordingly, a technical problem with the currently available systems for air carrier baggage management operations is that they may be inefficient, and inaccurate. There is a need for a system that may account for the various factors mentioned above, amongst others, to efficiently and accurately predict potential baggage weight.

DETAILED DESCRIPTION

Figure 1:
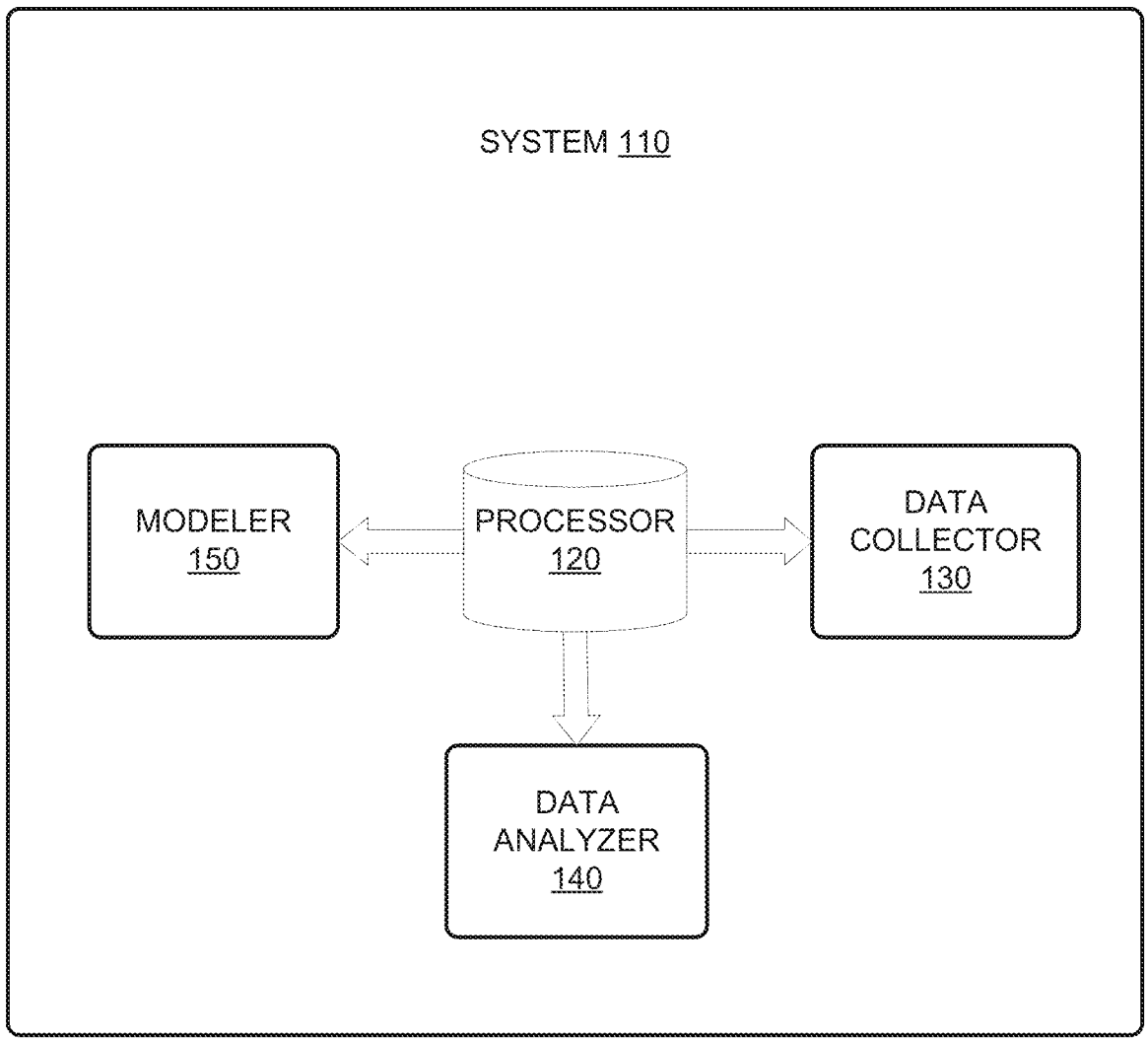
FIG. 1 illustrates a diagram for a baggage weight prediction system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for weight prediction for baggage carried by a passenger while traveling through an air carrier including a baggage weight prediction system (BWPS). The BWPS (referred to as "system" hereinafter) may be used for an automated assessment of various baggage pieces for facilitating carrier space management operations by categorizing baggage into categories, such as checked-in baggage and carry-on baggage and predicting respective potential baggage weights for a future transportation operation. The system may deploy automated tools for predicting potential baggage weight for a future transportation operation based on the influencing factors for that day, time, weather, and the like thereby increasing trustworthiness and decreasing uncertainty in predicted outcomes. Optimum baggage management may provide for maximizing ancillary revenue generation for an organization. Additionally, the baggage management facilitated by present system enhances a passenger experience by predicting various baggage requirements associated with a passenger. Furthermore, the system may assist with fuel optimization, for example, the system may help improve a load function and a trim function of a carrier, such as an aircraft. The system may also assist being better prepared for a crisis situation, such as a situation arising due to excess baggage in one of compartments of the carrier.

The system may include a processor, a data collector, a data analyzer, and a modeler. The processor may be coupled to the modeler. The modeler may receive a carrier baggage weight prediction requirement requesting a total baggage weight to be carried in a future transportation operation by a carrier, such as, for example, an aircraft, a train, or a ship. The modeler may create a baggage prediction model associated with each of a plurality of future passengers associated with the future transportation operation, based on a baggage pattern, the baggage prediction model comprising a number of items in a predicted baggage and a predicted weight for each of the items in the predicted baggage. Furthermore, the number of items in the predicted baggage may be sorted into a checked baggage and a carry-on baggage, based on the predicted weight. Based on the baggage prediction model, a carry-on baggage weight associated with the carry-on baggage may be determined.

The modeler may determine a checked baggage weight from a plurality of data sources. A baggage weight ratio associated with the predicted baggage may be based on the baggage prediction model, the baggage weight ratio being a quantitative relation between the checked baggage weight and the carry-on baggage weight. Further, a baggage prediction result comprising the baggage prediction model, the carry-on baggage weight, and the baggage weight ratio associated with each of the plurality of future passengers may be generated. Based on the baggage prediction result corresponding to each of the plurality of future passengers, a cumulative carry-on baggage weight and the baggage weight ratio for the future transportation operation may be determined. A baggage management action may be performed in the carrier associated with the future transportation operation, based on the cumulative carry-on baggage weight and the baggage weight ratio.

The system may further include a data collector and a data analyzer coupled to the processor. The data collector may implement an artificial intelligence component to generate the baggage pattern. The data analyzer may determine a baggage dimension index associated with the baggage from the baggage database. The data analyzer may determine a baggage weight index associated with the baggage from the baggage database.

The embodiments for the carrier baggage weight prediction requirement presented herein are exemplary in nature and should be treated as such. For the sake of brevity and technical clarity, the description of a baggage weight prediction system may be restricted to a few exemplary embodiments; however, to a person of ordinary skill in the art, it should be clear that the system may be used for the fulfillment of various carrier baggage weight prediction requirements other than those mentioned hereinafter.

Accordingly, the present disclosure aims to provide a baggage weight prediction system that may account for the various factors mentioned above, amongst others, for adaptively clustering passengers for developing an analytics-centric approach for gathering various baggage insights and facilitating baggage weight prediction for future passengers associated with a future transportation operation. Additionally, the present disclosure may provide a system for determining a correlation between the checked baggage and the carry-on baggage for a future transportation operation. Furthermore, the present disclosure may categorically analyze various parameters to transform the ancillary revenue generation operations of transportation organizations to an outcome-based and insight-driven function in an efficient manner.

FIG. 1 illustrates a system 110 for baggage weight prediction (referred to as system 110 hereinafter), according to an example implementation of the present disclosure. In an example, the system 110 may include a processor 120. The processor 120 may be coupled to a modeler 150. In accordance with various embodiments of the present disclosure, the system 110 may include a data collector 130, a data analyzer 140. The data collector 130, the data analyzer 140 may be coupled to the processor 120.

The modeler 150 may receive a carrier baggage weight prediction requirement requesting a total baggage weight to be carried in a future transportation operation by a carrier. In an example, the carrier baggage weight prediction requirement may be associated with at least one of a process, an organization, and an industry-relevant for air-carrier operations. In an example, the carrier baggage weight prediction requirement may be associated with at least one of a process, an organization, and an industry-relevant for a train-carrier operation. In an example, carrier baggage weight prediction requirement may be associated with at least one of a process, an organization, and an industry-relevant for water ship-carrier operations.

For the purpose of this disclosure, the term "carrier" may include any organization associated with transporting passengers and cargo by any means of transport. For the purpose of this disclosure, the term "future transportation operation" may refer to a carrier operation likely to take place at a future time. The carrier baggage weight prediction requirement may include segregating baggage into a carry-on baggage and a checked-baggage. In accordance with various embodiments of the present disclosure, the carrier baggage weight prediction requirement may be associated with visual object recognition and measurement using various depth cameras. The embodiments for the carrier baggage weight prediction requirement presented herein may be exemplary in nature and a person skilled in the art must understand that the carrier baggage weight prediction requirement may include any operation related to assessment and evaluation baggage carried by a carrier such as an airplane, a train, and a ship.

The data collector 130 may implement an artificial intelligence component to identify a plurality of passenger attributes associated with each of a plurality of passengers associated with a previous transportation operation of the carrier. The artificial intelligence component may include the implementation of various Computer Vision (CV) techniques and Machine Learning (ML) techniques for processing data associated with the plurality of passengers. In an example embodiment, the CV techniques may include technologies such as object detection and tracking, depth image processing, and the like. In an example embodiment, the ML techniques may include an ensemble on different regression models using weighted average methods, an ensemble on various classification models using a voting classifier (explained by way of the description for the FIGS. 9A and 9B). However, other CV and ML techniques may be deployed by the system 110 without diverting from the scope of the disclosure and the same should be clear to a person skilled in the art. The data processing may be continuous process and may enrich the data associated with the plurality of passengers. The plurality of passengers may be the passengers traveling through a carrier such as an air-carrier, a train, or a ship.

In accordance with various embodiments of the present disclosure, data associated with the plurality of passengers may include any type of data associated with the carrier baggage weight prediction requirement. The data collector 130 may obtain the data associated with the plurality of passengers from one or more data sources. The data sources may include various internal databases maintained by an organization, various external databases such as for example, databases maintained by International Air Transport Association (IATA) for airport geographical codes, and the like. In accordance with various embodiments of the present disclosure, the data associated with the plurality of passengers may include various details associated with various carrier operations such as carrier details, passenger details, carrier baggage policy, carrier station geographical codes, and the like. In an example, the data collector 130 may obtain the data associated with the plurality of passengers on a near real-time basis.

The plurality of passenger attributes may include various measurable factors associated with a passenger such as passenger name, age, gender, booking reference number, seat number, the purpose of travel such as work or leisure, travel duration, arrival and departure time, passenger type code, origin and destination station codes, frequent traveler information, day of travel, travel class, travel time, travel data, passenger electronic email address, and the like (more exemplary attributes mentioned by way of subsequent Figs). The data collector 130 may implement, for example, a passenger facial recognition, a passenger gender detection, and a passenger outerwear detection to populate data for the plurality of passenger attributes associated with each of the plurality of passengers (explained in detail by way of subsequent Figs.).

The data collector 130 may identify a depth parameter value indicative of a distance between each of the plurality of passengers and a motion-sensing device. In an example, the motion-sensing device may be a visual input mode such as a camera. The depth parameter value may be determined based on a video feed based medium. In an example, the motion-sensing device may be the video feed based medium. The data collector 130 may differentiate amongst based on the depth parameter value. In an example, the video feed based medium may include using a visual input mode such as a camera. In an example, the camera may be installed at a check-in counter at, for example, an airport for identification of the plurality of passengers. The data collector 130 may implement the artificial intelligence component on the visual input received from the camera to determine the depth parameter value (explained in detail by way of subsequent Figs).

The data collector 130 may implement the artificial intelligence component to monitor a baggage associated with each of the plurality of passengers to create baggage data associated with the baggage. The baggage data representing a plurality of images indicative of a plurality of baggage attributes associated with the baggage. For the purpose of the document, the term "baggage" may refer to tangible belonging carried by a passenger traveling with the carrier. The baggage may include a checked baggage and a carry-on baggage. For the purpose of this document, the carry-on baggage may refer to a baggage that may be accessible to a passenger while traveling with the carrier. For the purpose of this document, the checked baggage may refer to a baggage that may be deposited by a passenger with the carrier to be carried alongside the passenger in a separate compartment. The data collector 130 may obtain the images associated with the baggage to create the baggage data associated with the baggage. The baggage data may be used by the data collector 130 to determine the plurality of baggage attributes may include various features associated with the baggage such as a baggage material, a baggage size, a baggage type, a maximum allowed baggage for a carrier and the like (more exemplary attributes mentioned by way of subsequent Figs). The images associated with the baggage may be collected using the video feed based medium such as for example, a camera.

The data collector 130 may implement an artificial intelligence component to identify at least one quality image, from among the plurality of images, having an image quality above a threshold image quality. The plurality of baggage attributes associated with the baggage may be determined based on the quality image. The data collector 130 may identify the quality image by implementing the frame extraction and a noise reduction on the plurality of images. In an example, the threshold quality may be predefined or may be configurable by a user of the system. In an example, the system 110 may be configurable to automatically detect the images with an image quality greater than the threshold image quality for the identification of the quality image.

The data collector 130 may implement a frame extraction operation and a noise reduction operation from an input from the video feed based medium to identify the depth parameter value (explained in detail by way of subsequent Figs.). In an example, the data collector 130 may extract a frame from the video feed based medium for implementing the frame extraction. The frame may correspond to an image from the plurality of images. The data collector 130 may perform a noise reduction technique on the extracted frame to identify the depth parameter value. The frame extraction and the noise reduction may be implemented on the images associated with the baggage (explained in detail by way of subsequent Figs.). In an example, the plurality of baggage attributes associated with the baggage may be determined based on the video feed based medium. In an example, the plurality of baggage attributes associated with the baggage may be determined by implementing the frame extraction operation and the noise reduction operation on the quality image. In accordance with various embodiments of the present disclosure, the data collector 130 may deploy a chessboard calibration technique and a point cloud segregation technique for processing input received from the video feed based medium (explained in detail by way of subsequent Figs.).

In accordance with various embodiments of the present disclosure, the baggage may be moving along with the plurality of passengers. For example, the plurality of passengers may be carrying the baggage towards a boarding point. The data collector 130 may identify the plurality of baggage attributes and the plurality of passenger attributes, wherein the baggage and the corresponding passenger may be moving. The data collector 130 may collect the images associated with the plurality of passengers, and the plurality of baggage. The data collector 130 may implement the frame extraction, and noise reduction techniques on the visual input received for the moving passengers and the corresponding baggage to identify the quality image. The data collector 130 may identify the plurality of baggage attributes based on the quality image identified therefrom (explained in detail by way of subsequent Figs.).

The data collector 130 may implement an artificial intelligence component to map each of the plurality of passenger attributes with each of the plurality of baggage attributes to determine the baggage pattern corresponding to each of the plurality of passengers. The baggage pattern may comprise a baggage quantity associated with a corresponding passenger. The baggage quantity may refer to a number of baggage that may be associated with each of the plurality of passengers. In accordance with various embodiments of the present disclosure, the data collector 130 may implement the artificial intelligence component to generate the baggage pattern. The baggage pattern may include baggage preferences of a passenger who may be associated with a particular passenger attribute from the plurality of passenger attributes. For example, the baggage pattern may include baggage preferences for passengers based on age, gender, booking reference number, seat number, the purpose of travel such as work or leisure, travel duration, arrival and departure time, passenger type code, origin and destination station codes, frequent traveler information, day of travel, travel class, and the like.

The baggage pattern may include the plurality of baggage attributes associated with each baggage preference of a passenger who may be associated with a particular passenger attribute from the plurality of passenger attributes. For example, the data collector 130 may map the plurality of passenger attributes such as age, gender, booking reference number, seat number, the purpose of travel such as work or leisure, travel duration, arrival and departure time, passenger type code, origin and destination station codes, frequent traveler information, day of travel, travel class, and the like with the plurality of baggage attributes such as the baggage material, the baggage size, the baggage type, the maximum allowed baggage for a carrier and the like (explained in detail by way of subsequent Figs.). The baggage pattern may include, for example, a number of bags that may be carried by a passenger exhibiting a particular set of passenger attributes from the plurality of passenger attributes. The data collector 130 may implement an artificial intelligence component to populate a baggage database with the baggage pattern associated with each of the plurality of passengers. In an example, the baggage database may include the baggage pattern for each of the plurality of passengers (explained in detail by way of FIG. 3 and FIG. 4).

The data analyzer 140 may determine a baggage dimension index associated with the baggage from the baggage database. The baggage dimension index may be indicative of a dimension value associated with the baggage. For example, the baggage dimension index may include a length dimension, a width dimension, and a height dimension associated with the baggage from the baggage database. In an example, the baggage dimension index may be determined by the implementation of a machine learning operation such as a feature engineering based operation (explained in detail by way of subsequent Figs). In accordance with various embodiments of the present disclosure, the baggage dimension index may be determined by the implementation of any other machine learning operation.

The data analyzer 140 may determine a baggage weight index associated with the baggage from the baggage database based on mapping the plurality of passenger attributes with the baggage dimension index. The baggage weight index may be indicative of a weight associated with the baggage. For example, the baggage weight index may include a weight value associated with the baggage from the baggage database. In an example, the baggage weight index may be determined by the implementation of a machine learning operation such as a supervised learning model implementation (explained in detail by way of subsequent Figs). In accordance with various embodiments of the present disclosure, the baggage weight index may be determined by the implementation of any other machine learning operation.

The data analyzer 140 may update the baggage database, based on the baggage dimension index and the baggage weight index associated with the baggage. The data analyzer 140 may update the baggage from the baggage database with the corresponding dimension such as the length dimension, the width dimension, and the height dimension associated with the baggage from the baggage database. Further, the data analyzer 140 may update the baggage from the baggage database with the corresponding weight value associated with the baggage from the baggage database. The updated baggage database may comprise the dimension value and the weight value associated with the baggage pattern associated with each of the plurality of passengers. In accordance with various embodiments of the present disclosure, the data analyzer 140 may implement a vision based feature extraction for determining the baggage dimension index and the baggage weight index. The vision-based feature extraction may include using an input from the video feed based medium (explained in detail by way of subsequent Figs.).

The modeler 150 may create a baggage prediction model associated with each of a plurality of future passengers associated with the future transportation operation, based on the baggage pattern. The baggage prediction model may comprise a number of items in a predicted baggage and a predicted weight for each of the items in the predicted baggage. The plurality of future passengers may refer to passengers that may travel with a carrier in the future. The future transportation operation may be a transportation operation that may be undertaken by an organization in the future for carrying passengers and/or cargo from one place to another by deploying any means of transport. The modeler 150 may identify the baggage pattern that may be associated with the plurality of future passengers based on the plurality of passenger attributes such as age, gender, booking reference number, seat number, the purpose of travel such as work or leisure, travel duration, arrival and departure time, passenger type code, origin and destination station codes, frequent traveler information, day of travel, travel class, travel date, travel companions, and the like. In an example, the modeler 150 may obtain data associate with the plurality of future passengers from a ticketing database maintained by an organization associated with the future transportation operation. The ticketing database may include personal information related to a future passenger who may have issued a ticket for traveling in the future. The modeler 150 may implement a machine learning operation to map information retrieved about a future passenger from the ticketing database with the information stored in the baggage database.

The modeler 150 may create the baggage prediction model for the plurality of future passengers based on the baggage pattern of the plurality of passengers stored in the baggage database. The baggage prediction model may include the number of items in the predicted baggage. The predicted baggage may be the number of baggage that may be carried by a future passenger. The modeler 150 may determine the predicted baggage for a particular passenger based on the baggage pattern that may have been exhibited by a similar passenger. For example, a passenger traveling in a winter season and with an infant will exhibit a particular baggage pattern. The modeler 150 may identify the baggage pattern for the aforementioned passenger may predict a similar baggage quantity for a passenger who may be traveling in the winter season and with an infant (explained in detail by way of subsequent Figs).

The baggage prediction model may include a predicted weight for each of the items in the predicted baggage. As mentioned above, the data analyzer 140 may update the baggage database with the weight value from the baggage weight index for each baggage from the baggage database. The modeler 150 may determine the predicted weight for the predicted baggage based on the baggage weight index. The predicted weight may include the weight value for the predicted baggage. For example, the baggage prediction model may determine a particular baggage pattern "A" for a future passenger "X". The baggage pattern "A" is associated with a particular set of associated baggage that may be retrieved from the baggage database. The baggage database may also include the dimension value and the weight value for the baggage associated with the baggage pattern "A". The modeler 150 may retrieve the dimension value and the weight value for the baggage associated with the baggage pattern "A" and include the same in the baggage prediction model for the future passenger "X" for determining the weight value associated with the predicted baggage (explained in detail by way of subsequent Figs).

The modeler 150 may sort the number of items in the predicted baggage into the checked baggage and the carry-on baggage, based on the predicted weight. The modeler 150 may compare the weight value for the baggage with baggage guidelines of the carrier such as an organization associated with the future transportation operation. The baggage may be segregated into a carry-on baggage category based on acceptable carry-on baggage weight value associated with a carrier. The baggage may be segregated into a checked baggage category if the weight value associated with the baggage may be higher than the acceptable carry-on baggage weight value associated with a carrier.

The modeler 150 may determine a carry-on baggage weight associated with the carry-on baggage based on the baggage prediction model. As mentioned above, the baggage prediction model may include the weight value for the predicted baggage. The modeler 150 may retrieve the weight value of the predicted baggage identified as the carry-on baggage from the baggage prediction model. The modeler 150 may determine a checked baggage weight from a plurality of data sources. The plurality of data sources may be a baggage weight guidelines database that may be used by a carrier to set acceptable weight limits and dimension values for various types of checked baggage. For example, the plurality of data sources may include the dimension value and the weight value for oversized baggage, the dimension value and the weight value for regular checked baggage, and the like. The modeler 150 may identify the checked baggage from the predicted baggage as mentioned above, and predict the weight value for the predicted checked baggage based on data from the baggage repository.

The modeler 150 may determine a baggage weight ratio associated with the predicted baggage based on the baggage prediction model. The baggage weight ratio may be a quantitative relation between the checked baggage weight and the carry-on baggage weight. The modeler 150 may compare the carry-on baggage weight with the checked baggage weight to determine the baggage weight ratio. The baggage weight ration may provide an insight into the baggage space requirements of a particular type of future passenger. For example, in case the baggage weight ratio for a future passenger may indicate that the carry-on baggage may be greater than the checked baggage, then the carrier may decide to offer an option of increasing checked baggage for that particular passenger.

The modeler 150 may generate a baggage prediction result comprising the baggage prediction model, the carry-on baggage weight, and the baggage weight ratio associated with each of the plurality of future passengers. The modeler 150 may generate the baggage prediction result for a future transportation operation associated with a particular travel date and a particular travel time. The baggage prediction result may include the baggage prediction model, the carry-on baggage weight, and the baggage weight ratio associated with each of the plurality of future passengers traveling with the carrier on that particular travel date and at that particular travel time.

The modeler 150 may determine a cumulative carry-on baggage weight and the baggage weight ratio for the future transportation operation based on the baggage prediction result corresponding to each of the plurality of future passengers. The cumulative carry-on baggage weight may indicate a total carry-on baggage weight expected on the future transportation operation associated with the baggage prediction result. The cumulative carry-on baggage weight determination may assist in efficient carrier baggage space management.

The modeler 150 may perform a baggage management action in the carrier associated with the future transportation operation, based on the cumulative carry-on baggage weight and the baggage weight ratio. In accordance with various embodiments of the present disclosure, the baggage management action may comprise the allocation of the items in the predicted baggage in one of a carry-on baggage space and a checked baggage space, based on the cumulative carry-on baggage weight and the baggage weight ratio. The carry-on space may be a space in a carrier for carrying the carry-on baggage. The checked baggage space may be a space in a carrier for carrying the checked baggage. The baggage management action may include executing the baggage prediction result. In an example, the baggage management action may include offering a future passenger more checked baggage in case the cumulative carry-on baggage weight for the associated future transportation operation may be higher than the carrying capacity of the carrier. In an example, the baggage management action may include generating various baggage related offers, schemes, and options to a future passenger based on the baggage prediction result. In accordance with an embodiment of the present disclosure, the modeler 150 may perform the baggage management action automatically for generating the carry-on baggage weight and the baggage weight ratio. In accordance with an embodiment of the present disclosure, the modeler 150 may be configurable to obtain input from a user for generating the carry-on baggage weight and the baggage weight ratio for the predicted baggage associated with the future transportation operation as well as configurable to generate the same based on the baggage prediction result automatically.

The system 110 may visually capture carry-on baggage carried by various passengers while boarding a carrier, assessing the baggage type and/or a baggage size based on dimensions, and mapping bags to appropriate weight categories. The system 110 may record the aforementioned weights for the carry-on baggage and the checked-in baggage along with various influencing factors such as for example, origin-destination, day of the week, time of day, weather, trip purpose, and the like. The system 110 may predict a potential baggage weight expected to be on a future transportation operation based on various influencing factors such as for example, sector, day, time, weather, and the like. The system may optimize a technique to neutralize continuous motion of the objects and background noise, and create a baggage type and/or a baggage size classification technique based on the dimensions estimated for carry-on baggage. The system 110 may classify data associated with various contextual dimensions of the carrier, the passengers, and the environment.

The system 110 may create a prediction model for future transportation operations based on contextual attributes and historical weights. For example, the system 110 may identify the weight of multiple moving bags from an input video feed without the use of gyroscope or geo-enabled devices, and the like. The system 110 may implement the segregation of various passengers and identifying the front-most passenger based on depth information. The system may calculate the weight of the bags from the video input. The system 110 may collect data related to the carrier, the passengers, and the environment from a present transportation operation and classify the same as historical data. The system 110 may predict a ratio of checked/carry-on baggage weight for future transportation operations based on the historical data. The system 110 may be related to generating key insights and data related to various baggage operations in a corrigible manner.

The embodiments for the artificial intelligence component and the machine learning operation presented herein are exemplary in nature and should be treated as such. For the sake of brevity and technical clarity, the description of a baggage weight prediction system may be restricted to few exemplary embodiments, however, to a person skilled in the art it should be clear that the system may be used for the fulfillment of various carrier baggage weight prediction requirements other than those mentioned hereinafter.

Figure 2:
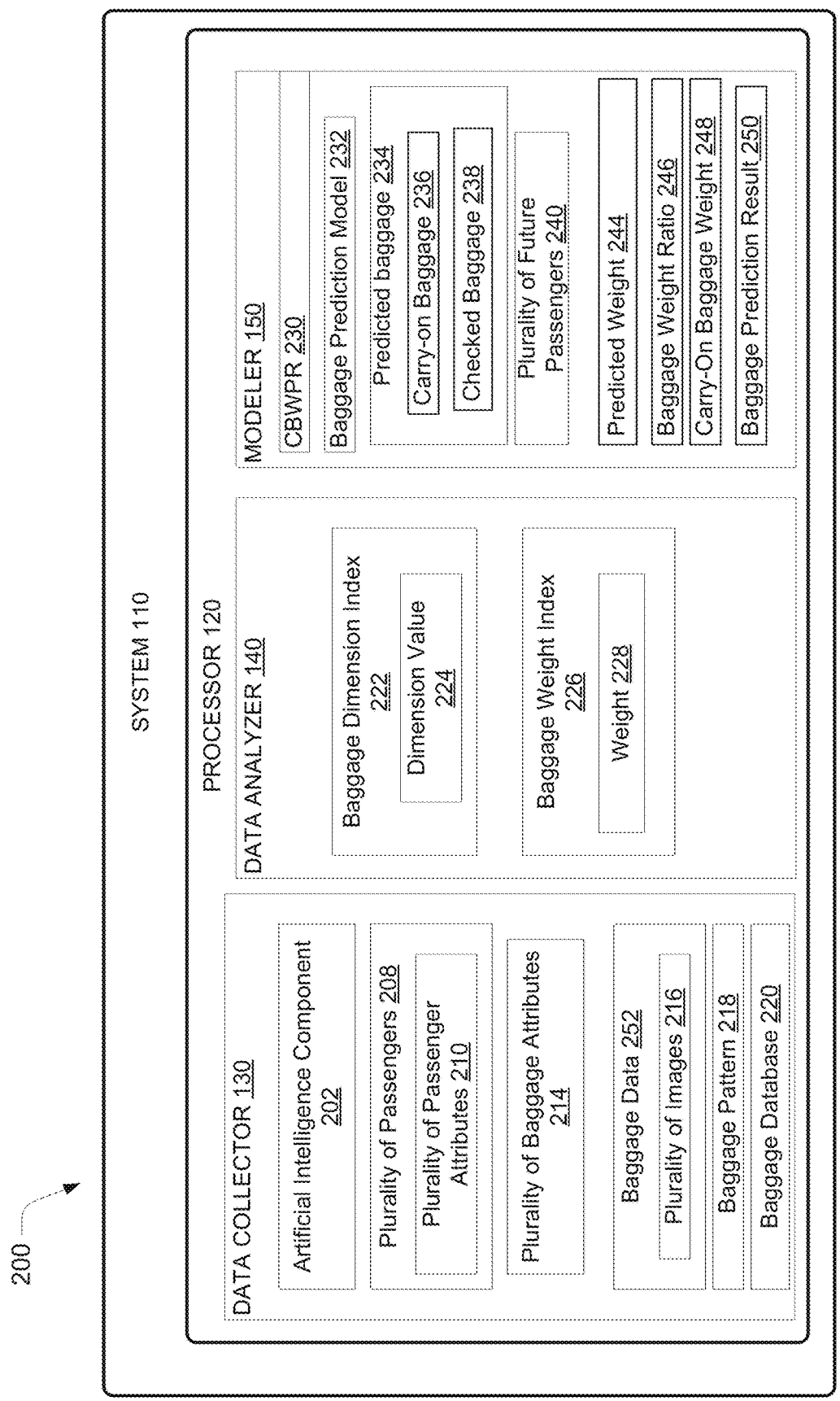
FIG. 2 illustrates various components of a baggage weight prediction system, according to an example embodiment of the present disclosure.

FIG. 2 illustrates various components of a baggage weight prediction system 110, according to an example embodiment of the present disclosure. In an example, the system 110 may include a processor 120. The processor 120 may be coupled to a modeler 150. In accordance with various embodiments of the present disclosure, the system 110 may include a data collector 130, a data analyzer 140. The data collector 130, the data analyzer 140 may be coupled to the processor 120.

The modeler 150 may receive a carrier baggage weight prediction requirement 230 (CBWPR) requesting a total baggage weight to be carried in a future transportation operation by a carrier. In an example, the carrier baggage weight prediction requirement 230 may be associated with at least one of a process, an organization, and an industry-relevant for air-carrier operations. In an example, the carrier baggage weight prediction requirement 230 may be associated with at least one of a process, an organization, and an industry-relevant for a train-carrier operation. In an example, carrier baggage weight prediction requirement 230 may be associated with at least one of a process, an organization, and an industry-relevant for water ship-carrier operations. For the purpose of this disclosure, the term "carrier" may include any organization associated with transporting passengers and cargo by any means of transport. For the purpose of this disclosure, the term "future transportation operation" may refer to a carrier operation likely to take place at a future time. The carrier baggage weight prediction requirement 230 may include segregating baggage into a carry-on baggage and a checked-baggage. In accordance with various embodiments of the present disclosure, the carrier baggage weight prediction requirement may be associated with creating an algorithm for visual object recognition & measurement using various depth cameras. The embodiments for the carrier baggage weight prediction requirement presented herein may be exemplary in nature and a person skilled in the art must understand that the carrier baggage weight prediction requirement may include any operation related to assessment and evaluation baggage carried by a carrier such as an airplane, a train, and a ship. The embodiments for the carrier baggage weight prediction requirement 230 presented herein may be exemplary in nature and a person skilled in the art must understand that the carrier baggage weight prediction requirement 230 may include any operation related to assessment and evaluation baggage carried by an air carrier.

The data collector 130 may implement an artificial intelligence component 202 to identify a plurality of passenger attributes 210 associated with each of a plurality of passengers 208 associated with a previous transportation operation of the carrier. The artificial intelligence component 202 may include the implementation of various Computer Vision (CV) and ML techniques for processing data associated with the plurality of passengers 208. For the sake of brevity and technical clarity, various CV and ML techniques are not described in detail herein, however, such techniques would be apparent to a person skilled in the art. The data processing may be a continuous process and may enrich the data associated with the plurality of passengers. The plurality of passengers may be the passengers traveling through a carrier such as an air-carrier, a train, or a ship. In accordance with various embodiments of the present disclosure, data associated with the plurality of passengers 208 may include any type of data associated with the carrier baggage weight prediction requirement 230. The data collector 130 may obtain the data associated with the plurality of passengers 208 from one or more data sources. The plurality of data sources may include various internal databases maintained by an organization, various external databases such as for example, databases maintained by International Air Transport Association (IATA) for airport geographical codes, and the like. In accordance with various embodiments of the present disclosure, the data associated with the plurality of passengers 208 may include various details associated with various carrier operations such as carrier detail, passenger details, carrier baggage policy, carrier station geographical codes, and the like. In an example, the data collector 130 may obtain the data associated with the plurality of passengers 208 on a near real-time basis.

The plurality of passenger attributes 210 may include various measurable factors associated with a passenger such as age, gender, booking reference number, seat number, the purpose of travel such as work or leisure, travel duration, arrival and departure time, passenger type code, origin and destination station codes, frequent traveler information, day of travel, travel class, and the like (more exemplary attributes mentioned by way of subsequent Figs). In accordance with various embodiments of the present disclosure, the data collector 130 may implement a passenger facial recognition, a passenger gender detection, and a passenger outerwear detection to identify the plurality of passenger attributes 210 associated with each of the plurality of passengers 208 (explained in detail by way of subsequent Figs.).

The data collector 130 may identify a depth parameter value indicative of a distance between each of the plurality of passengers 208 and a motion-sensing device. In an example, the motion-sensing device may be a visual input mode such as a camera. The depth parameter value may be determined based on a video feed based medium. In an example, the motion-sensing device may be the video feed based medium. The data collector 130 may differentiate amongst based on the depth parameter value. In an example, the video feed based medium may include using a visual input mode such as a camera. In an example, the camera may be installed at a check-in counter at, for example, an airport for identification of the plurality of passengers 208. The data collector 130 may implement the artificial intelligence component 202 on the visual input received from the camera to determine the depth parameter value (explained in detail by way of subsequent Figs).

The data collector 130 may implement the artificial intelligence component 202 to monitor a baggage associated with each of the plurality of passengers 208 to create baggage data 252 associated with the baggage. The baggage data 252 representing a plurality of images 216 indicative of a plurality of baggage attributes 214 associated with the baggage. For the purpose of the document, the term "baggage" may refer to tangible belonging carried by a passenger traveling with the carrier. The baggage may include a checked baggage 238 and a carry-on baggage 236. For the purpose of this document, the carry-on baggage 236 may refer to "baggage that may be accessible to a passenger while traveling with the carrier". For the purpose of this document, the checked baggage 238 may refer to "baggage that may be deposited by a passenger with the carrier to be carried alongside the passenger in a separate compartment". The data collector 130 may collect the plurality of images 216 associated with the baggage to create the baggage data 252 associated with the baggage. The baggage data 252 may be used by the data collector 130 to determine the plurality of baggage attributes 214 may include various features associated with the baggage such as a baggage material, a baggage size, a baggage type, a maximum allowed baggage for a carrier and the like (more exemplary attributes mentioned by way of subsequent Figs). The plurality of images 216 associated with the baggage may be collected using the video feed based medium such as for example, a camera.

The data collector 130 may implement an artificial intelligence component 202 to identify a quality image, from among the plurality of images 216, having an image quality above a threshold image quality. The plurality of baggage attributes 214 associated with the baggage may be determined based on the quality image. The data collector 130 may identify the quality image by implementing the frame extraction and a noise reduction on the plurality of images 216. In an example, the threshold quality may be predefined or may be configurable by a user of the system. In an example, the system 110 may be configurable to automatically detect the images with an image quality greater than the threshold image quality for the identification of the quality image.

In accordance with various embodiments of the present disclosure, the data collector 130 may implement a frame extraction operation and a noise reduction operation from an input from the video feed based medium to identify the depth parameter value (explained in detail by way of subsequent Figs.). In an example, the data collector 130 may extract a frame from the video feed based medium for implementing the frame extraction. The frame may correspond to an image from the plurality of images 216. The data collector 130 may perform a noise reduction technique on the extracted frame to identify the depth parameter value. The frame extraction and the noise reduction may be implemented on the plurality of images 216 associated with the baggage (explained in detail by way of subsequent Figs.). In an example, the plurality of baggage attributes 214 associated with the baggage may be determined based on the video feed based medium. In an example, the plurality of baggage attributes 214 associated with the baggage may be determined by implementing the frame extraction operation and the noise reduction operation on the quality image. In accordance with various embodiments of the present disclosure, the data collector 130 may deploy a chessboard calibration technique and a point cloud segregation technique for processing input received from the video feed based medium (explained in detail by way of subsequent Figs.).

In accordance with various embodiments of the present disclosure, the baggage may be moving along with the plurality of passengers 208. For example, the plurality of passengers 208 may be carrying the baggage towards a boarding point. The data collector 130 may identify the plurality of baggage attributes 214 and the plurality of passenger attributes 210, wherein the baggage and the corresponding passenger may be moving. The data collector 130 may collect the plurality of images 216 associated with the plurality of passengers 208, and the plurality of baggage. The data collector 130 may implement the frame extraction, and noise reduction techniques on the visual input received for the moving passengers and the corresponding baggage to identify the quality image. The data collector 130 may identify the plurality of baggage attributes 214 based on the quality image identified therefrom (explained in detail by way of subsequent Figs.).

The data collector 130 may implement the artificial intelligence component 202 to map each of the plurality of passenger attributes 210 with each of the plurality of baggage attributes 214 to determine a baggage pattern 218 corresponding to each of the plurality of passengers 208. The baggage pattern 218 may comprise a baggage quantity associated with a corresponding passenger. The baggage quantity may refer to a number of baggage that may be associated with each of the plurality of passengers 208. In accordance with various embodiments of the present disclosure, the data collector 130 may implement the artificial intelligence component 202 to generate the baggage pattern 218. The baggage pattern 218 may include baggage preferences of a passenger who may be associated with a particular passenger attribute from the plurality of passenger attributes 210. For example, the baggage pattern 218 may include baggage preferences for passengers based on age, gender, booking reference number, seat number, the purpose of travel such as work or leisure, travel duration, arrival and departure time, passenger type code, origin and destination station codes, frequent traveler information, day of travel, travel class, and the like.

The baggage pattern 218 may include the plurality of baggage attributes 214 associated with each baggage preference of a passenger who may be associated with a particular passenger attribute from the plurality of passenger attributes 210. For example, the data collector 130 may map the plurality of passenger attributes 210 such as age, gender, booking reference number, seat number, the purpose of travel such as work or leisure, travel duration, arrival and departure time, passenger type code, origin and destination station codes, frequent traveler information, day of travel, travel class, and the like with the plurality of baggage attributes 214 such as the baggage material, the baggage size, the baggage type, the maximum allowed baggage for a carrier and the like (explained in detail by way of subsequent Figs.). The baggage pattern 218 may include, for example, a number of bags that may be carried by a passenger exhibiting a particular set of passenger attributes from the plurality of passenger attributes 210. The data collector 130 may implement the artificial intelligence component 202 to populate a baggage database 220 with the baggage pattern 218 associated with each of the plurality of passengers 208. In an example, the baggage database 220 may include the baggage pattern 218 for each of the plurality of passengers 208 (explained in detail by way of FIG. 3 and FIG. 4).

The data analyzer 140 may determine a baggage dimension index 222 associated with the baggage from the baggage database 220. The baggage dimension index 222 may be indicative of a dimension 224 (also referred to as dimension value 224) associated with the baggage. For example, the baggage dimension index 222 may include a length dimension, a width dimension, and a height dimension associated with the baggage from the baggage database 220. In an example, the baggage dimension index 222 may be determined by the implementation of a machine learning operation such as a feature engineering based operation (explained in detail by way of subsequent Figs). In accordance with various embodiments of the present disclosure, the baggage dimension index 222 may be determined by the implementation of any other machine learning operation.

The data analyzer 140 may determine a baggage weight index 226 associated with the baggage from the baggage database 220 based on mapping the plurality of passenger attributes 210 with the baggage dimension index 222. The baggage weight index 226 may be indicative of a weight 228 (also referred to as weight value 228) associated with the baggage. For example, the baggage weight index 226 may include a weight value 228 associated with the baggage from the baggage database 220. In an example, the baggage weight index 226 may be determined by the implementation of a machine learning operation such as a supervised learning model implementation (explained in detail by way of subsequent Figs). In accordance with various embodiments of the present disclosure, the baggage weight index 226 may be determined by the implementation of any other machine learning operation.

The data analyzer 140 may update the baggage database 220, based on the baggage dimension index 222 and the baggage weight index 226 associated with the baggage. The data analyzer 140 may update the baggage from the baggage database 220 with the corresponding dimension such as the length dimension, the width dimension, and the height dimension associated with the baggage from the baggage database 220. Further, the data analyzer 140 may update the baggage from the baggage database 220 with the corresponding weight value 228 associated with the baggage from the baggage database 220. The updated baggage database 220 may comprise the dimension value 224 and the weight value 228 associated with the baggage pattern 218 associated with each of the plurality of passengers 208. In accordance with various embodiments of the present disclosure, the data analyzer 140 may implement a vision based feature extraction for determining the baggage dimension index 222 and the baggage weight index 226. The vision-based feature extraction may include using an input from the video feed based medium (explained in detail by way of subsequent Figs.).

The modeler 150 may create a baggage prediction model 232 associated with each of a plurality of future passengers 240 associated with the future transportation operation, based on the baggage pattern 218. The baggage prediction model 232 may comprise a number of items in a predicted baggage 234, and a predicted weight 244 for each of the items in the predicted baggage 234. The plurality of future passengers 240 may refer to passengers that may travel with a carrier in the future. The future transportation operation may be a transportation operation that may be undertaken by an organization in the future for carrying passengers and/or cargo from one place to another by deploying any means of transport. The modeler 150 may identify the baggage pattern 218 that may be associated with the plurality of future passengers 240 based on the plurality of passenger attributes 210 such as age, gender, booking reference number, seat number, the purpose of travel such as work or leisure, travel duration, arrival and departure time, passenger type code, origin and destination station codes, frequent traveler information, day of travel, travel class, travel date, travel companions, and the like. In an example, the modeler 150 may obtain data associated with the plurality of future passengers 240 from a ticketing database maintained by an organization associated with the future transportation operation. The ticketing database may include personal information related to a future passenger who may have issued a ticket for traveling in the future. The modeler 150 may implement a machine learning operation to map information retrieved about a future passenger from the ticketing database with the information stored in the baggage database 220. The modeler 150 may create the baggage prediction model 232 for the plurality of future passengers 240 based on the baggage pattern 218 of the plurality of passengers 208 stored in the baggage database 220. The baggage prediction model 232 may include the number of items in the predicted baggage 234. The predicted baggage 234 may be the number of baggage that may be carried by a future passenger. The modeler 150 may determine the predicted baggage 234 for a particular passenger based on the baggage pattern 218 that may have been exhibited by a similar passenger. For example, a passenger traveling in a winter season and with an infant will exhibit a particular baggage pattern 218. The modeler 150 may identify the baggage pattern 218 for the aforementioned passenger may predict a similar baggage quantity for a passenger who may be traveling in the winter season and with an infant (explained in detail by way of subsequent Figs).

The baggage prediction model 232 may include a predicted weight 244 for each of the items in the predicted baggage 234. As mentioned above, the data analyzer 140 may update the baggage database 220 with the weight value 228 from the baggage weight index 226 and the dimension value 224 for each baggage from the baggage database 220. The modeler 150 may determine the predicted weight 244 for the predicted baggage 234 based on the baggage weight index 226 and the baggage dimension index 222. The predicted weight 244 may include the weight value 228 for the predicted baggage 234. For example, the baggage prediction model 232 may determine a particular baggage pattern 218 "A" for a future passenger "X". The baggage pattern 218 "A" be associated with a particular set of associated baggage that may be retrieved from the baggage database 220. The baggage database 220 may also include the dimension value 224 and the weight value 228 for the baggage associated with the baggage pattern 218 "A". The modeler 150 may retrieve the dimension value 224 and the weight value 228 for the baggage associated with the baggage pattern 218 "A" generated for the plurality of passengers 208 and include the same in the baggage prediction model 232 for the future passenger "X" for determining the predicted weight 244 for each of the items in the predicted baggage 234 for the future passengers 240 (explained in detail by way of subsequent Figs).

The modeler 150 may sort the number of items in the predicted baggage 234 into the checked baggage 238 and the carry-on baggage 236, based on the predicted weight 244. The modeler 150 may predict the weight value 228 for each of the predicted baggage 234. The modeler 150 may compare the predicted weight value 228 for the predicted baggage 234 with baggage guidelines of the carrier such as an organization associated with the future transportation operation. The baggage may be segregated into a carry-on baggage category 236 based on the acceptable weight value 228 for the carry-on baggage 236 associated with a carrier (carry-on baggage category have been numbered the same as the carry-on baggage for sake of technical clarity). The predicted baggage 234 may be segregated into a checked baggage category 238 if the weight value 228 associated with the predicted baggage 234 may be higher than the acceptable weight value 228 for the carry-on baggage category 236 associated with a carrier. For the purpose of explanation, checked baggage category have been numbered the same as the checked baggage.

The modeler 150 may determine a carry-on baggage weight 248 associated with the carry-on baggage 236 based on the baggage prediction model 232. As mentioned above, the baggage prediction model 232 may include the weight value 228 for the predicted baggage 234. The modeler 150 may retrieve the weight value 228 of the predicted baggage 234 identified as the carry-on baggage 236 from the baggage prediction model 232. The modeler 150 may determine a checked baggage weight from a plurality of data sources. The plurality of data sources may be a baggage weight guidelines database that may be used by a carrier to set acceptable weight limits and dimension values 224 for various types of checked baggage 238. For example, the plurality of data sources may include the dimension value 224 and the weight value 228 for oversized baggage, the dimension value 224 and the weight value 228 for regular checked baggage 238, and the like. In an example, the plurality of data sources may include historical data for the checked baggage 238 associated with the transportation operation. The modeler 150 may identify the checked baggage 238 from the predicted baggage 234 as mentioned above, and predict the weight value 228 for the predicted checked baggage 238 based on data from the baggage repository.

The modeler 150 may determine a baggage weight ratio 246 associated with the predicted baggage 234 based on the baggage prediction model 232. The baggage weight ratio 246 may be a quantitative relation between the checked baggage weight and the carry-on baggage weight 248. The modeler 150 may compare the carry-on baggage weight 248 with the checked baggage weight to determine the baggage weight ratio 246. The baggage weight ratio 246 may provide an insight into the baggage space requirements of a particular type of future passenger. For example, in case the baggage weight ratio 246 for a future passenger may indicate that the carry-on baggage 236 may be greater than the checked baggage 238, then the carrier may decide to offer an option of increasing checked baggage 238 for that particular passenger.

The modeler 150 may generate a baggage prediction result 250 comprising the baggage prediction model 232, the carry-on baggage weight 248, and the baggage weight ratio 246 associated with each of the plurality of future passengers 240. The modeler 150 may generate the baggage prediction result 250 for a future transportation operation associated with a particular travel date and a particular travel time. The baggage prediction result 250 may include the baggage prediction model 232, the carry-on baggage weight 248, and the baggage weight ratio 246 associated with each of the plurality of future passengers 240 traveling with the carrier on that particular travel date and at that particular travel time.

The modeler 150 may determine a cumulative carry-on baggage weight 248 and the baggage weight ratio 246 for the future transportation operation based on the baggage prediction result 250 corresponding to each of the plurality of future passengers 240. The cumulative carry-on baggage weight 248 may indicate a total carry-on baggage weight 248 expected on the future transportation operation associated with the baggage prediction result 250. The cumulative carry-on baggage weight 248 determination may assist in efficient carrier baggage space management.

The modeler 150 may perform a baggage management action in the carrier associated with the future transportation operation, based on the cumulative carry-on baggage weight 248 and the baggage weight ratio 246. In accordance with various embodiments of the present disclosure, the baggage management action may comprise the allocation of the items in the predicted baggage 234 in one of a space for the carry-on baggage 236 (also referred to as carry-on baggage space) and a space for the checked baggage 238 (also referred to as checked baggage space), based on the cumulative carry-on baggage weight 248 and the baggage weight ratio 246. The carry-on baggage space may be a space in a carrier for carrying the carry-on baggage 236. The checked baggage space may be a space in a carrier for carrying the checked baggage 238. The baggage management action may include executing the baggage prediction result 250.

In an example, the baggage management action may include offering a future passenger more checked baggage in case the cumulative carry-on baggage weight 248 for the associated future transportation operation may be higher than the carrying capacity of the carrier. In an example, the baggage management action may include generating various baggage related offers, schemes, and options to a future passenger based on the baggage prediction result 250. In accordance with an embodiment of the present disclosure, the modeler 150 may perform the baggage management action automatically for generating the carry-on baggage weight 248 and the baggage weight ratio 246. In accordance with an embodiment of the present disclosure, the modeler 150 may be configurable to obtain input from a user for generating the carry-on baggage weight 248 and the baggage weight ratio 246 for the predicted baggage 234 associated with the future transportation operation as well as configurable to generate the same based on the baggage prediction result 250 automatically.

The embodiments for the artificial intelligence component 202 and the machine learning operation presented herein are exemplary in nature and should be treated as such. For the sake of brevity and technical clarity, the description of a baggage weight prediction system may be restricted to few exemplary embodiments, however, to a person skilled in the art it should be clear that the system may be used for the fulfillment of various carrier baggage weight prediction requirement 230s other than those mentioned hereinafter.

In operation, the data collector 130 may identify the plurality of passengers 208 and the plurality of passenger attributes 210 associated with the plurality of passengers 208. The data collector 130 may collect the plurality of images 216 related to the baggage associated with the plurality of passengers 208. The data collector 130 may identify the quality image and determine the plurality of baggage attributes 214 associated with the baggage from the quality image. The data collector 130 may determine the baggage pattern 218 by mapping the plurality of passenger attributes 210 with the plurality of baggage attributes 214. The data collector 130 may populate the baggage database 220 with the baggage pattern 218 for each of the plurality of passengers 208. The data analyzer 140 may determine the baggage dimension index 222 for the baggage comprised within the baggage database 220. The data analyzer 140 may determine the baggage weight index 226 for the baggage comprised within the baggage database 220. The data analyzer 140 may update the dimension value 224 from the baggage dimension index 222 and the weight value 228 from the baggage weight index 226 into the baggage database 220.

The modeler 150 may determine the baggage prediction model 232 from the updated baggage database 220, which may include the baggage pattern 218 and associated dimension value 224 and the associated weight value 228. The baggage prediction model 232 may be created for the plurality of future passengers 240 that may travel with a carrier in the future. The baggage prediction model 232 may include the predicted baggage 234 that may be carried by the plurality of future passengers 240. The baggage prediction model 232 may include the dimension value 224 and the weight value 228 for the predicted baggage 234. The modeler 150 may sort the predicted baggage 234 into the checked baggage 238 and the carry-on baggage 236 based on the dimension value 224 and the weight value 228 of the predicted baggage 234. The modeler 150 may determine the carry-on baggage weight 248 for the carry-on baggage 236. The modeler 150 may retrieve the check baggage weight from the plurality of data sources.

The modeler 150 may determine the cumulative carry-on baggage weight 248 for the entirety of the plurality of future passengers 240. The modeler 150 may determine the baggage weight ratio for the plurality of future passengers 240. The modeler 150 may generate the baggage prediction result 250 comprising the baggage prediction model 232, the cumulative carry-on baggage weight 248, the carry-on baggage weight 248 for each of the plurality of future passengers 240, and the baggage weight ratio 246. The modeler 150 may execute the baggage prediction result 250 by performing the baggage management action to process the carrier baggage weight prediction requirement 230. The data collector 130, the data analyzer 140, and the modeler 150 may implement the artificial intelligence component 202 and various machine learning operations such as feature engineering, frame extraction, and noise reduction for processing the carrier baggage weight prediction requirement 230. Various techniques implemented by the system 110 may be described in detail by way of subsequent Figs.

Accordingly, the system 110 may predict in advance the potential weight of baggage expected to be on a flight based on the identification of various factors other than cabin class-based allowances while decreasing uncertainty in predicted outcomes. The system 110 may predict the baggage weight that may be expected on a carrier for a future transportation operation. The determination of the baggage weight may be helpful in efficient baggage space management. The determination of baggage weight may facilitate an increase in ancillary revenue generation associated with the future transportation operation. The determination of the baggage weight ratio 246 may facilitate transportation personnel in an effective management of a crisis situation such as excess baggage. The system 110 may generate insights based on a current transportation operation to predict baggage for the future transportation operation.

Figure 3:
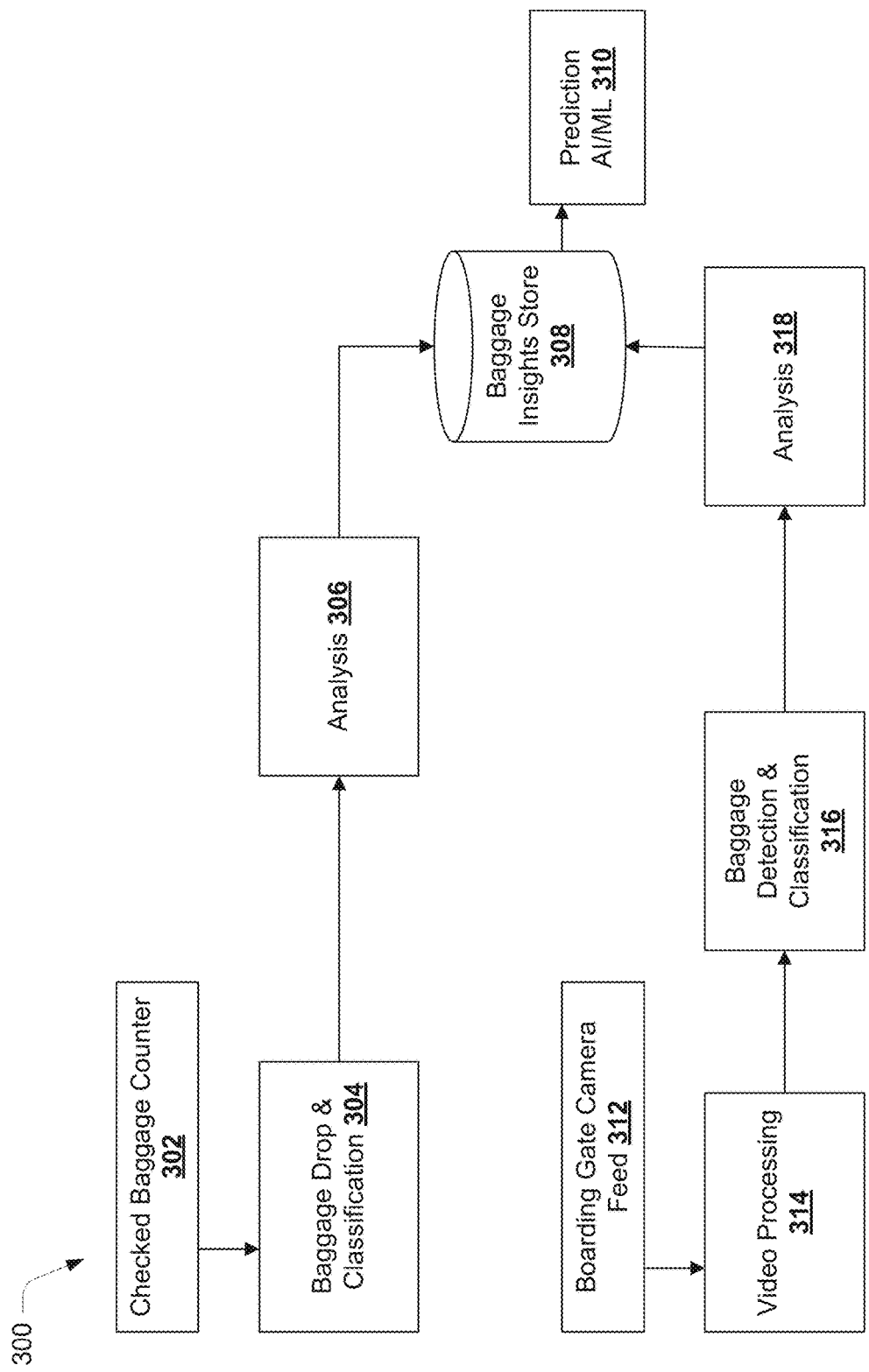
FIG. 3 illustrates a flow diagram for baggage weight prediction using a baggage weight prediction system, according to an example embodiment of the present disclosure.

FIG. 3 illustrates a flow diagram 300 for baggage weight prediction using the baggage weight prediction system 110, according to an example embodiment of the present disclosure. The flow diagram 300 illustrates the generation of the baggage prediction result 250 by the system 110 as an exemplary embodiment of the present disclosure. The flow diagram 300 may include a checked baggage counter 302. The checked baggage counter 302 may be used by the system for the identification of the plurality of passengers 208. The flow diagram 300 may further include a baggage drop and classification 304. The baggage drop and classification 304 may receive input from the checked baggage counter 302. The baggage drop and classification 304 may include recording the baggage weight for the checked baggage 238 of each of the plurality of passengers 208. The baggage drop and classification 304 may include updating a type of the checked baggage 238. The baggage drop and classification 304 may include issuing of baggage tags to the plurality of passengers 208.

The flow diagram 300 may further include an analysis 306. The analysis 306 may include implementation of the artificial intelligence component 202 to determine the plurality of passenger attributes 210 such as travel time, travel day of a week, season, weather, travel purpose, and the like. The analysis 306 may associate the plurality of passenger attributes 210 with the baggage weight and the checked baggage type information received from the baggage drop and classification 304. The analysis 306 may implement the artificial intelligence component 202 to identify the baggage pattern 218 for the checked baggage 238 for the plurality of passengers 208. The system 110 may update the results from the analysis 306 to a baggage insight store 308. The baggage insight store 308 may be the baggage database 220 mentioned above.

The flow diagram 300 may further include a boarding gate camera feed 312. The boarding gate camera feed 312 may be the video feed based medium mentioned above. The boarding gate camera feed 312 may include the motion-sensing device such as a camera for capturing the plurality of passengers 208 and the associated baggage. In an example, the boarding gate camera feed 312 may capture the plurality of passengers 208 and the associated baggage in a video format. The system 110 may implement a video processing 314 for processing the video format. The video processing 314 may include the implementation of the artificial intelligence component 202 on the captured video format to convert the same on the plurality of images 216. The plurality of images 216 may be the transient images generated from the captured video format. The video processing 314 may implement the frame extraction techniques and the noise reduction techniques on the plurality of images 216. The video processing 314 may include identification of the quality image. The video processing 314 may be followed by a baggage detection and classification 316. The baggage detection and classification 316 may include identification of the baggage from the plurality of images 216 processed by the video processing 314. The baggage detection and classification 316 may include implementation of the machine learning models such as feature engineering for detection of the baggage from the plurality of images 216 and identification of the plurality of baggage attributes 214 therefrom.

The feature engineering models may include classifiers for detecting the plurality of baggage attributes 214 (explained in detail by way of subsequent Figs.). The baggage detection and classification 316 may be followed by an analysis 318. The analysis 318 may include the implementation of a machine learning model to determine the baggage weight index 226 and the baggage dimension index 222 (explained in detail by way of subsequent Figs). The analysis 318 may include recording the baggage weight and various factors that may influence the baggage weight. In accordance with various embodiments of the present disclosure, the factors that may influence the baggage weight may be the plurality of passenger attributes 210. The baggage weight index 226 may be determined based on the baggage pattern 218 taking into account the plurality of passenger attributes 210 as mentioned above. The system 110 may update the results from the analysis 318 to the baggage insight store 308.

The flow diagram 300 may further include the generation of a prediction 310 based on the information present in the baggage insight store 308. The prediction 310 may include the baggage prediction model 232, the carry-on baggage weight 248, and the baggage weight ratio 246. As mentioned above, the baggage prediction model 232 may be generated from the updated baggage database 220. The prediction 310 may include the implementation of a machine learning operation (explained in detail by way of subsequent Figs) for the generation of baggage insights associated with the future transportation operation. The prediction 310 may predict the total potential baggage weight and checked baggage 238 to carry-on baggage 236 ratio expected to be on a future transportation operation based on the influencing factors such as origin-destination pair, travel segment type, day of the week, travel time, carrier type, possible type of travel region, and the like (various exemplary factors mentioned by way of FIG. 14). The prediction 310 may generate the baggage prediction result 250 for performing the baggage management action.

Figure 4:
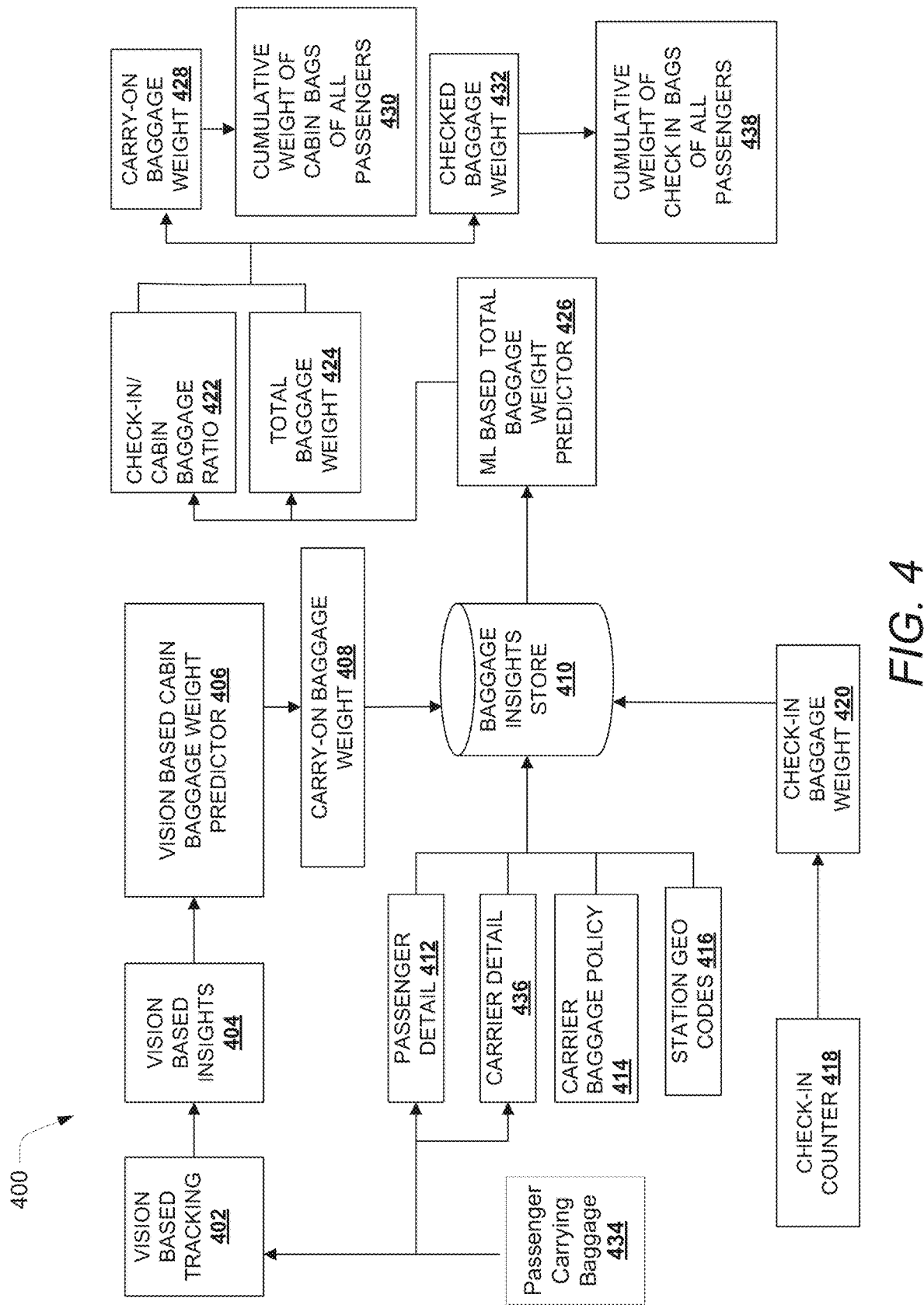
FIG. 4 illustrates an architectural flow diagram for baggage weight prediction using a baggage weight prediction system, according to an example embodiment of the present disclosure.

FIG. 4 illustrates an architectural flow diagram 400 for baggage weight prediction using the baggage weight prediction system 110, according to an example embodiment of the present disclosure. The flow diagram 400 illustrates the generation of the baggage prediction result 250 according to an exemplary embodiment of the present disclosure. The flow diagram 400 may include a vision tracking 402. As mentioned by way of FIG. 3, the video processing 314 may capture the plurality of passengers 208 through the boarding gate camera feed 312. In accordance with various embodiments of the present disclosure, the video processing 314 may identify a passenger carrying baggage 434 through the boarding gate camera feed 312. The boarding gate camera feed 312 may include a motion-sensing device such as a camera installed for capturing the video of the plurality of passengers 208 and the associated baggage for the video processing 314. The flow diagram 400 illustrates the identification of the plurality of baggage attributes 214 and the plurality of passenger attributes 210 for the passenger carrying baggage 434 based on the video feed medium.

The system 110 may implement a vision tracking 402 over the passenger carrying baggage 434. The vision tracking 402 may include capturing a video and/or the plurality of images 216 for the passenger carrying baggage 434. In an example, the vision tracking 402 may include capturing a video of the passenger carrying baggage 434 and generating the plurality of images 216 therefrom by implementing various frame extraction and noise reduction techniques. In an example, the vision tracking 402 may include capturing the plurality of images 216 for the passenger carrying baggage 434. The vision tracking 402 may further include implementation of the various frame extraction and noise reduction techniques (explained in detail by way of subsequent Figs) for identification of the quality image from the plurality of images 216 for the passenger carrying baggage 434.

The vision tracking 402 may include identification of the baggage associated with each of the plurality of passengers 208, identification of a number of bags carried by each of the plurality of passengers 208, tracking each baggage associated with each of the plurality of passengers 208, passenger age and gender detection, passenger outwear detection and the like (explained in detail by way of subsequent Figs). The vision tracking 402 may be followed by a generation 404. The generation 404 may include the generation of various vision-based insights from the vision tracking 402. The vision-based insights may include determination of the plurality of baggage attributes 214 by implementing feature engineering techniques on the plurality of images 216 associated with the baggage as identified by the vision tracking 402. The vision-based insights may include identification of the baggage pattern 218 by implementing the artificial intelligence component 202 for mapping the plurality of passenger attributes 210 generated by the vision tracking 402 with the plurality of baggage attributes 214. The vision-based insights may include determination of the baggage dimension index 222 (explained in detail by way of subsequent Figs) and determination of the baggage weight index 226 (explained in detail by way of subsequent Figs).

The flow diagram 400 illustrates a vision based baggage weight predictor 406. The vision-based cabin baggage weight predictor 406 may predict a weight 408. The weight 408 may be the carry-on baggage weight 248 by the implementation of various machine learning techniques such as various supervised learning models (explained in detail by way of subsequent Figs). In accordance with various embodiments of the present disclosure, personal details and travel details associated with the passenger carrying baggage 434 may be used to populate a passenger detail component 412 and a carrier detail component 436. For example, the passenger name, booking reference number, seat number, travel class details, and the like may be retrieved from a passenger ticket and the details may be updated into the passenger detail component 412.

The carrier details such as flight number, flight type, train number, train type, and the like may be updated into the carrier detail component 436. Further, the flow diagram 400 may include a counter 418. The system 110 may determine a weight 420 from the counter 418. The weight 420 may be the checked baggage weight. The counter 418 may be, for example, a baggage drop counter at an airport, a train station, or a shipping port. Additionally, the system 110 may refer to a carrier baggage policy 414 and a station code database 416 for retrieving additional details about a transportation operation such as origin-destination codes, baggage allowances, and the like. The system 110 may deploy the passenger detail component 412, the carrier detail component 436, the station code database 416, the carrier baggage policy 414, the weight 420, and the weight 408 to populate a baggage insight database 410. The baggage insight database 410 may be the baggage database 220 mentioned above. The baggage insight database 410 also includes the baggage pattern 218 associated with each of the plurality of passengers 208 covered by the vision tracking 402.

The system 110 may implement various machine learning algorithms (explained in detail by way of subsequent Figs) to using a total baggage weight predictor 426. The total baggage weight predictor 426 may derive information from the baggage insight database 410 for the generation of a weight 424 and a ratio 422. The weight 424 may include the predicted weight 244 for each of the items in the predicted baggage 234. The ratio 422 may be the baggage weight ratio. The weight 424 and the ratio 422 may be used to generate a weight 428 and a weight 432. The weight 428 may be the carry-on baggage weight 248 and weight 432 may be the checked baggage weight. The system 110 may determine a cumulative weight 430 from the weight 428. The cumulative weight 430 may be the cumulative carry-on baggage weight 248. The system 110 may determine a cumulative weight 438 from the weight 432. The cumulative weight 438 may be the cumulative checked baggage weight expected on a carrier for a future transportation operation.

Figure 5A:
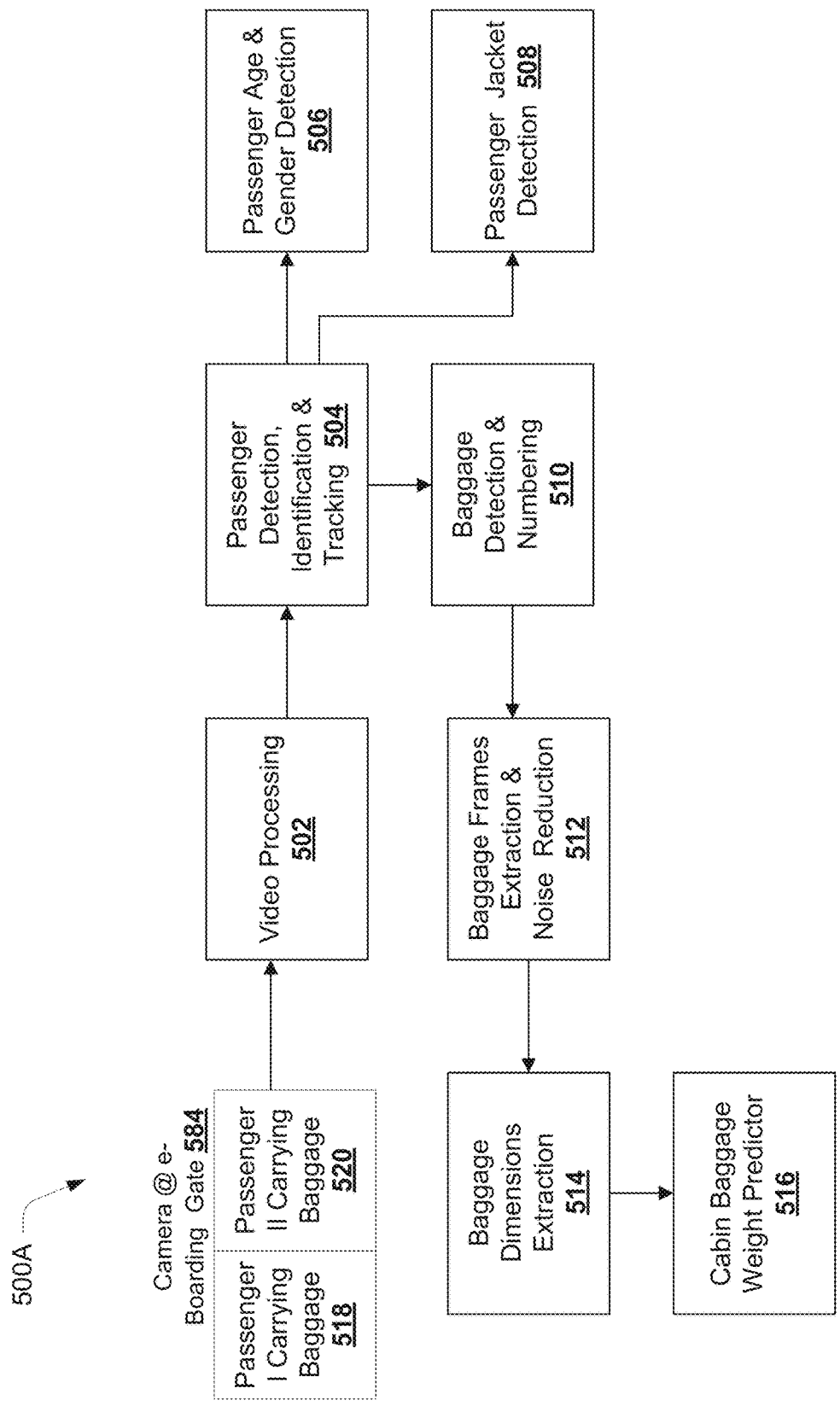
FIG. 5A illustrates a flow diagram for vision-based tracking for baggage weight prediction using a baggage weight prediction system, according to an example embodiment of the present disclosure.

FIG. 5A illustrates a flow diagram 500A for a vision-based tracking for baggage weight prediction using the baggage weight prediction system 110, according to an example embodiment of the present disclosure. The vision-based tracking illustrated by way of flow diagram 500A may be the vision tracking 402. The flow diagram 500A may include a boarding gate camera 584 for capturing a passenger I 518 and a passenger II 520. The passenger I 518 and the passenger II 520 may be passengers from the plurality of passengers 208. The passenger I 518 and the passenger II 520 may be carrying baggage. The flow diagram 500A may include a video processing 502. The video processing 502 may be the video processing 314. The video processing 502 may capture the passenger I 518 and the passenger II 520 in a video format. The video processing 502 may convert the video format into the plurality of images 216. In an example, the video processing 502 may implement the frame extraction technique for the extraction of various frames from the video of the passenger I 518 and the passenger II 520 to generate the plurality of images 216. For example, the video processing 502 may read a video feed in a ".bag" format and convert the same into ".mp4" or ".flv" or ".avi" format. In an example, the video processing 502 may include extraction of thirty (30) frames per second. The flow diagram 500A may further include a passenger detection, identification & tracking 504. The system 110 may identify frames extracted from the video feed corresponding to a passenger such as for example, the passenger I 518 and the passenger II 520.

Figure 5B:
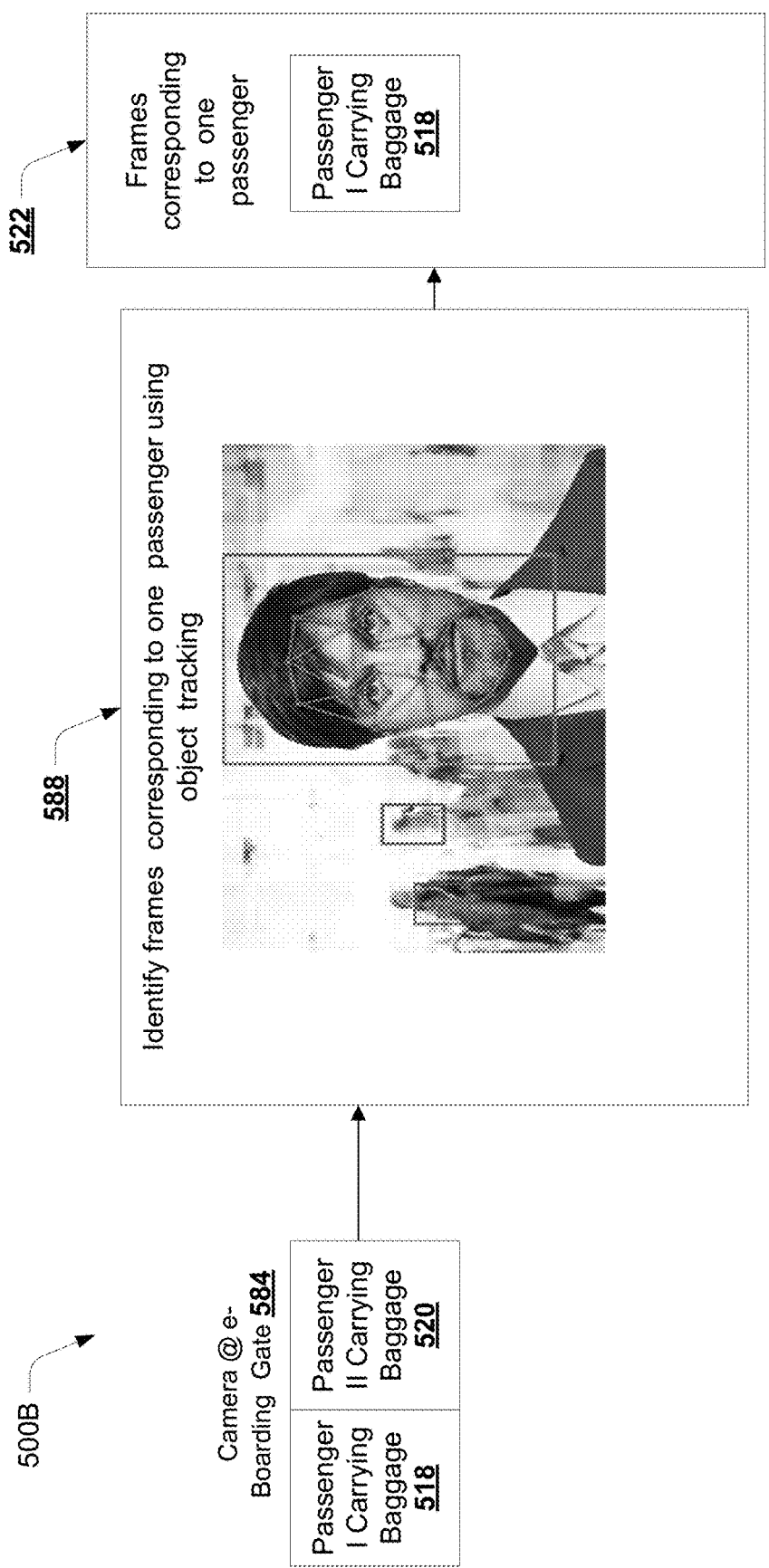
FIG. 5B illustrates a flow diagram for passenger identification for baggage weight prediction using a baggage weight prediction system, according to an example embodiment of the present disclosure.

The system 110 may implement various object tracking techniques described by way of FIG. 5B for the passenger detection, identification & tracking 504. The flow diagram 500A may further include a passenger age and gender detection 506. The system may perform age and gender detection for the passenger I 518 and the passenger II 520 for all extracted frames & average the final results for performing the passenger age and gender detection 506 (explained further by way of FIG. 5E). The flow diagram 500A may further include a passenger outwear detection 508. The system 110 may perform object detection to identify passenger carrying outerwear such as jackets in any frame to perform the passenger outwear detection 508 (explained further by way of FIG. 5F). The flow diagram 500A may further include a baggage detection and numbering 510. The system 110 may perform object detection to detect types and counts of all carry-on bags being carried by the passenger I 518 and the passenger II 520 for all frames (explained further by way of FIG. 5G). The flow diagram 500A may further include a baggage frames extraction & noise reduction 512. The system 110 may identify best reference frames for the detection of passenger & bags and reduce the noise therein (explained further by way of FIG. 5H). The flow diagram 500A may further include a baggage dimension extraction 514 (explained further by way of FIG. 5I), wherein the system 110 may identify dimensions of the baggage from the best frames determined after the baggage frames extraction & noise reduction 512. The flow diagram 500A may further include a cabin baggage weight predictor 516. The cabin baggage weight predictor 516 may create the baggage prediction model 232 and generate the baggage prediction result 250 therefrom as mentioned above.

FIG. 5B illustrates a flow diagram 500B for passenger identification for baggage weight prediction using the baggage weight prediction system 110, according to an example embodiment of the present disclosure. The system 110 may implement the passenger detection, identification & tracking 504 as illustrated in FIG. 5B as an exemplary embodiment of the present disclosure. The flow diagram 500B may include the boarding gate camera 584 for capturing the passenger I518 and the passenger II 520. The boarding gate camera 584 may determine a distance between the passenger I 518 and the passenger II 520 from the boarding gate camera 584. The boarding gate camera 584 may implement an identification 588. The identification 588 may identify frames corresponding to one passenger from the passenger I 518 and the passenger II 520 using object tracking. In an example, the identification 588 may deploy object tracking provided with an OpenCV framework and Dlib filters to actively track an object such as the passenger I 518 and the passenger II 520.

The system 110 may start tracking the passenger when they may first appear in the input feed and then continues to track until the object may move out of the frame. The system 110 may determine depth information to calculate the distance of the object from the camera and identify the objects that may be closest to the camera and the passenger. Therefore, the system 110 may remove additional detections and corresponding noise. The determination of depth information may lead to noise reduction for video processing 502. The identification 588 may lead to a determination 522. The determination 522 may include frames corresponding to a single passenger from the passenger I 518 and the passenger II 520. The frames may include a frameset 518 (frames set have been numbered the same as the passenger I for sake of technical clarity). The frameset 518 may correspond to the passenger I 518. The system 110 may deploy the object tracking technique mentioned herein for implementing various object tracking steps such as the passenger outwear detection 508 and the baggage detection and numbering 510. For the purpose explanation, the frames are explained in reference to the passenger I 518, hereinafter.

Figure 5C:
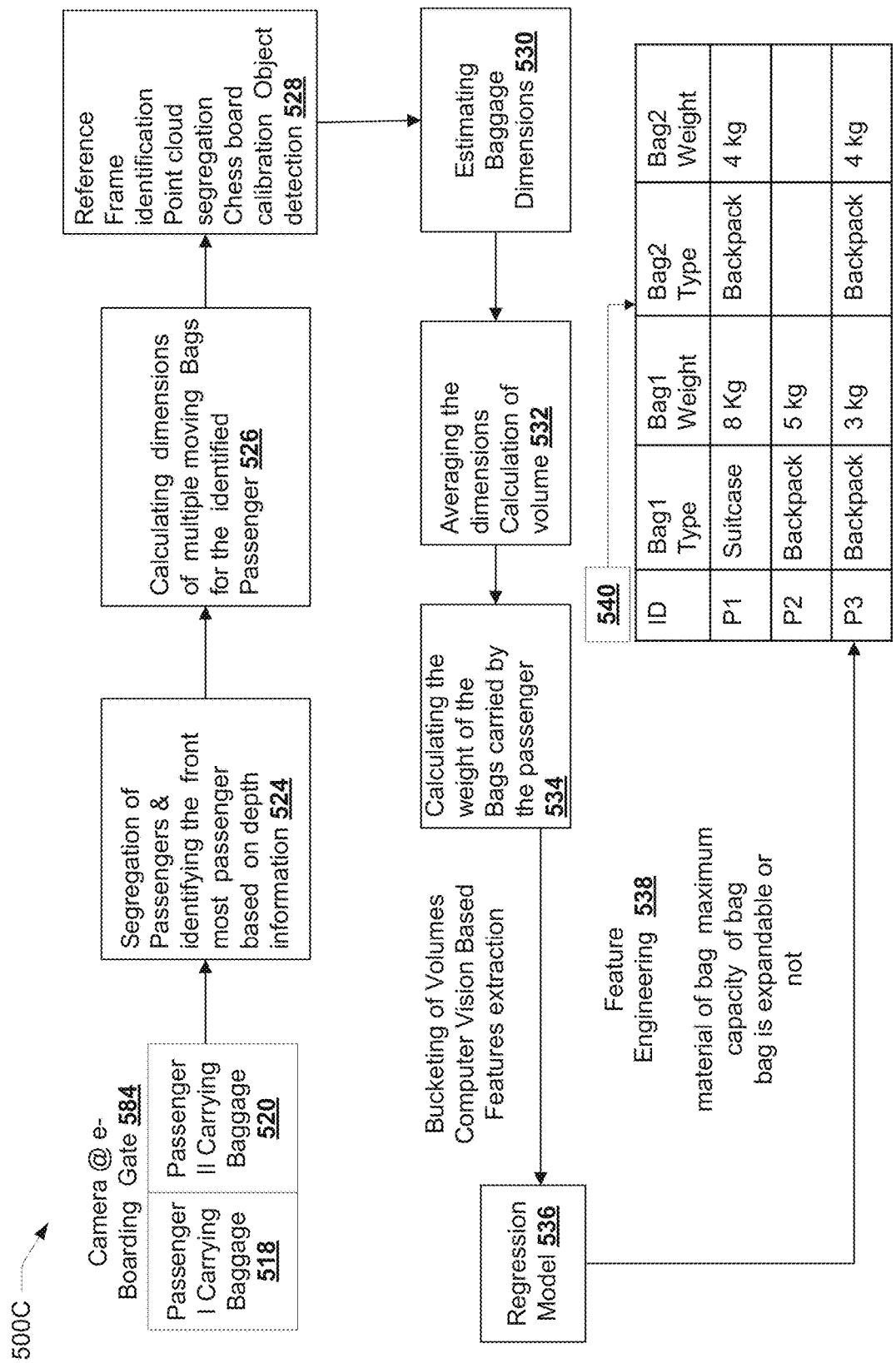
FIG. 5C illustrates a flow diagram for identifying the weight of multiple moving bags for baggage weight prediction using a baggage weight prediction system, according to an example embodiment of the present disclosure.

FIG. 5C illustrates a flow diagram 500C for identifying the weight of multiple moving bags for baggage weight prediction using the baggage weight prediction system 110, according to an example embodiment of the present disclosure. The flow diagram 500C may include the boarding gate camera 584 for capturing the passenger I 518 and the passenger II 520. The flow diagram 500C may include the implementation of a segregation 524. The segregation 524 may include segregation of passengers and identifying the front-most passenger based on depth information. For example, the segregation 524 may include identifying the front-most passenger from among the passenger I 518 and the passenger II 520.

The flow diagram 500C may further include a calculation 526. The calculation 526 may include calculation of dimensions of baggage associated with the identified front-most passenger. The calculation 526 may be implemented by the system 110 by implementing a techniques component 528. The techniques component 528 may include using techniques such as reference frame identification, point cloud segregation, and chessboard calibration object detection (explained further by way of FIG. 5J). The system 110 may further implement an estimation 530. The estimation 530 may include estimating the baggage dimensions based on results obtained by implementing the techniques component 528. The system 110 may perform an averaging function 532, wherein the system 110 may average the dimensions derived by the estimation 530. The system may further perform a calculation 534, wherein the system 110 may calculate the weight of the bag carried by the passenger. The weight may be calculated by implementing a feature engineering based machine learning model 538.

The feature engineering based machine learning model 538 may include extraction of features from video processing 502. The features may include material of the bag, a maximum baggage capacity, expandability of a baggage and the like (explained further by way of FIG. 9A and FIG. 9B). The system 110 may build a regression model 536 from the feature engineering based machine learning model 538. The regression model 536 may be used to create a weight index 540 as illustrated. The weight index 540 may be the baggage weight index 226 mentioned above.

Figure 5D:
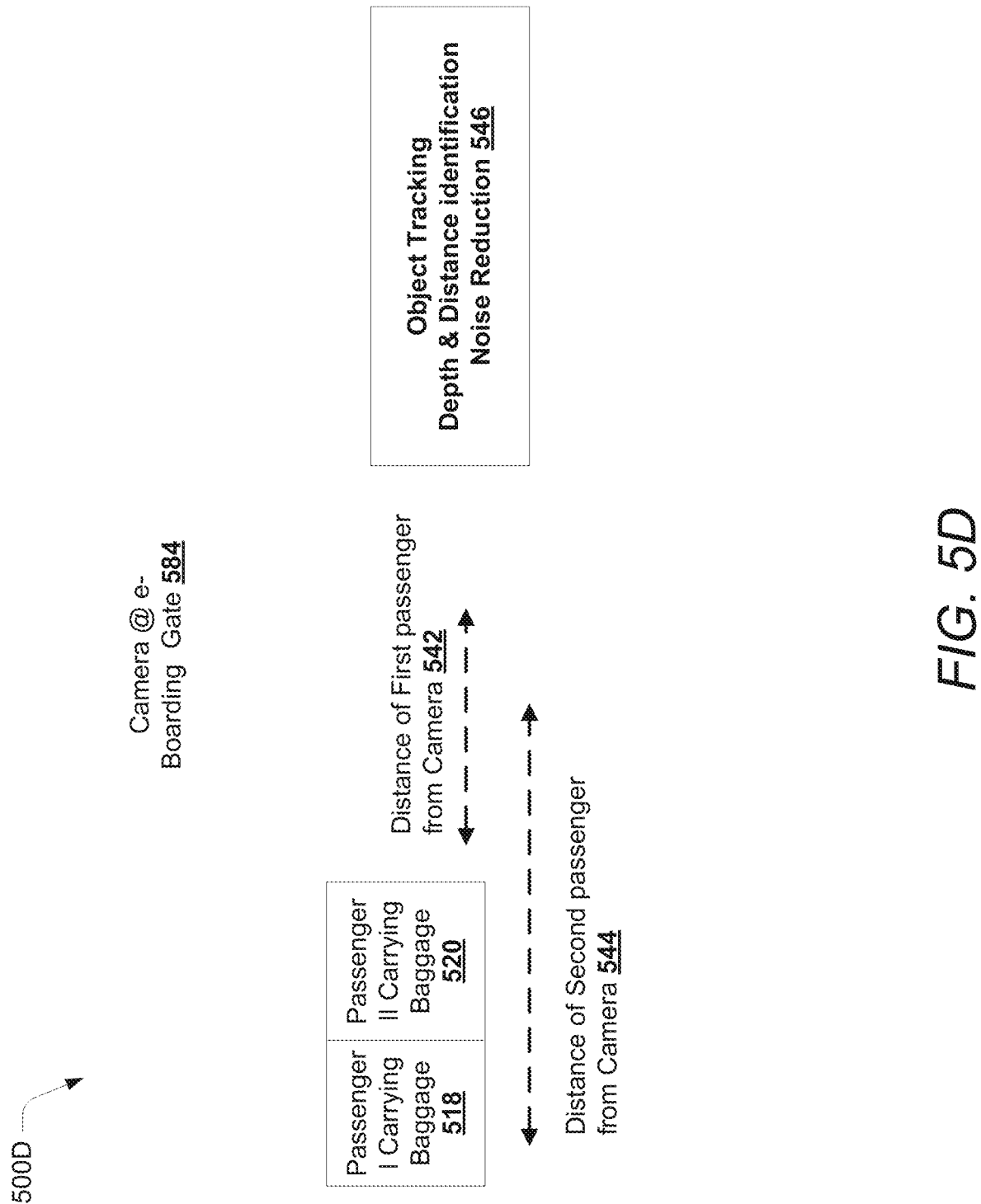
FIG. 5D illustrates a flow diagram for the segregation of passengers for baggage weight prediction using a baggage weight prediction system, according to an example embodiment of the present disclosure.

FIG. 5D illustrates a flow diagram 500D for the segregation of passengers for baggage weight prediction using the baggage weight prediction system 110, according to an example embodiment of the present disclosure. FIG. 5D may illustrate the determination of the depth parameter value mentioned by way of FIG. 1 and FIG. 2. The flow diagram 500D may include the boarding gate camera 584 for capturing the passenger I 518 and the passenger II 520. The system 110 may determine a distance 542 between the boarding gate camera 584 and the passenger II 520. The system 110 may determine a distance 544 between the boarding gate camera 584 and the passenger II 518. The system 110 may implement a depth identification 546. The depth identification 546 may include object tracking (mentioned above), distance and depth identification, and noise reduction. In an example, the system 110 may use a depth camera such as for example, an Intel RealSense D435® for measuring depth information. For example, the passenger II 520 may be standing five feet away from the boarding gate camera 584 with a large red trolley. The passenger I 518 may be standing ten feet away with a small blue trolley. A depth camera may interpret the depth information to accurately predict the dimensions of the small blue trolley and the red trolley. The depth information may be used to reduce the background noise and help extract meaningful features from the input data for implementing the feature engineering based machine learning model 538. The system 110 may identify the passenger II 520 as the front-most passenger based on comparing the distance 542 and the distance 544. The system 110 may implement various steps described by way of FIG. 5C on the front-most passenger.

Figure 5E:
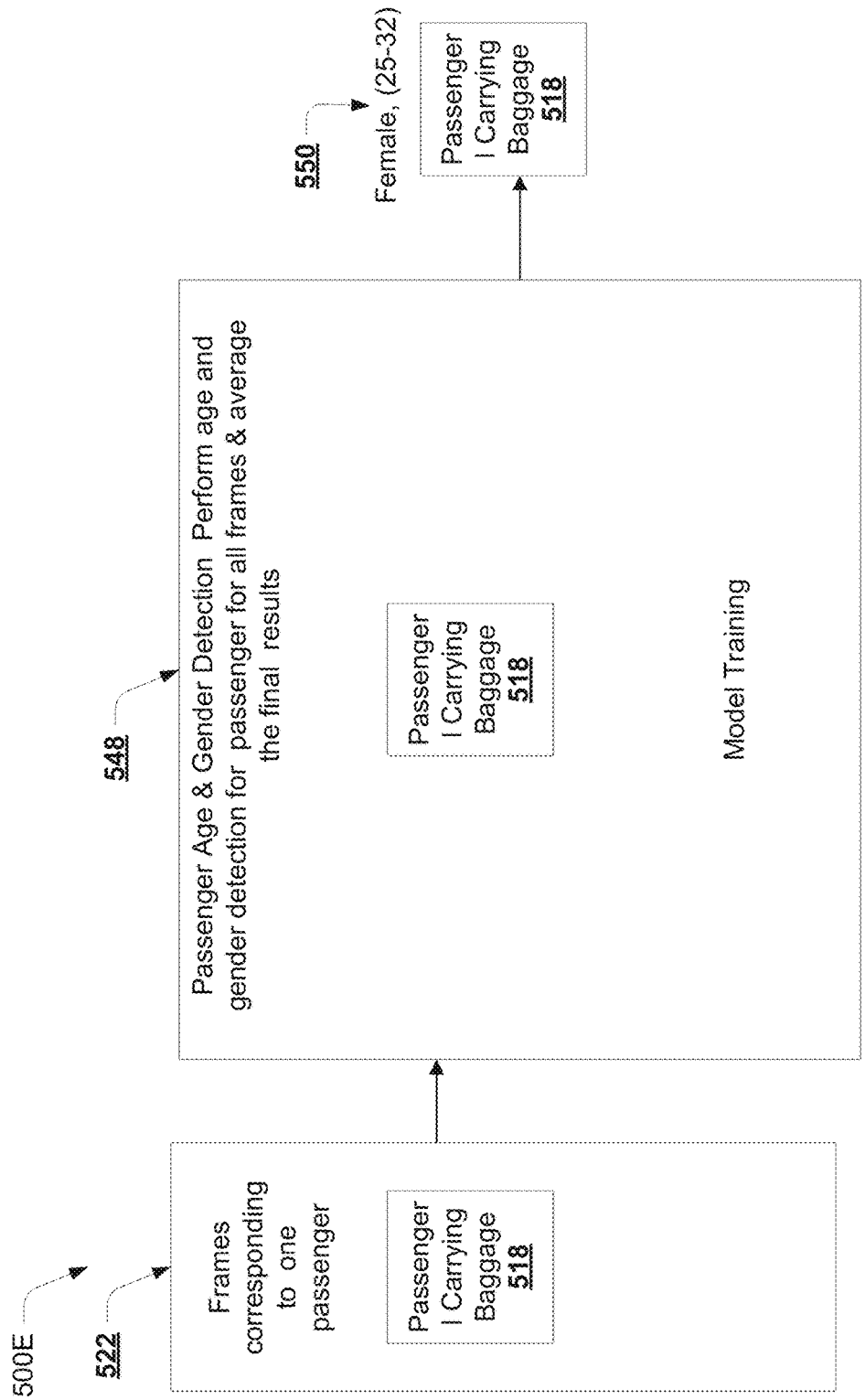
FIG. 5E illustrates a flow diagram for passenger gender detection for baggage weight prediction using a baggage weight prediction system, according to an example embodiment of the present disclosure.

FIG. 5E illustrates a flow diagram 500E for the passenger gender detection for baggage weight prediction using the baggage weight prediction system 110, according to an example embodiment of the present disclosure. The flow diagram 500E may illustrate the passenger age and gender detection 506. The flow diagram 500E may illustrate the determination 522 and the frameset 518. The system may perform a detection 548. The detection 548 may include performing age and gender detection for the passenger I 518 from all frames such as the frameset 518. The system 110 may include averaging the final results of the detection 548. The detection 548 may include the implementation of a machine learning model. In an example, the machine learning model training may be performed on a graphics processing unit (GPU) and an accuracy of 88% may have been achieved on test input feeds. In an example, the GPU may be an Amazon Web Services® (AWS) GPU enabled server. In an example, the detection 548 may identify the passenger I 518 as a female between age 25-32 years as illustrated by block 550.

Figure 5F:
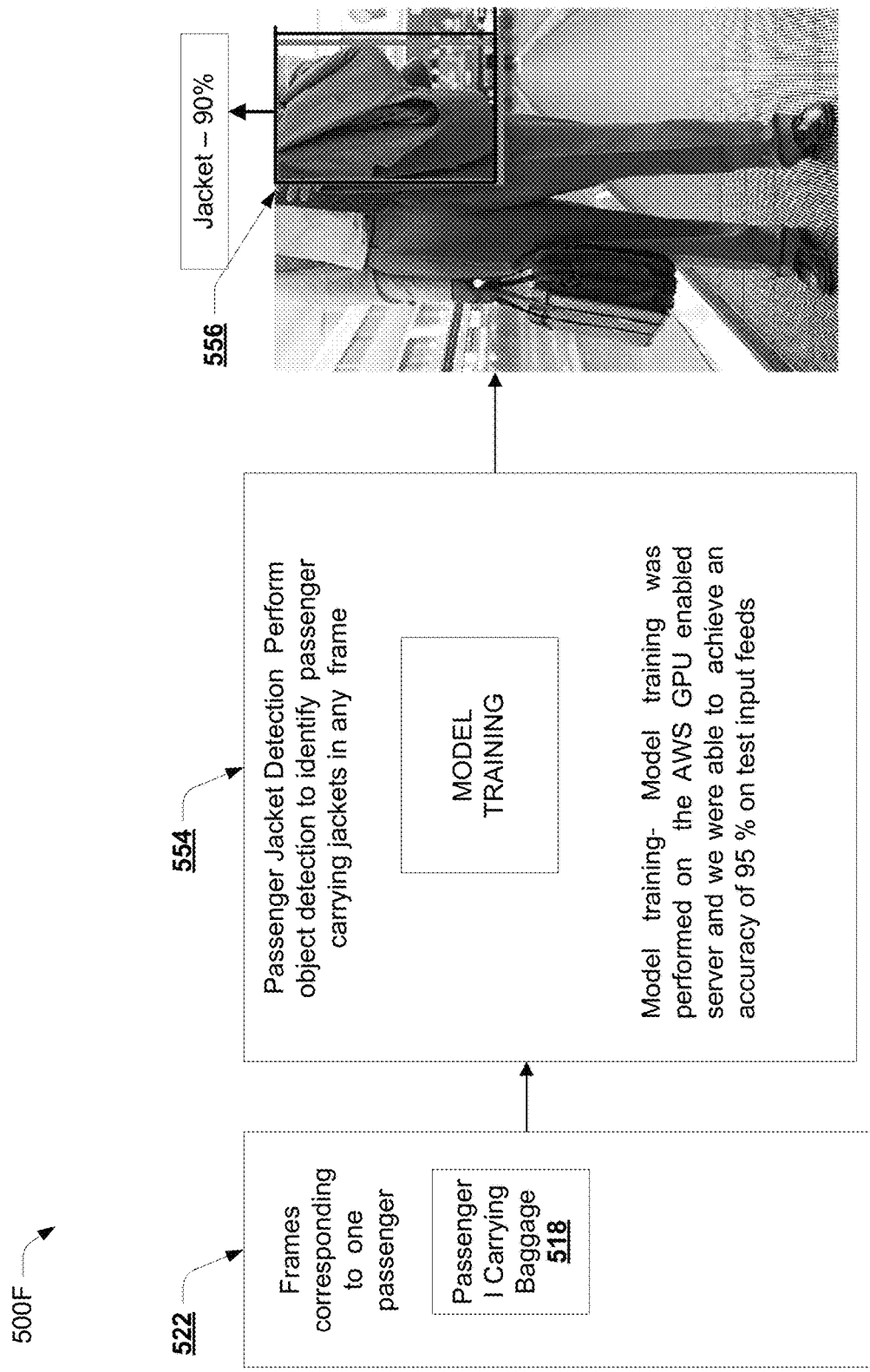
FIG. 5F illustrates a flow diagram for passenger jacket detection for baggage weight prediction using a baggage weight prediction system, according to an example embodiment of the present disclosure.

FIG. 5F illustrates a flow diagram 500F for passenger jacket detection for baggage weight prediction using the baggage weight prediction system 110, according to an example embodiment of the present disclosure. The flow diagram 500F may illustrate passenger outwear detection 508. The passenger outwear detection 508 may include the detection of outwear such as a jacket. The flow diagram 500E may illustrate the determination 522 and the frameset 518. The system may perform a detection 554. The detection 554 may be the passenger outwear detection 508. The system may perform object detection to identify a passenger carrying jackets in any of the frames such as the frameset 518. The detection 554 may include the implementation of a machine learning model. In an example, the machine learning model training may be performed on a graphics processing unit (GPU) and an accuracy of 95% may have been achieved on test input feeds. In an example, the GPU may be an Amazon Web Services® (AWS) GPU enabled server. In an example, the detection 554 may identify a passenger such as the passenger I 518 as carrying a jacket with an accuracy of, for example, 90% as illustrated by block 556.

Figure 5G:
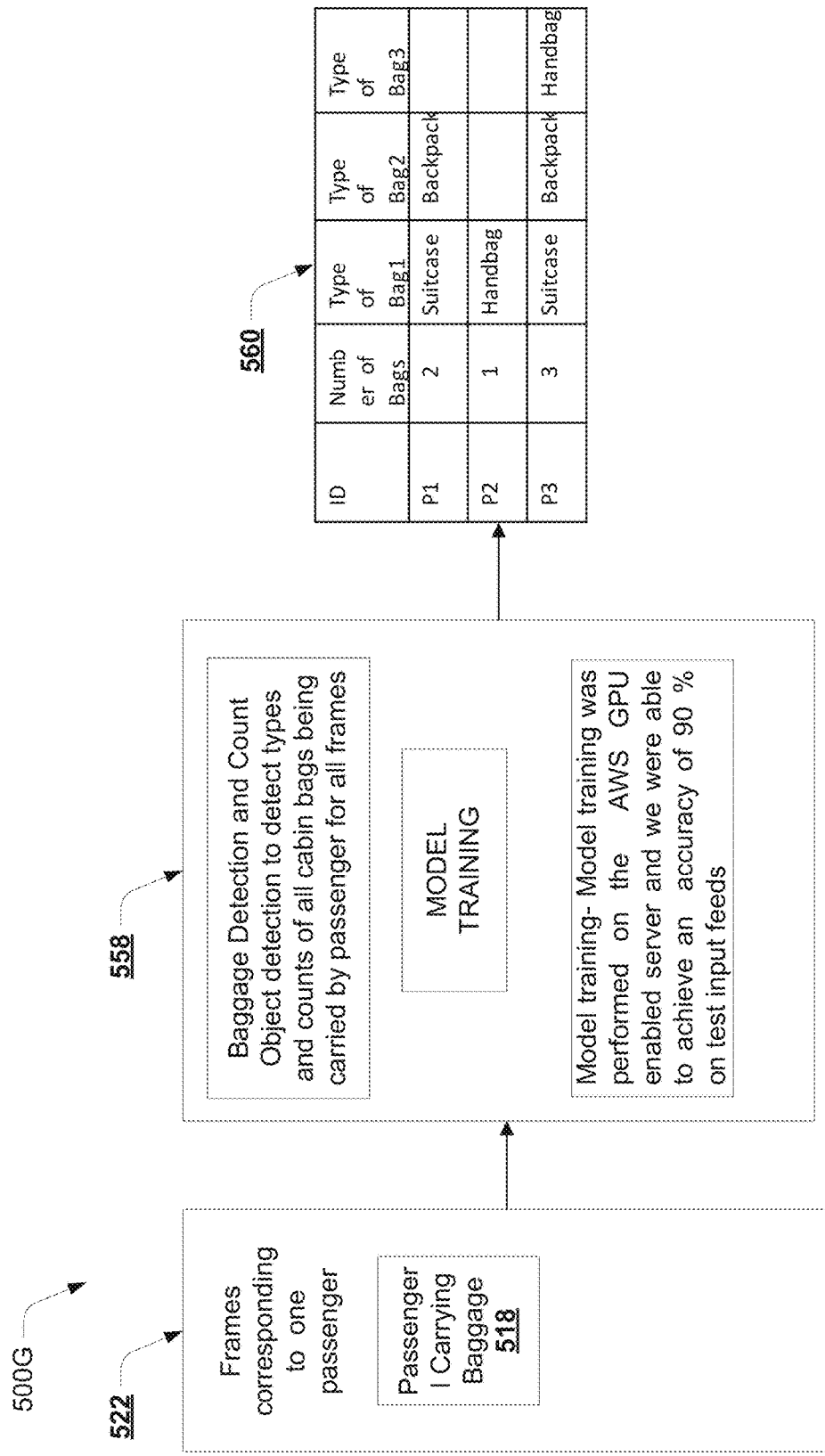
FIG. 5G illustrates a flow diagram for baggage detection and numbering for baggage weight prediction using a baggage weight prediction system, according to an example embodiment of the present disclosure.

FIG. 5G illustrates a flow diagram 500G for baggage detection and numbering for baggage weight prediction using the baggage weight prediction system 110, according to an example embodiment of the present disclosure. The flow diagram 500G may illustrate the baggage detection and numbering 510. The flow diagram 500G may illustrate the determination 522 and the frameset 518. The system may perform a detection 558. The detection 558 may be the baggage detection and numbering 510. The system 110 may perform object detection to detect types and counts of all carry-on bags being carried by the passenger I 518 for all frames such as the frameset 518. The detection 558 may include the implementation of a machine learning model. In an example, the machine learning model training may be performed on a graphics processing unit (GPU) and an accuracy of 90% may have been achieved on test input feeds. In an example, the GPU may be an Amazon Web Services® (AWS) GPU enabled server. In an example, the detection 558 may identify baggage as illustrated by a table 560 in FIG. 5G.

Figure 5H:
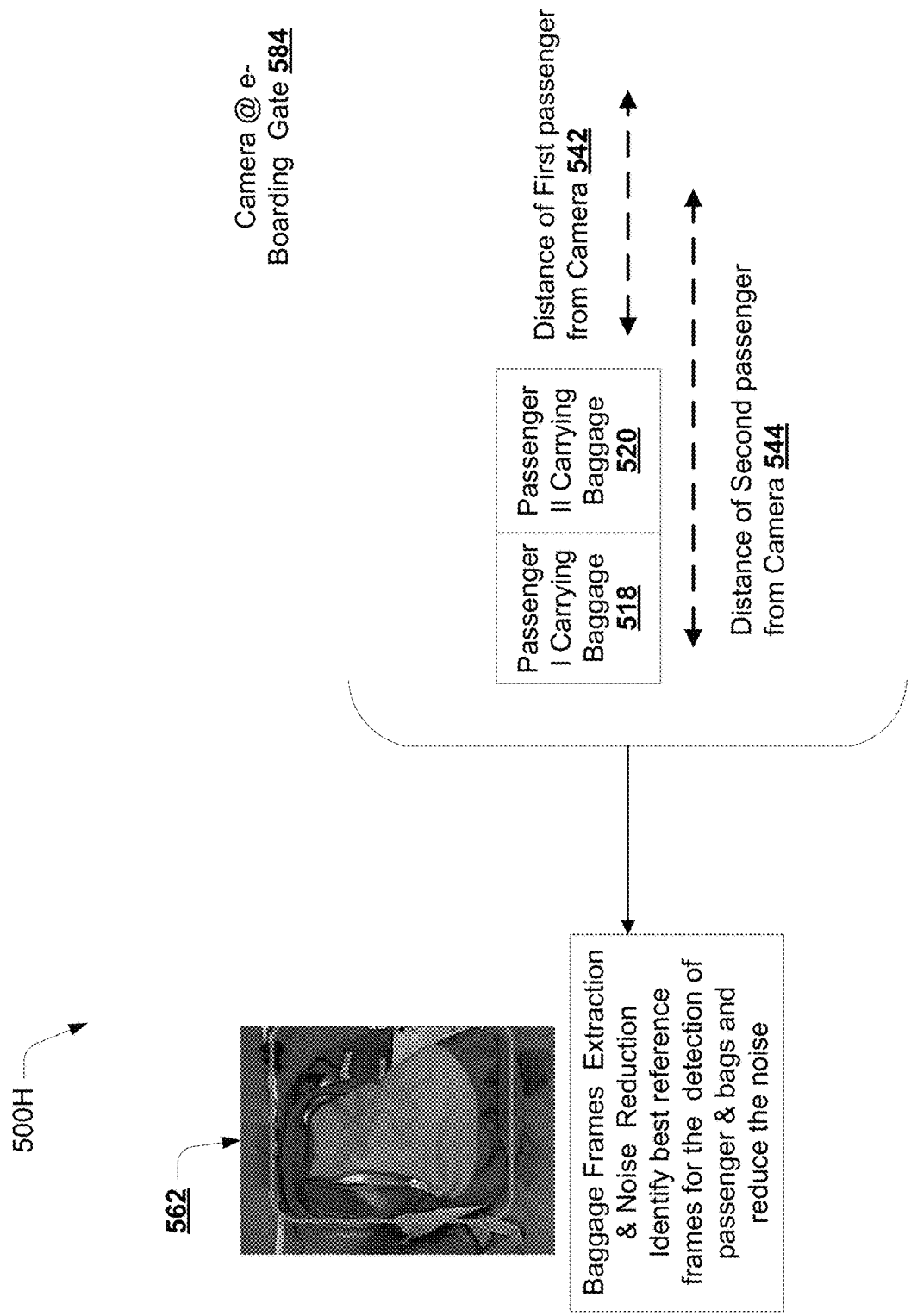
FIG. 5H illustrates a flow diagram for baggage frame extraction and noise reduction for baggage weight prediction using a baggage weight prediction system, according to an example embodiment of the present disclosure.

FIG. 5H illustrates a flow diagram 500H for baggage frame extraction and noise reduction for baggage weight prediction using the baggage weight prediction system 110, according to an example embodiment of the present disclosure. The baggage frames extraction & noise reduction 512 The flow diagram 500H may illustrate the boarding gate camera 584 for capturing the passenger I 518, the passenger II 520, the distance 542, and the distance 544. The baggage frames extraction & noise reduction 512 may include an extraction 562. The extraction 562 may include identifying the best reference frames for the detection of passenger & baggage and reduce the noise. At a time of boarding passengers may be stacked one behind the other it may become important to suppress the background information and reduce the noise. The system 110 may use multiple image filters along with depth information to identify the background information in the input feed. The system 110 may calculate the distance of the passenger from the camera such as the distance 544 and the distance 542. The system 110 may use the distance information to detect the reference frame for the passenger and the baggage associated with them. The noise reduction may improve the accuracy of object detection and dimension prediction machine learning models such as point cloud generation.

Figure 5I:
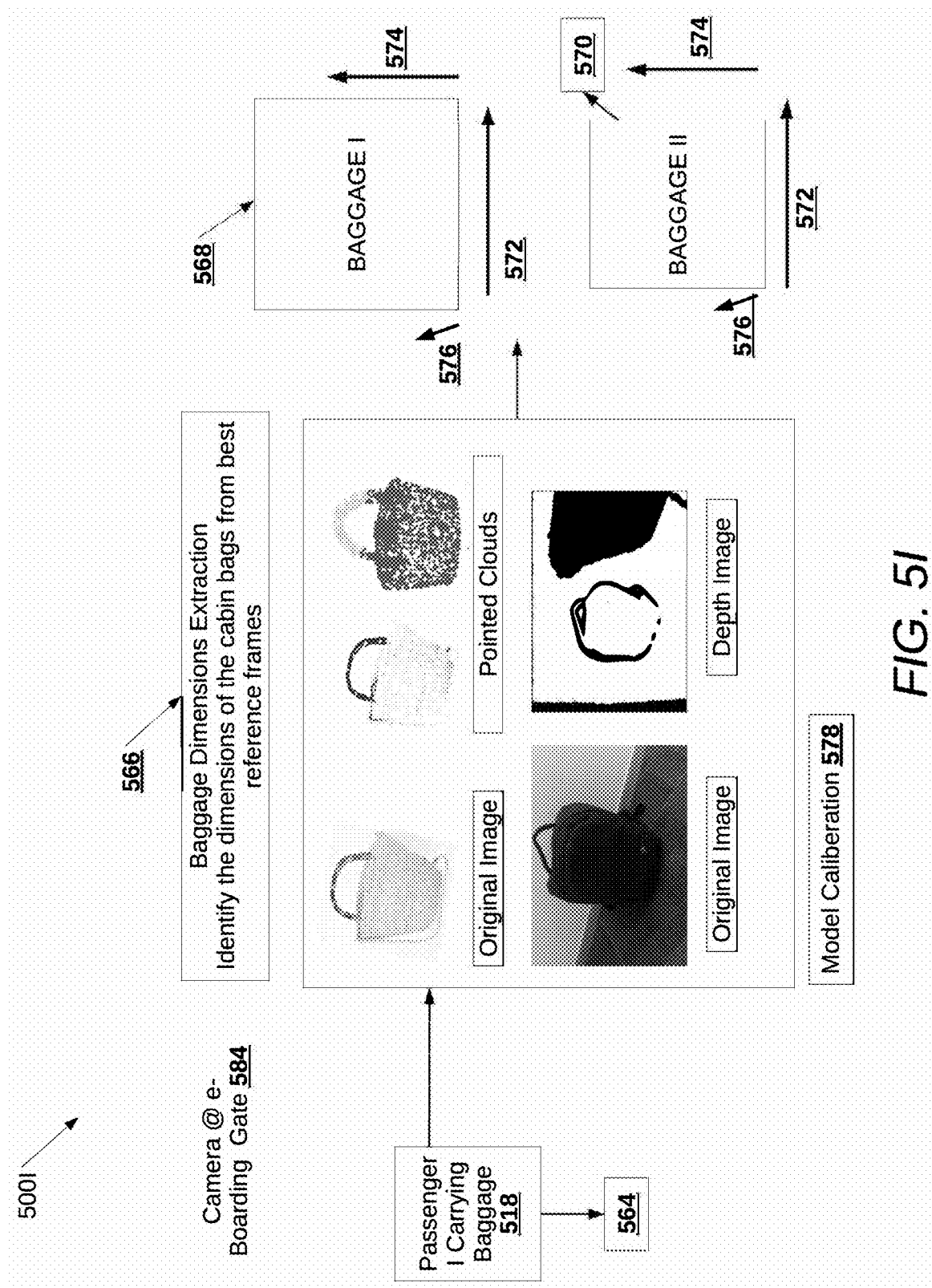
FIG. 5I illustrates a flow diagram for baggage dimension extraction for baggage weight prediction using a baggage weight prediction system, according to an example embodiment of the present disclosure.

FIG. 5I illustrates a flow diagram 500I for baggage dimension extraction for baggage weight prediction using the baggage weight prediction system 110, according to an example embodiment of the present disclosure. The flow diagram 500I may illustrate baggage dimension extraction 514. The flow diagram 500I may include the boarding gate camera 584 for capturing the passenger I 518. The passenger I 518 may be carrying a baggage 564. The baggage dimension extraction 514 may include an identification 566. The identification 566 may identify the dimensions of the carry-on baggage 236 from the best reference frames. The system 110 may implement machine learning techniques for the point cloud generation, and depth images generation for performing the identification 566. The system 110 may require a model calibration 578 for the point cloud generation, and depth images generation. The model calibration 578 may include the implementation of techniques such as chessboard image calibration (explained by way of FIG. 5J). The identification 566 may lead to the identification of the dimension value 224 for the baggage 564 that may be associated with the passenger I 518. The baggage 564 that may be associated with the passenger I 518 may be identified as a baggage I 568 and a baggage II 570. The baggage I 568 may be identified to include a length dimension value 572, a width dimension value 576, and a height dimension value 574. The baggage II 570 may be identified to include the length dimension value 572, the width dimension value 576, and the height dimension value 574. The data analyzer 140 may update the length dimension value 572, the width dimension value 576, and the height dimension value 574 in the baggage dimension index 222.

Figure 5J:
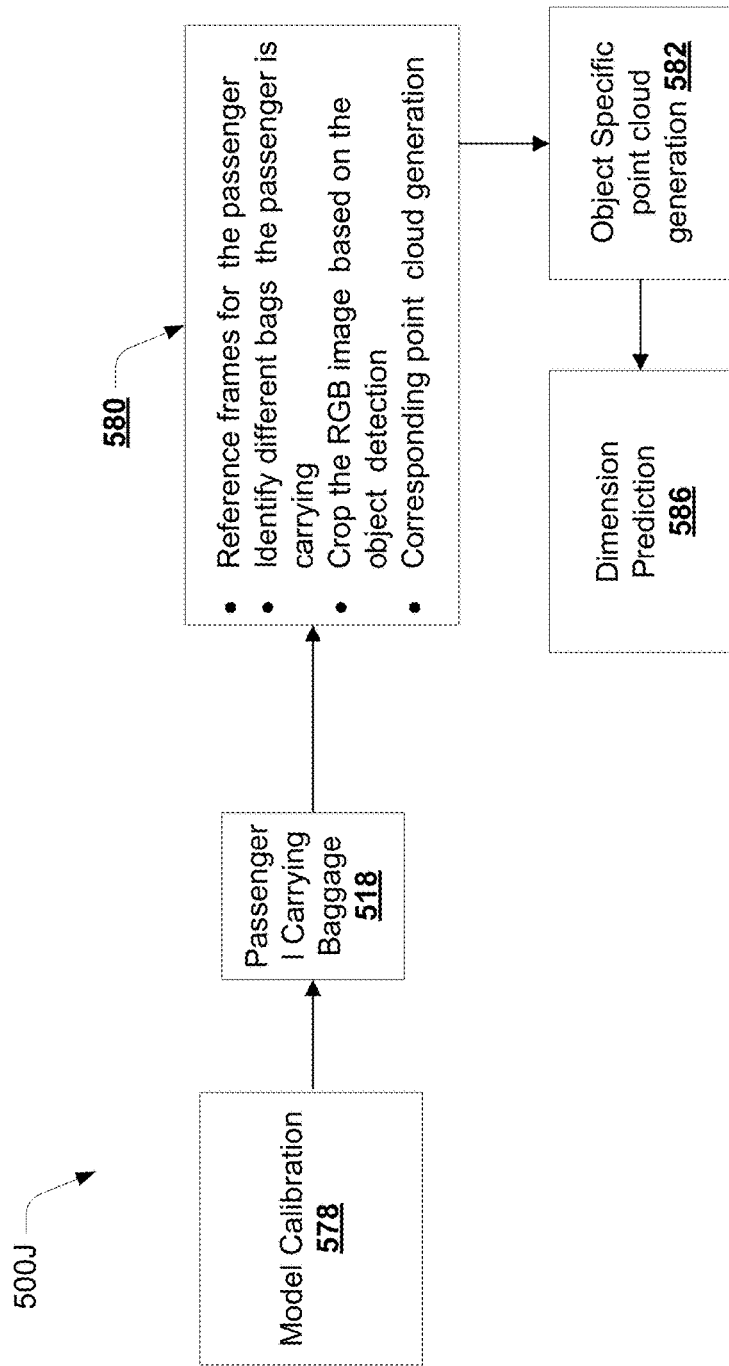
FIG. 5J illustrates a flow diagram for calculation of dimension for multiple moving bags for baggage weight prediction using a baggage weight prediction system, according to an example embodiment of the present disclosure.

FIG. 5J illustrates a flow diagram 500J for calculation of dimension for multiple moving bags for baggage weight prediction using the baggage weight prediction system 110, according to an example embodiment of the present disclosure. The flow diagram 500J illustrates point cloud generation and chessboard calibration mentioned above. As mentioned above, the model calibration 578 may include the implementation of techniques such as chessboard image calibration. The model calibration 578 may include a camera placed on a tripod to keep it stationary and provide clear depth & Red Green Blue (RGB) frames. A physical chessboard may be kept at the same distance at which the object whose dimensions to be predicted may be placed. In an example, the same distance may be the distance 544. In an example, the same distance may be the distance 542.

The system 110 may perform the model calibration 578 to accurately predict the dimensions of the multiple moving objects in an efficient way so that a root mean square error value may be minimum. The model calibration 578 may be required so that the intrinsic parameters of the camera may be aligned with extrinsic parameters. In an example, the model calibration 578 may include the chess board calibration. The chessboard calibration may include taking the reference frames for calculation when the object may be at the same distance from the camera at which the chessboard may be kept while calibrating. The model calibration 578 may include increasing a maximum range of prediction calculated using the chessboard calibration to increase the accuracy of the alignment & synchronization of depth and RGB frames. The chessboard calibration may be required for the point cloud generation.

The model calibration 578 may include using various combinations of depth thresholds in the post-processing filters along with the varied size of the chessboard squares to improve the accuracy of depth calculation of the object. The model calibration 578 may include clipping of point cloud so that they may remain within the range of calibration performed at the beginning. This may further reduce the error rate and improved accuracy. As mentioned above, the system 110 may perform frame extraction on the plurality of images 216 for determining the plurality of baggage attributes 214. Different frames may provide different outcomes due to changes in angles, moving passengers, and the like. The model calibration 578 may obtain the counts and type of baggage for all the frames of a passenger, the final results may be obtained by taking the statistical means and modes.

The system 110 may calculate the number of objects by taking the mode of all the frames. The system may take a mode of the frequency of different types of bags and then take the top objects satisfying the total number of objects results. To accurately detect & predict the dimensions of the bags, the system 110 may transfer learning by taking a pre-trained model trained on over 80 categories. Then this trained model may be retrained using various images of the bags, suitcase, and backpacks. The training images may be augmented to mirror the scenario of a transportation operation by taking various angles, rotations & blurred effect into considerations. The model calibration 578 may apply various color optimizations and post-processing filters to the input images to make the model robust.

The system 110 may, in an example, implement a computer vision (CV) model 280 after the model calibration 578 on the video captured by the boarding gate camera 584 for the passenger I 518. The computer vision model 580 may extract reference frames for the passenger. The computer vision model 580 may identify different bags the passenger is carrying. The computer vision model 580 may crop the RGB image based on object detection. The computer vision model 580 may implement a point cloud generation 282. The point cloud generation 282 may include the generation of an object-specific point cloud image. The object-specific point cloud image may be used for a dimension prediction 586 (also described above). The dimension prediction 586 may happen based on the model calibration 578. The CV techniques mentioned above may extract dimensions of carry-on baggage carried by various passengers such as the passenger I 518 to create the baggage dimension index 222. Further, the CV techniques may create the baggage weight index 226 therefrom.

Figure 6:
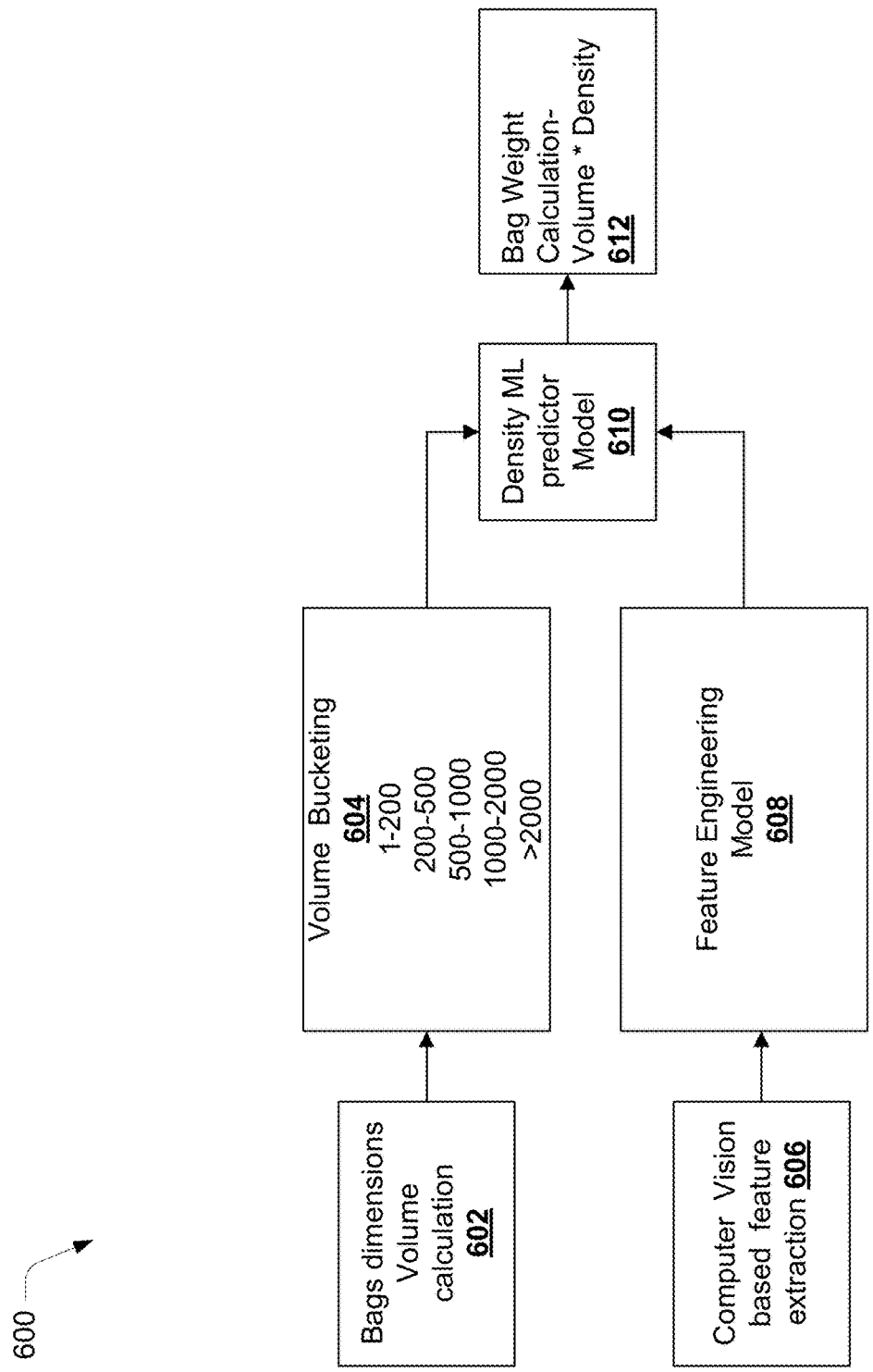
FIG. 6 illustrates a flow diagram for calculation of weight for multiple moving bags for baggage weight prediction using a baggage weight prediction system, according to an example embodiment of the present disclosure.

FIG. 6 illustrates a flow diagram 600 for calculation of weight for multiple moving bags for baggage weight prediction using the baggage weight prediction system 110, according to an example embodiment of the present disclosure. Any of the components of the system 110 may be referred to herein. The flow diagram 600 illustrates calculation of weight for multiple moving bags for baggage weight prediction using the video feed based medium. The flow diagram 600 includes a calculation 602. The calculation 602 may be the baggage dimension extraction 514 mentioned above. The calculation 602 may lead to a volume bucketing 604. The volume bucketing may include segregation of the dimension value 224 of each baggage into various class intervals as illustrated.

The flow diagram 600 may include a feature extraction 606. The feature extraction 606 may be the feature engineering-based machine learning model 538. The feature engineering-based machine learning model 538 may include extraction of features from video processing 502. The features may include material of the bag, a maximum baggage capacity, expandability of a baggage and the like (explained further by way of FIG. 9A and FIG. 9B). The system 110 may build a regression model 536 from the feature engineering-based machine learning model 538. The feature extraction 606 may lead to implementation of a feature engineering model 608. The feature engineering model 608 may include identification of the plurality of baggage attributes 214. The system may amalgamate the class intervals from the volume bucketing 604 and the plurality of baggage attributes 214 from the feature engineering model 608 to build a density predictor model 610. The density predictor model 610 may implement a baggage weight calculation 612. The baggage weight calculation 612 may determine the baggage weight index 226 and further facilitate determination of the predicted weight 244 for each of the items in the predicted baggage 234.

Figure 7:
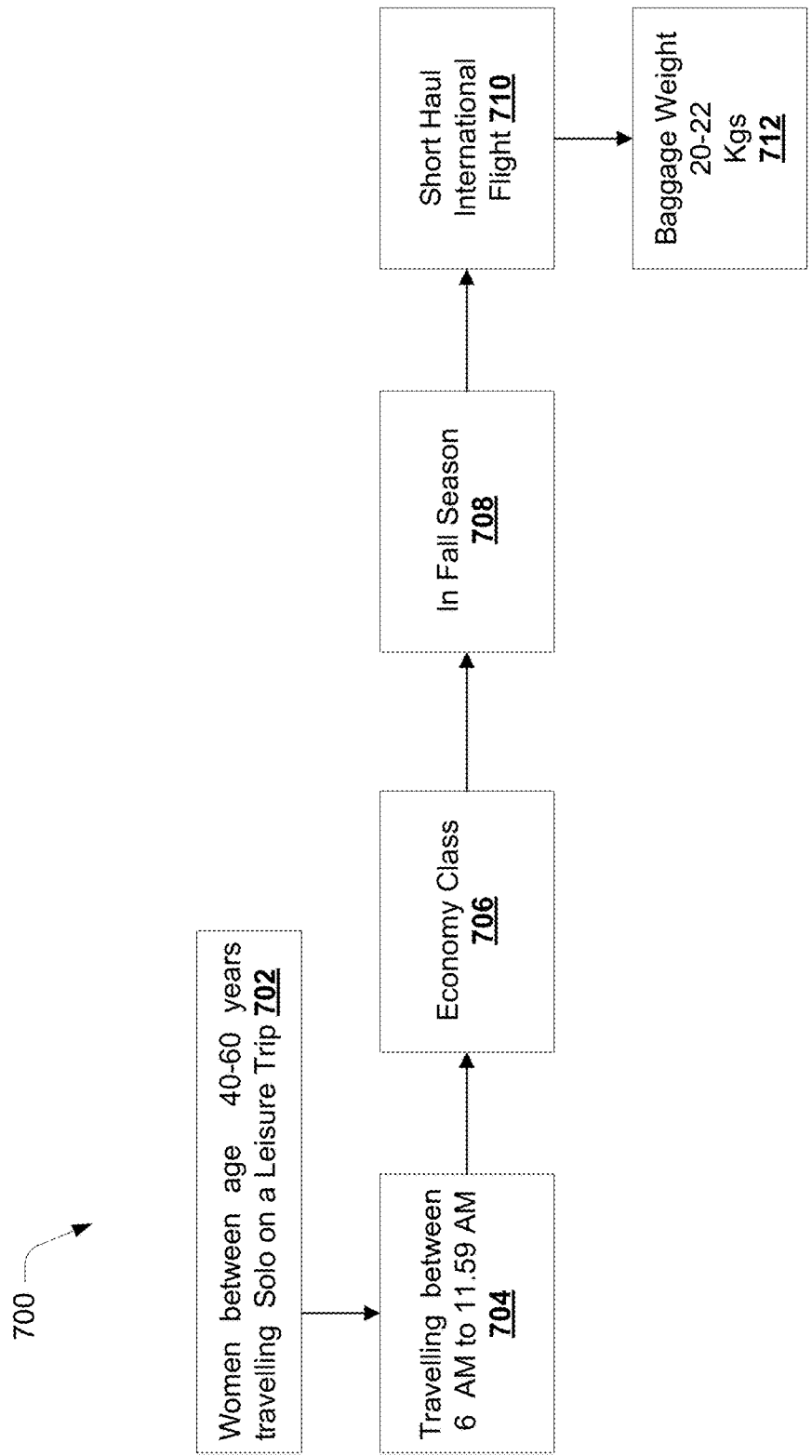
FIG. 7 illustrates a flow diagram for an exemplary baggage weight prediction for a future transportation operation using a baggage weight prediction system, according to an example embodiment of the present disclosure.

FIG. 7 illustrates a flow diagram 700 for an exemplary baggage weight prediction for a future transportation operation using the baggage weight prediction system 110, according to an example embodiment of the present disclosure. Any of the components of the system 110 may be referred to herein. The flow diagram 700 may illustrate a passenger 702. The passenger 702 may be a woman between age 40-60 years travelling solo on a leisure trip. The system 110 may identify a travel time 704. The travel time 704 may be morning between 6 AM-11:59 AM. The system 110 may identify a travel class 706. The travel class 706 may be an economy class. The system 110 may identify a travel season 708. The travel season 708 may be a fall season. The system 110 may identify a travel duration 710. The travel duration 710 may be a short duration. The system may process the information from various details such as gender, age, travel purpose and the like for the passenger 702 as mentioned above and the system may process the travel time 704, the travel class 706, the travel season 708, and the travel duration 710 as mentioned above. The system generate a prediction 712. The prediction 712 may include a baggage weight prediction for the passenger 702. For example, the baggage weight prediction for the passenger 702 may be a baggage weight of 20-22 kg.

Figure 8:
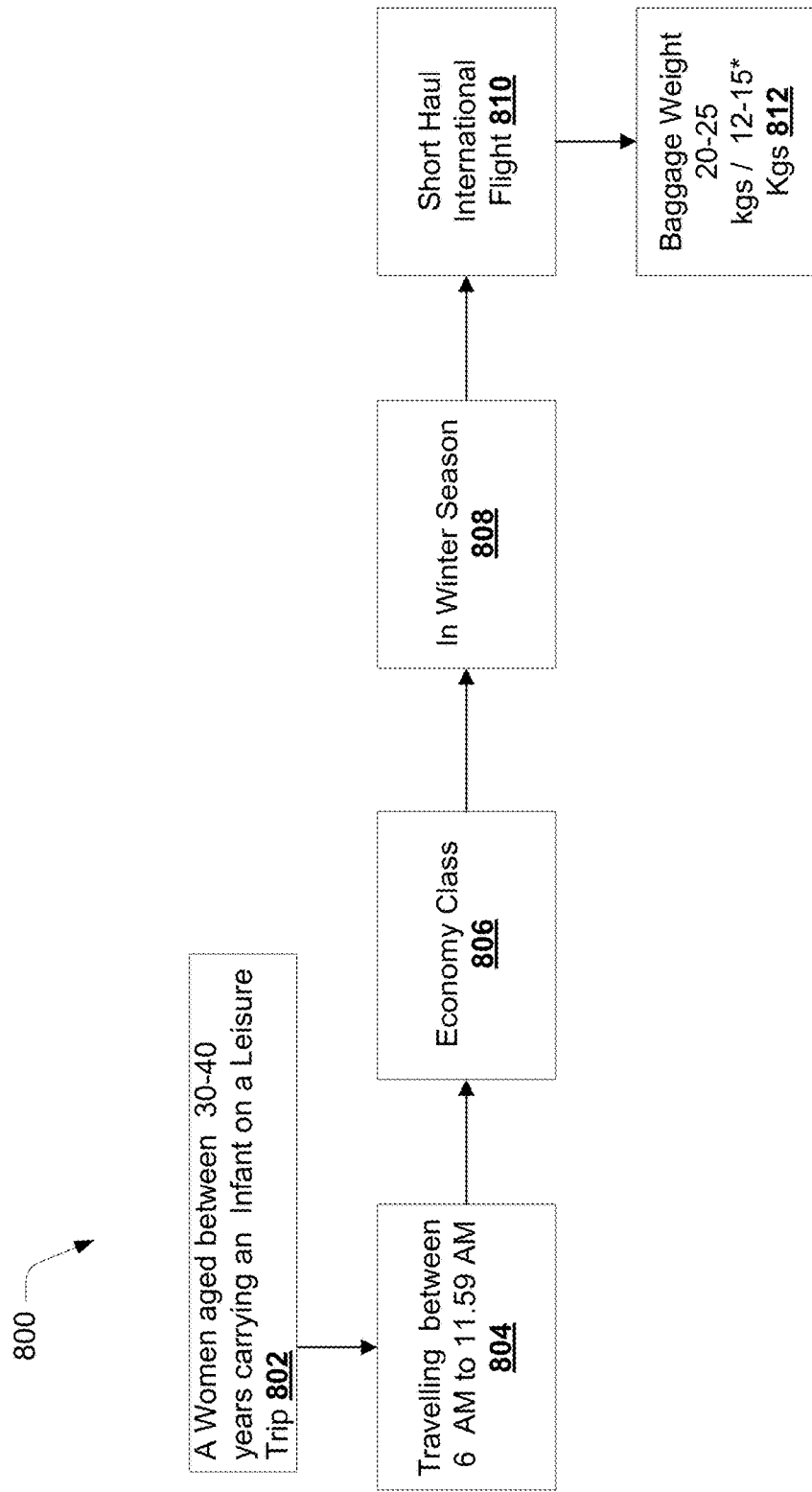
FIG. 8 illustrates a flow diagram for an exemplary baggage weight prediction for a future transportation operation using a baggage weight prediction system, according to an example embodiment of the present disclosure.

FIG. 8 illustrates a flow diagram 800 for an exemplary baggage weight prediction for a future transportation operation using the baggage weight prediction system 110, according to an example embodiment of the present disclosure. Any of the components of the system 110 may be referred to herein. The flow diagram 800 may illustrate a passenger 802. The passenger 802 may be a woman between age 30-40 years carrying an infant on a leisure trip. The system 110 may identify a travel time 804. The travel time 804 may be morning between 6 AM-11:59 AM. The system 110 may identify a travel class 806. The travel class 806 may be an economy class. The system 110 may identify a travel season 808. The travel season 808 may be a winter season. The system 110 may identify a travel duration 810. The travel duration 810 may be a short duration. The system may process the information from various details such as gender, age, travel purpose and the like for the passenger 802 as mentioned above and the system may process the travel time 804, the travel class 806, the travel season 808, and the travel duration 810 as mentioned above. The system generate a prediction 812. The prediction 812 may include a baggage weight prediction for the passenger 802. For example, the baggage weight prediction for the passenger 802 may be a baggage weight of 20-25 kg and carry-on baggage weight 248 to be 12-15 kg.

Figure 9A:
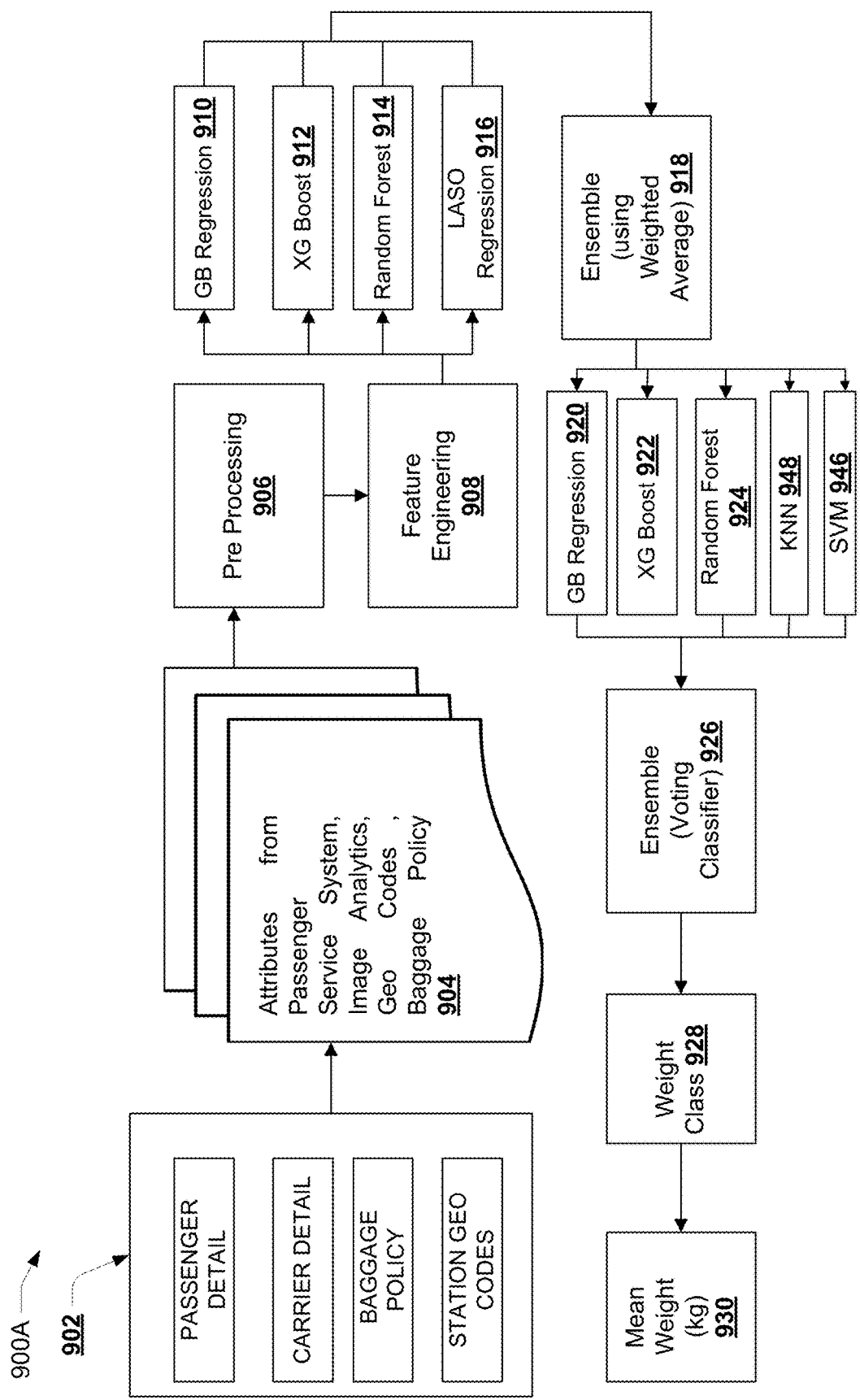
FIG. 9A illustrates a flow diagram for a passenger baggage weight prediction using a baggage weight prediction system, according to an example embodiment of the present disclosure.

FIG. 9A illustrates a flow diagram 900A for a passenger's baggage weight prediction using the baggage weight prediction system 110, according to an example embodiment of the present disclosure. Any of the components of the system 110 may be referred to herein. The flow diagram 900A illustrates the feature engineering-based machine learning model for determining the carry-on baggage weight 248. The system 110 may implement the artificial intelligence component 202 and the machine learning operation for passenger baggage weight prediction. The system 110 may have access to a plurality of data sources 902. The plurality of data sources 902 may include various data sources comprising personal detail about a passenger, various data sources comprising station codes associated with the transportation operation, data sources associated with carrier details and carrier baggage policy. As mentioned above, the system 110 may implement the artificial intelligence component 202 to determine the plurality of passenger attributes 210 and the plurality of baggage that may be stored into a baggage insight storage 904. The baggage insight storage 904 may be the baggage database 220. The artificial intelligence component 202 may receive passenger information such as "Booking Reference Number", "Seat Number", "Travel Purpose", "Travel Duration", "Arrival and Departure time", "Passenger Gender", "Passenger Type code", "Passenger Age", "Origin and Destination station codes", "Frequent traveler Info", "Travel Day", and the like from various internal databases accessible to an organization associated with the transportation operation.

The artificial intelligence component 202 may recognize the information classified under "Booking Reference Number", "Seat Number", "Travel Purpose", "Travel Duration", "Arrival and Departure time", "Passenger Gender", "Passenger Type code", "Passenger Age", "Origin and Destination station codes", "Frequent traveler Info", "Travel Day", and the like as the plurality of passenger attributes 210. The data collector 130 may implement the artificial intelligence component 202 on the data from the plurality of data sources 902 to determine various secondary features. For example, the artificial intelligence component 202 may convert existing categorical variables such as "Booking Reference Number", "Seat Number", "Travel Purpose", "Travel Duration", "Arrival and Departure time", "Passenger Gender", "Passenger Type code", "Passenger Age", "Origin and Destination station codes", "Frequent traveler Info", "Travel Class", "Travel Day", and the like to numeric variables for deriving new categorical variables. For example, from the "Travel Duration" the data collector 130 may derive "Long Haul", "Short Haul" or "Medium Haul" was derived. In an example, if "Travel Duration" may be 0-3 hours then the "short haul" derivative may be defined, if "Travel Duration" may be 3-6 hours then the "Medium Haul" may be defined, and if "Travel Duration" may be 6 hours and above "Long Haul" may be defied. The categorical variable "Passenger Gender" may converted to a numeric variable such as a zero (0) value may be attributed to "Passenger Gender" being "Female" and a one (1) value may be attributed to "Passenger Gender" being "Male".

The "Passenger Age" categorical variable may be derived by a date of birth of a passenger. The artificial intelligence component 202 may divide the "Passenger Age" in age bins such as for example, 0-7 years, 7-14 years, 14-21 years and the like. The "Origin and Destination station codes" may be derived from central libraries such as IATA. The "Travel Class" categorical variable may be used to define an economy class, a premium economy class, a first class, and a business class. The "Travel Type" categorical variable may be derived using "Booking Reference Number" and "Travel Purpose" as Friends, Family, Solo or Colleagues. In an example, an infant may be tagged to a passenger using Booking Reference Number and PTC code. The "travel time" may be classified further using departure time as Early morning, Morning, evening and Late Night. The "Travel Purpose" and "Frequent Traveler Information" may be categorical variables as mentioned above and hence may be converted to assumed variable by the artificial intelligence component 202. A set of weekday and weekend variables may be created using the "Travel Day" of a week. A Monday/Friday variable may be created to check if there is a correlation with the carry-on baggage 236 specifically on these days exists. The weather information may be derived using the date of travel. Similarly, the artificial intelligence component 202 may derive various other measurable variables, from the categorical variables listed above. The artificial intelligence component 202 may identify the categorical variables listed above and the variables derived therefrom as the plurality of passenger attributes 210. As mentioned above, the artificial intelligence component 202 may store the data from the plurality of passenger attributes 210 into the baggage insight storage 904.

The artificial intelligence component 202 may implement a pre-processing 906 to determine various outliers in the data associated with the plurality passenger attributes. The data collector 130 may implement the pre-processing 906 in form of an exploratory data analysis to check for any discrepancy in the data from the plurality of data sources 902. The data collector 130 may create various graphs to detect outliers in data and also to check for any correlation in the data (exemplary graphs illustrated by FIGS. 10-14). The pre-processing 906 may include missing values treatment & imputation, multi-variate plots construction to identify outliers (an exemplary plot illustrated in FIG. 15), and outlier data treatment.

The artificial intelligence component 202 may further implement a feature extraction 908. The feature extraction 908 may include correlating the plurality of passenger attributes 210 with a baggage weight proclivity based on various features from the plurality of passenger attributes 210. For example, the Age Buckets may be created from the data to find if there may be any correlation of baggage weight with passenger age. If an adult may be carrying an infant, they may carry more weight and they may be allowed to carry little extra baggage. this feature may be derived by grouping booking reference number and seat numbers. The travel type may be derived to check if a passenger's fall under a solo travel and family or friends travel. This may again be categorized into work solo, leisure solo, work group, friends' group, and the like. In an example, if the future transportation operation may be air travel, then the flight category may be derived such as domestic flight or international flight by getting the geocode country for the origin and destination. The travel season may be derived using a set of season variables, such as a spring season may be identified for all travel dates from March 1 to May 31, a summer season may be identified for all travel dates from June 1 to August 31, a fall (autumn) season may be identified for all travel dates from September 1 to November 30, and a winter season may be identified for all travel dates from December 1 to February 28 (February 29 in case of a leap year). The passenger gender may be considered to find if it may be correlated to the carry-on baggage 236. The maximum allowed cabin bag weight may be treated as a variable. The artificial intelligence component 202 may implement a one hot encoding on the plurality of passenger attributes 210.

The machine learning operation may include implementation of various models on the results from the feature extraction 908. The machine learning models may include a Gradient Boost (GB) Regression model 910, an XG Boost Model 912, a Random Forest Model 914, and a LASSO Regression Model 916. In accordance with various embodiments of the present disclosure, the Gradient Boost (GB) Regression model 910, the XG Boost Model 912, the Random Forest Model 914, and the LASSO Regression Model 916 may be used to map the plurality of passenger attributes 210 with the plurality of baggage attributes 214 to identify the baggage pattern 218. The Gradient Boost (GB) Regression model 910 may be a machine learning technique for regression and classification of data. The Gradient Boost (GB) Regression model 910 may produces a prediction model in the form of an ensemble of prediction models. The XG Boost Model 912 may be a decision-tree-based ensemble machine learning algorithm that uses a gradient boosting framework. The Random Forest Model 914 may be an ensemble technique capable of performing both regression and classification of data with the use of multiple decision trees. The LASSO Regression Model 916 may be a linear regression model that may be based on data shrinkage. The data shrinkage may refer to a phenomena where data values may converge towards a central point, such as a mean value of the data.

In accordance with various embodiments of the present disclosure, various machine learning models may be used to map the plurality of passenger attributes 210 with the plurality of baggage attributes 214. For example, various multilinear regression models may be built using various features from the feature engineering model 608 and an accuracy of 51% may be achieved. In an example, Support Vector Regression (SVM) regression model may be built using various features from the feature engineering model 608 using a radial basis function kernel and an accuracy of 74% may be achieved. In an example, a logistic classification model may be built using various features from the feature engineering model 608 and an accuracy of 72% may be achieved. In an example, SVM classification model may be built using radial basis function kernel and using various features from the feature engineering model 608 and an accuracy of 85% may be achieved.

The machine learning operation may further include implementing a calculation 918. The calculation 918 may generate an ensemble on different regression models using weighted average methods. The calculation 918 may include computing a weighted average of results from the implementation of the Gradient Boost (GB) Regression model 910, the XG Boost Model 912, the Random Forest Model 914, and the LASSO Regression Model 916. In an example, the machine learning operation may create a baggage prediction classification model based on results from the calculation 918 based on best models amongst the Gradient Boost (GB) Regression model 910, the XG Boost Model 912, the Random Forest Model 914, and the LASSO Regression Model 916. The baggage prediction classification model created by the machine learning operation may include a GB Regression classification model 920, an XG boost classification model 922, a Support Vector Machine (SVM) model 946, a K Nearest Neighbor (KNN) model 948 and a random forest classification model 924. In an example, the machine learning operation may select a best model from the amongst the GB Regression classification model 920, the XG boost classification model 922, the SVM model 946, the KNN model 948 and the random forest classification model 924 based on implementing a K-fold cross validation technique. The machine learning operation may generate a voting classifier 926 to ensemble results from the GB Regression classification model 920, the XG boost classification model 922, the SVM model 946, the KNN model 948 and the random forest classification model 924 based on their highest probability of chosen class from the classification created by each model as the output.

As mentioned above, the system 110 may implement the machine learning operation to predict weights for carry-on baggage 236 for plurality of passengers 208 and build the baggage weight index 226. Subsequently, the system 110 may implement the machine learning operation to predict weight for the predict baggage associated with the plurality of future passengers 240 based on the baggage weight index 226. The machine learning operation may generate separate classification and hypothesis for both situations. In accordance with various embodiments of the present disclosure, the machine learning operation may implement the Gradient Boost (GB) Regression model 910, the XG Boost Model 912, the Random Forest Model 914, and the LASSO Regression Model 916 and generate the GB Regression classification model 920, the XG boost classification model 922, the SVM model 946, the KNN model 948 and the random forest classification model 924 both for generating the baggage weight index 226 and for determining the predicted weight 244 for the predicted baggage 234.

The machine learning operation may deploy a hypothesis that "weight of a bag is proportional to the volume of the bag which means its dimensions—length, breadth and height". As mentioned above by way of various figures, the data collector 130 may implement the artificial intelligence component 202 and the machine learning operation to extract dimensions of baggage based on feature extraction from the plurality of images 216 and determination of the baggage dimension index 222 therefrom. The artificial intelligence component 202 and the machine learning operation may deploy a machine learning model for generating the baggage weight index 226 based on the hypothesis that "weight of a bag is proportional to the volume of the bag which means its dimensions—length, breadth and height". Thus, the system 110 may extract the dimension value 224 based on feature extraction from the plurality of images 216, and implement the machine learning operation described above to determine the predicted weight 244 for the predicted baggage 234.

The machine learning model used herein may capture for example, three aspects of the carry-on baggage 236 to get an estimate of the carry-on baggage weight 248. The three aspects may be a size aspect, a type aspect, and a material aspect. The size aspect, the type aspect, and the material aspect may be pre-defined into the machine learning model. The machine learning model may classify the size aspect into for example, three classes namely, small size, medium size, and large size. The machine learning model may classify the type aspect into for example, four classes namely, trolley type, backpack type, suitcase type, and miscellaneous type. The machine learning model may classify the material aspect into for example, five classes namely, plastic material, nylon material, cloth material, and the like. For the exemplary pre-defined aspects there may be three sizes, five materials and four types of bags, there may be a total of three*four*five=sixty combinations ("3×4× 5=60 combinations"). The machine learning model may determine an average weight for each of the sixty combinations. The machine learning model may be trained according the model calibration 578 described above.

The machine learning operation may deploy a hypothesis that "Overall weight of the baggage going on a future flight can be predicted based on the historical data for the same". As mentioned above by way of various figures, the modeler 150 may implement the machine learning operation to create the baggage prediction model 232 and determine the carry-on baggage weight 248 therefrom. The machine learning operation may deploy a machine learning model for generating the carry-on baggage weight 248 based on the hypothesis that "Overall weight of the baggage going on a future flight can be predicted based on the historical data for the same".

The machine learning model used herein may capture various aspects of the carrier to get an estimate of the combined carry-on & checked baggage weight. In an example, various aspects may include destination, seasonality, time of the day, weather, and the like (various aspects mentioned above by way of the plurality of passenger attributes 210). For the exemplary pre-defined aspects there may be for example, three destination types, five time-slices, five weather types and four seasons, there may be a total of three*four*five*five=three hundred combinations ("3×4×5× 5=300 combinations"). The machine learning model may determine influencing factors based on historical data to be collected for reference for each of the three hundred combinations. The machine learning model may be trained to find the best influencing factors for the future transportation operation to determine the overall baggage weight going on to a carrier.

The machine learning operation may implement various regression and classification models mentioned above on the classifications generated by the machine learning models mentioned above for various hypothesis. The machine learning operation may derive a weight class 928 and a mean weight 930 based on the voting classifier 926. The mean weight 930 may be the predicted weight 244 for the predicted baggage 234 associated with the future transportation operation.

Figure 9B:
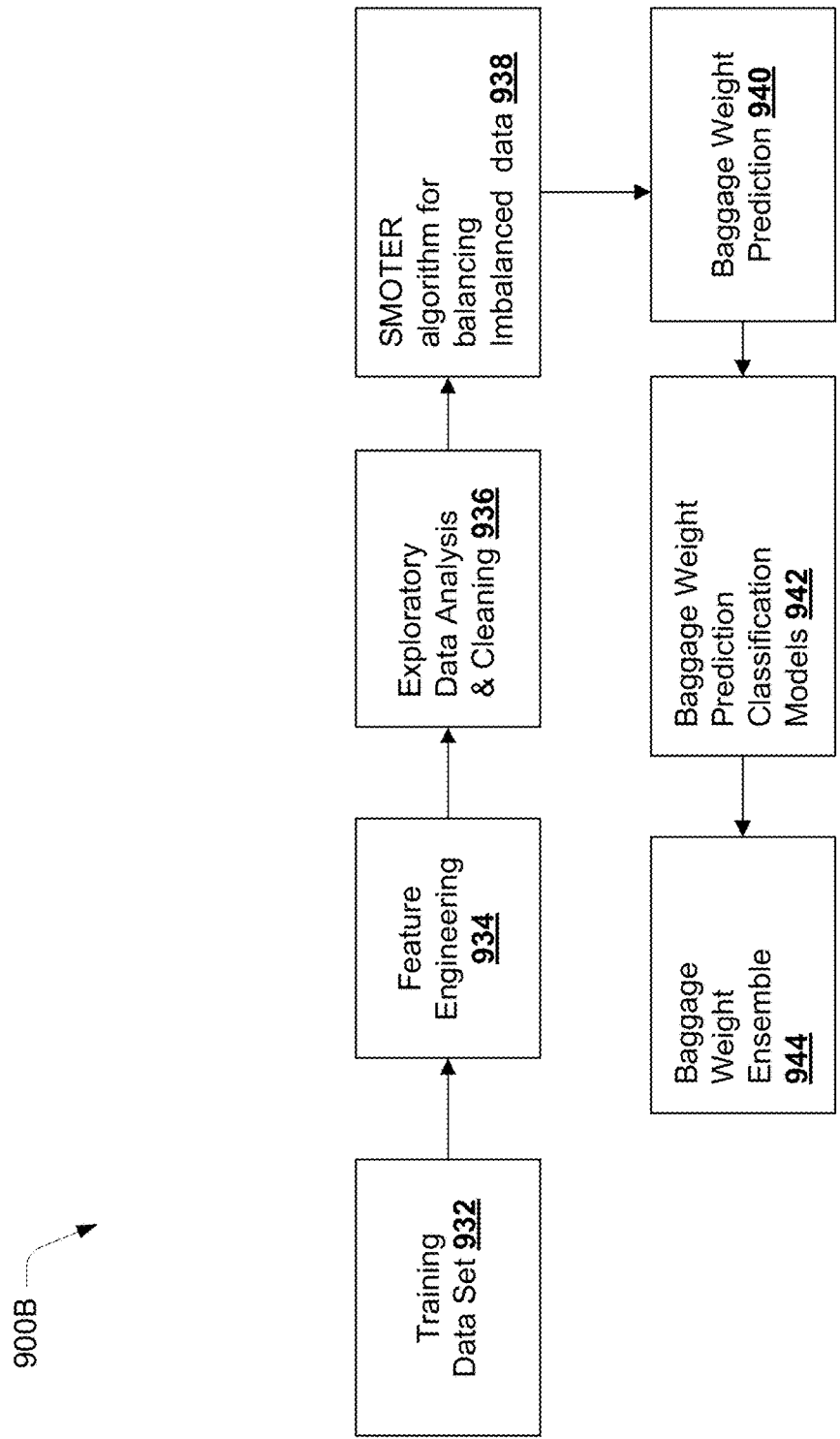
FIG. 9B illustrates a training framework flow diagram for a passenger baggage weight prediction using a baggage weight prediction system, according to an example embodiment of the present disclosure.

FIG. 9B illustrates a training framework flow diagram 900B for a passenger baggage weight prediction using the baggage weight prediction system 110, according to an example embodiment of the present disclosure. Any of the components of the system 110 may be referred to herein. The machine learning model may be trained by implementing various supervised learning techniques. An exemplary technique may be illustrated in FIG. 9B. The flow diagram 900B may include a training dataset 932. The artificial intelligence component 202 may implement a feature engineering 934 on the training dataset 932. The feature engineering 934 may same as the feature extraction 908 mentioned above. The machine learning model may further implement an exploratory data analysis and cleaning 936 on the results from the feature engineering 934. The exploratory data analysis and cleaning 936 may include techniques mentioned by way of pre-processing 906.

The machine learning operation may implement an algorithm 938 for balancing imbalanced data after the exploratory data analysis and cleaning 936. In an example, the algorithm 938 may include a SmoteR algorithm may combine under-sampling of the frequent classes in a classification with over-sampling of the minority class in the classification. The machine learning model may further create a set of baggage weight prediction models 940 (mentioned by way of FIG. 9A). The machine learning model may further create a set of baggage weight prediction classification models 942 (mentioned by way of FIG. 9A). The machine learning model may generate a baggage weight ensemble 944 that may be based on the voting classifier 926.

Figure 10:
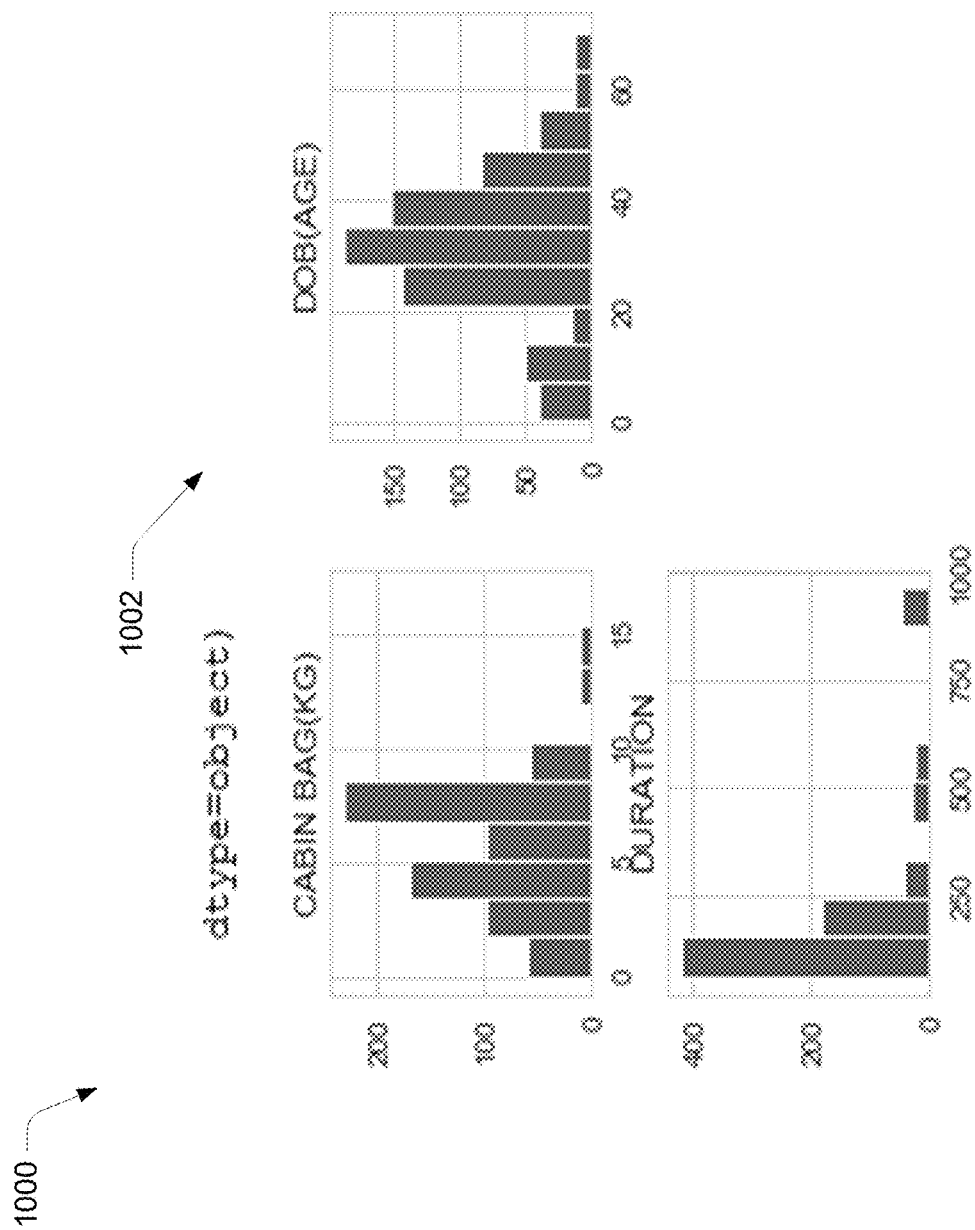
FIG. 10 illustrates a pictorial representation for a bivariate data analysis amongst a carry-on baggage weight and an exemplary factor from a plurality of passenger attributes associated with a passenger for baggage weight prediction using a baggage weight prediction system, according to an example embodiment of the present disclosure.

FIG. 10 illustrates a pictorial representation 1000 for a bivariate data analysis amongst a carry-on baggage weight 248 and an exemplary factor from a plurality of passenger attributes 210 associated with a passenger for baggage weight prediction using the baggage weight prediction system 110, according to an example embodiment of the present disclosure. Any of the components of the system 110 may be referred to herein. The pictorial representation 1000 illustrates various histograms of raw data for the plurality of passengers 208. The plurality of passenger attributes 210 considered by the pictorial representation 1000 may be a passenger age as indicated by a passenger data of birth, a travel duration, and a carry-on baggage weight 248 from the baggage weight index 226.

Figure 11:
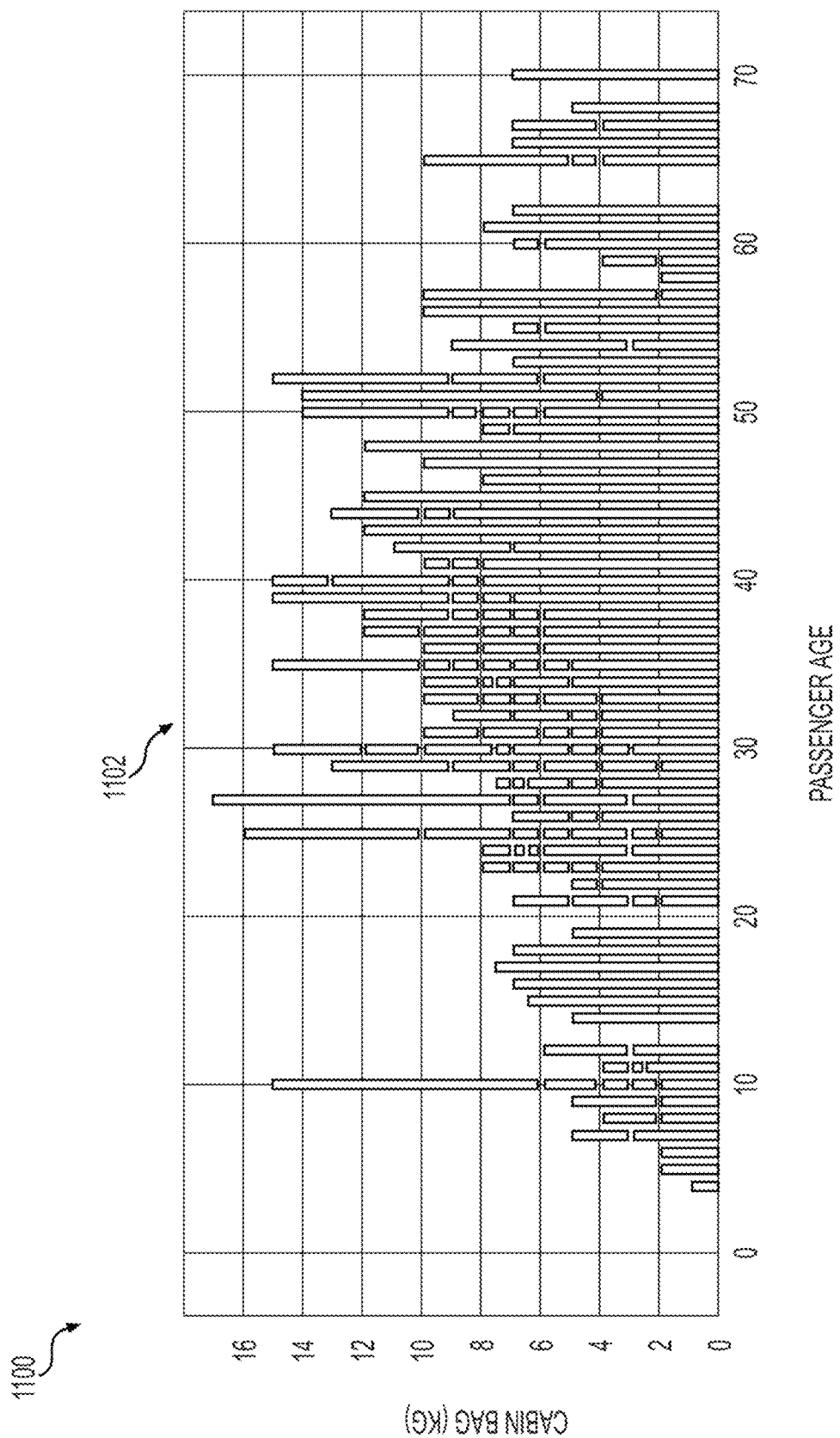
FIG. 11 illustrates a pictorial representation for a bivariate data analysis amongst a carry-on baggage weight and an exemplary factor from a plurality of passenger attributes associated with a passenger for baggage weight prediction using a baggage weight prediction system, according to an example embodiment of the present disclosure.

FIG. 11 illustrates a pictorial representation 1100 for a bivariate data analysis amongst a carry-on baggage weight 248 and an exemplary factor from a plurality of passenger attributes 210 associated with a passenger for baggage weight prediction using the baggage weight prediction system 110, according to an example embodiment of the present disclosure. Any of the components of the system 110 may be referred to herein. The pictorial representation 1100 illustrates a histogram of raw data for the plurality of passengers 208. The plurality of passenger attributes 210 considered by the pictorial representation 1100 may be a passenger age as indicated by a passenger data of birth mapped with the carry-on baggage weight 248 from the baggage weight index 226. The pictorial representation 1100 may indicate class interval values for the carry-on baggage 236 that may be associated with the passenger age. For example, the pictorial representation 1100 may facilitate determination of the carry-on baggage weight 248 for a particular age group passenger.

Figure 12:
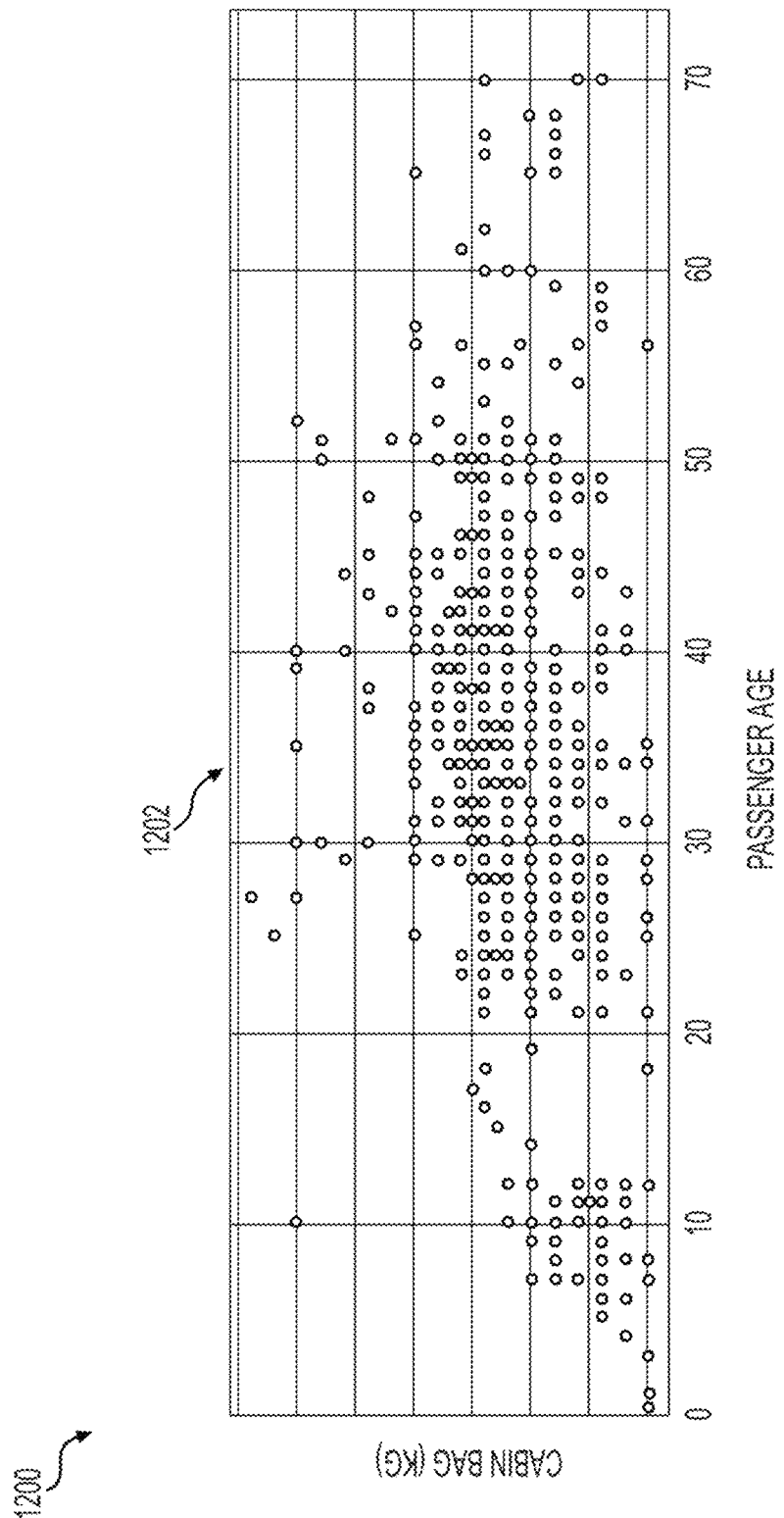
FIG. 12 illustrates a pictorial representation for a bivariate data analysis amongst a carry-on baggage weight and an exemplary factor from a plurality of passenger attributes associated with a passenger for baggage weight prediction using a baggage weight prediction system, according to an example embodiment of the present disclosure.

FIG. 12 illustrates a pictorial representation 1200 for a bivariate data analysis in a scatter plot format amongst a carry-on baggage weight 248 and an exemplary factor from a plurality of passenger attributes 210 associated with a passenger for baggage weight prediction using the baggage weight prediction system 110, according to an example embodiment of the present disclosure. Any of the components of the system 110 may be referred to herein. The plurality of passenger attributes 210 considered by the pictorial representation 1200 may be a passenger age as indicated by a passenger data of birth mapped with the carry-on baggage weight 248 from the baggage weight index 226. The pictorial representation 1200 may indicate values for the carry-on baggage weight 248 that may be associated with the passenger age. For example, the pictorial representation 1200 may facilitate determination of the carry-on baggage weight 248 for a particular age group passenger.

Figure 13:
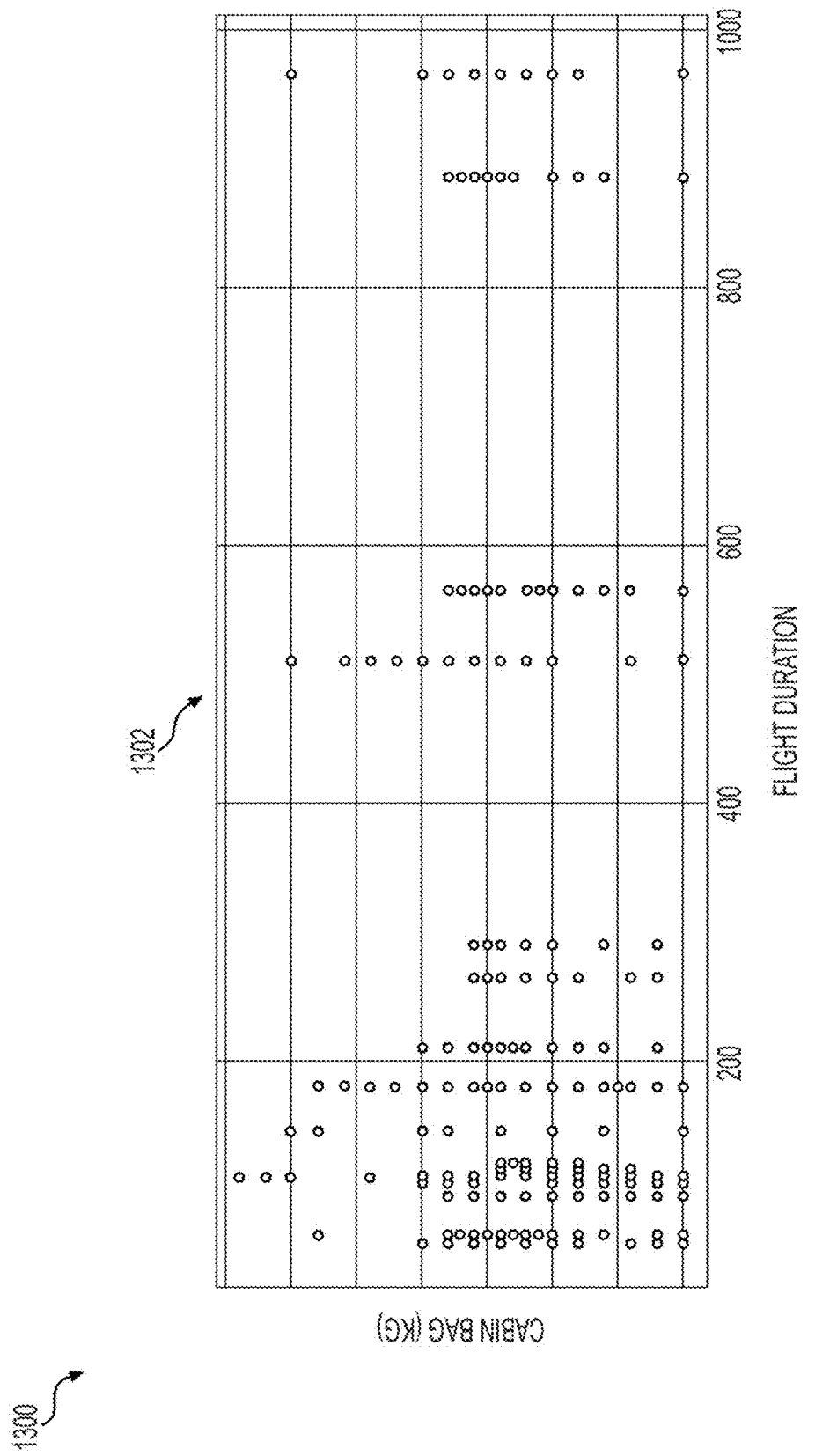
FIG. 13 illustrates a pictorial representation for a bivariate data analysis amongst a carry-on baggage weight and an exemplary factor from a plurality of passenger attributes associated with a passenger for baggage weight prediction using a baggage weight prediction system, according to an example embodiment of the present disclosure.

FIG. 13 illustrates a pictorial representation 1300 for a bivariate data analysis amongst a carry-on baggage weight 248 and an exemplary factor from a plurality of passenger attributes 210 associated with a passenger for baggage weight prediction using the baggage weight prediction system 110, according to an example embodiment of the present disclosure. Any of the components of the system 110 may be referred to herein. The plurality of passenger attributes 210 considered by the pictorial representation 1300 may be a travel duration such as a flight duration mapped with the carry-on baggage weight 248 from the baggage weight index 226. The pictorial representation 1300 may indicate values for the carry-on baggage weight 248 that may be associated with the travel duration. For example, the pictorial representation 1300 may facilitate determination of the carry-on baggage weight 248 for a particular travel duration such as a short haul travel. a medium haul travel, and a long haul travel.

Figure 14:
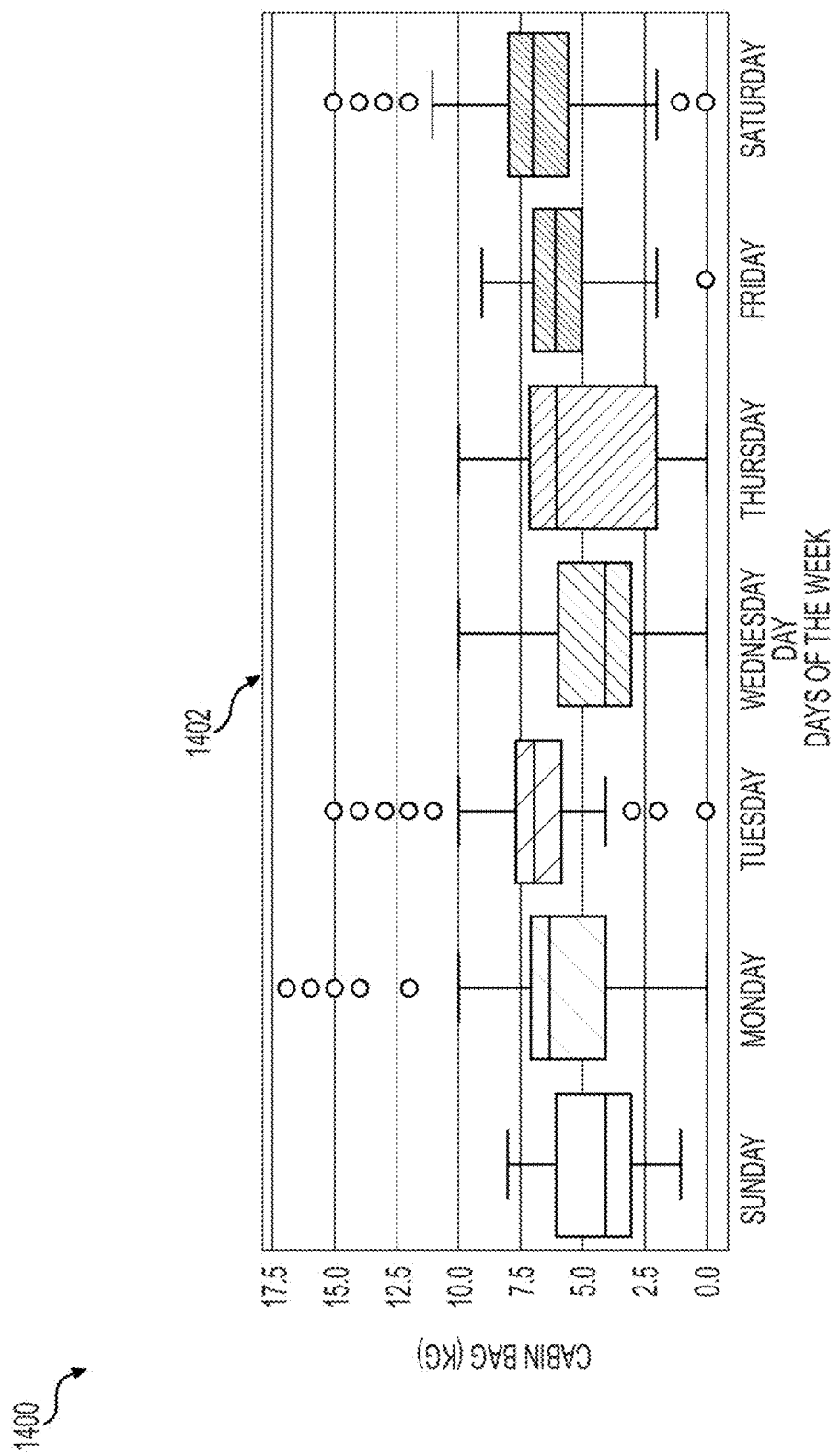
FIG. 14 illustrates a pictorial representation for a boxplot based bivariate data analysis amongst a carry-on baggage weight and an exemplary factor from a plurality of passenger attributes associated with a passenger for baggage weight prediction using a baggage weight prediction system, according to an example embodiment of the present disclosure.

FIG. 14 illustrates a pictorial representation 1400 for a boxplot based bivariate data analysis amongst a carry-on baggage weight 248 and an exemplary factor from a plurality of passenger attributes 210 associated with a passenger for baggage weight prediction using the baggage weight prediction system 110, according to an example embodiment of the present disclosure. Any of the components of the system 110 may be referred to herein. The plurality of passenger attributes 210 considered by the pictorial representation 1400 may be days of a week mapped with the carry-on baggage weight 248 from the baggage weight index 226. The pictorial representation 1400 may indicate values for the carry-on baggage weight 248 that may be associated with the passenger age. For example, the pictorial representation 1400 may facilitate determination of the carry-on baggage weight 248 for a particular day from a week.

Figure 15:
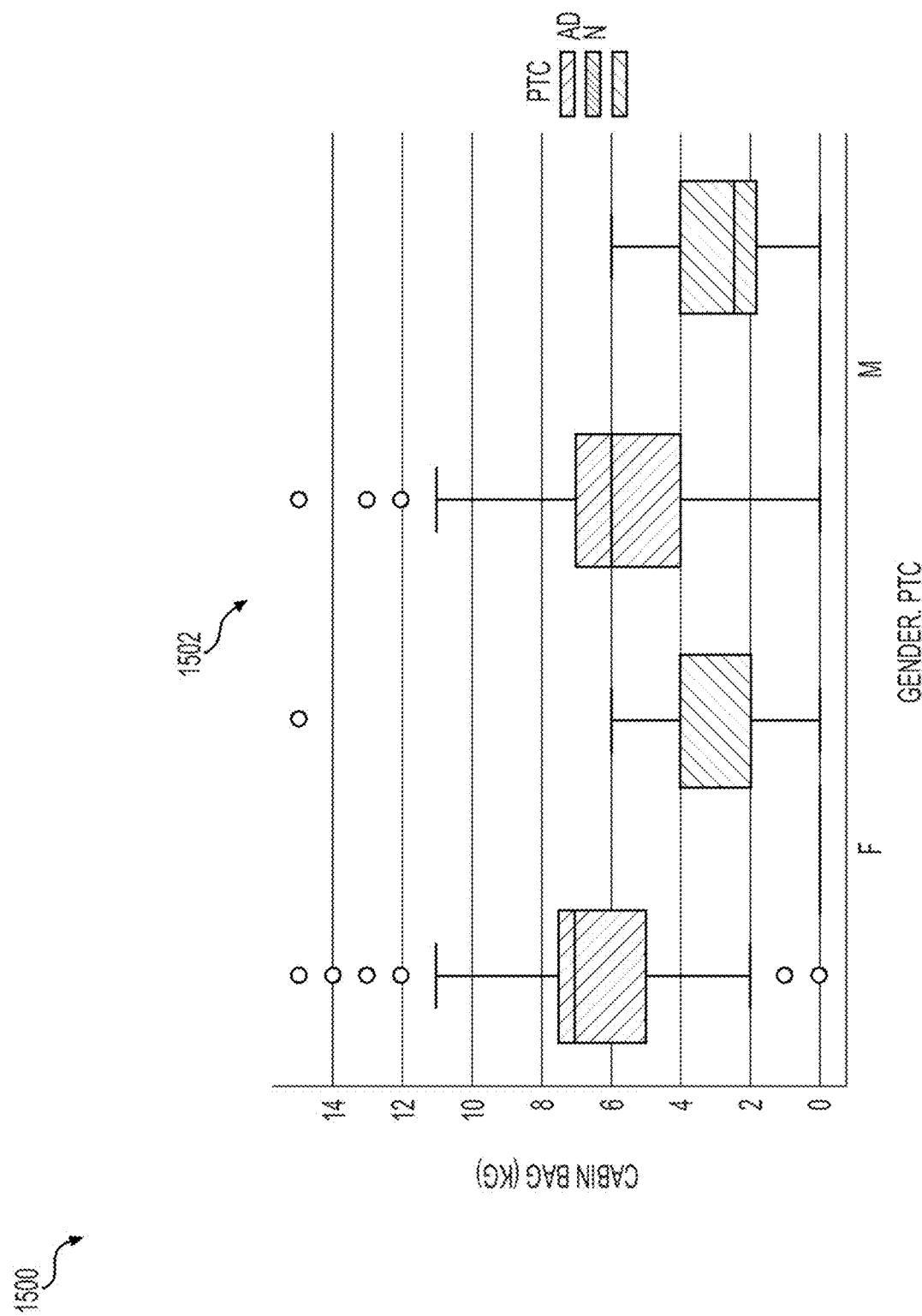
FIG. 15 illustrates a pictorial representation for a multivariate data analysis amongst a carry-on baggage weight and exemplary factors from a plurality of passenger attributes associated with a passenger for baggage weight prediction using a baggage weight prediction system, according to an example embodiment of the present disclosure.

FIG. 15 illustrates a pictorial representation 1500 for a multivariate data analysis amongst a carry-on baggage weight 248 and exemplary factors from a plurality of passenger attributes 210 associated with a passenger for baggage weight prediction using the baggage weight prediction system 110, according to an example embodiment of the present disclosure. Any of the components of the system 110 may be referred to herein. The multivariate data analysis may refer to mapping more than one passenger attribute from the plurality of passenger attributes 210 with the carry-on baggage weight 248 from the baggage weight index 226. The plurality of passenger attributes 210 considered by the pictorial representation 1500 may be gender of a passenger and a passenger type code (PTC) for each passenger mapped with the carry-on baggage weight 248 from the baggage weight index 226. The PTC codes may be used to indicate if a passenger may be an adult, an infant with a seat allotted, an infant without a seat allotted, a child, an unaccompanied child, and the like. The pictorial representation 1500 may indicate values for the carry-on baggage weight 248 that may be associated with the gender of the passenger and the PTC. For example, the pictorial representation 1500 may facilitate determination of the carry-on baggage weight 248 for a particular day from a week. The multivariate analysis may facilitate in identification of outlier data.

Figure 16:
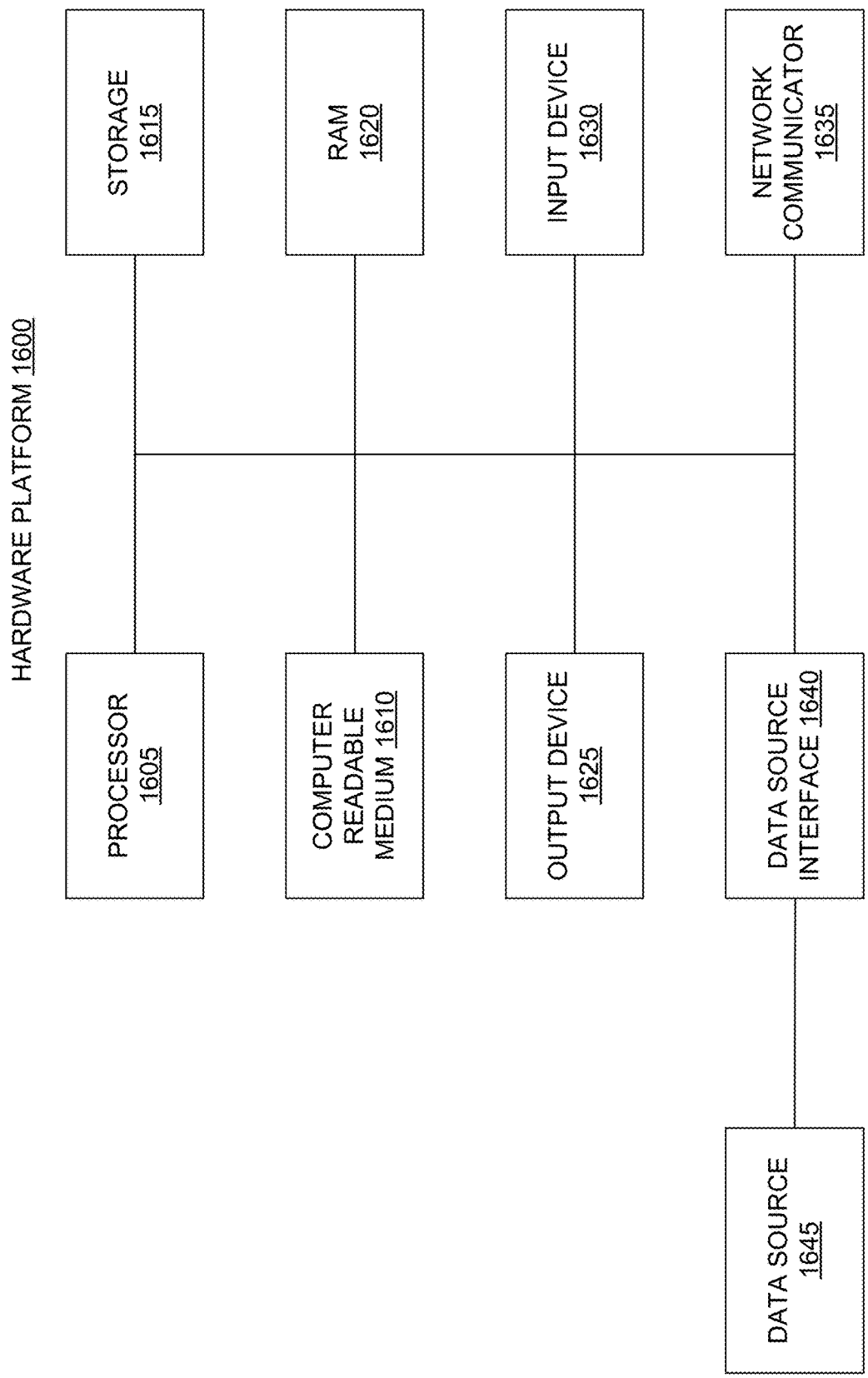
FIG. 16 illustrates a hardware platform for the implementation of a baggage weight prediction system, according to an example embodiment of the present disclosure.
Figure 17A:
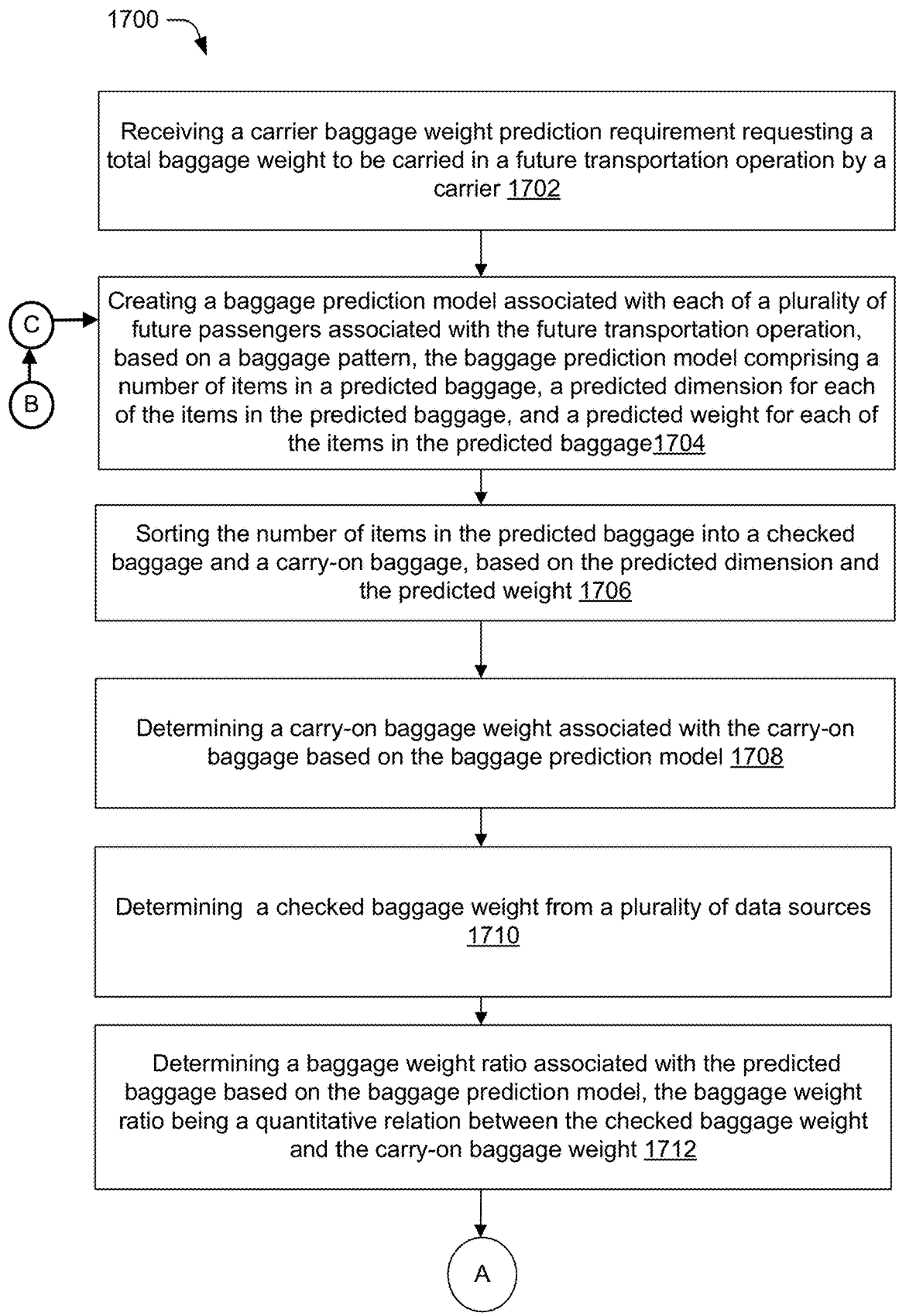
FIGS. 17A, 17B, 17C, and 17D illustrate a process flowchart for baggage weight prediction using a baggage weight prediction system, according to an example embodiment of the present disclosure.
Figure 17B:
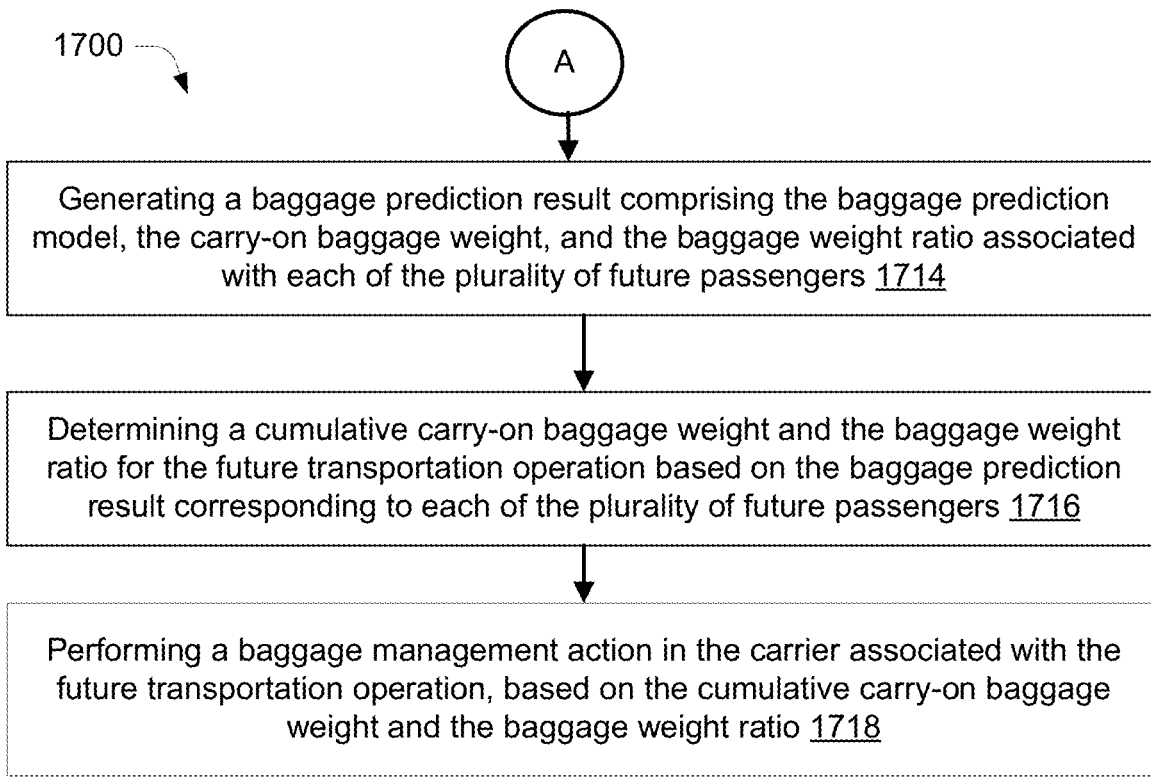
Figure 17C:
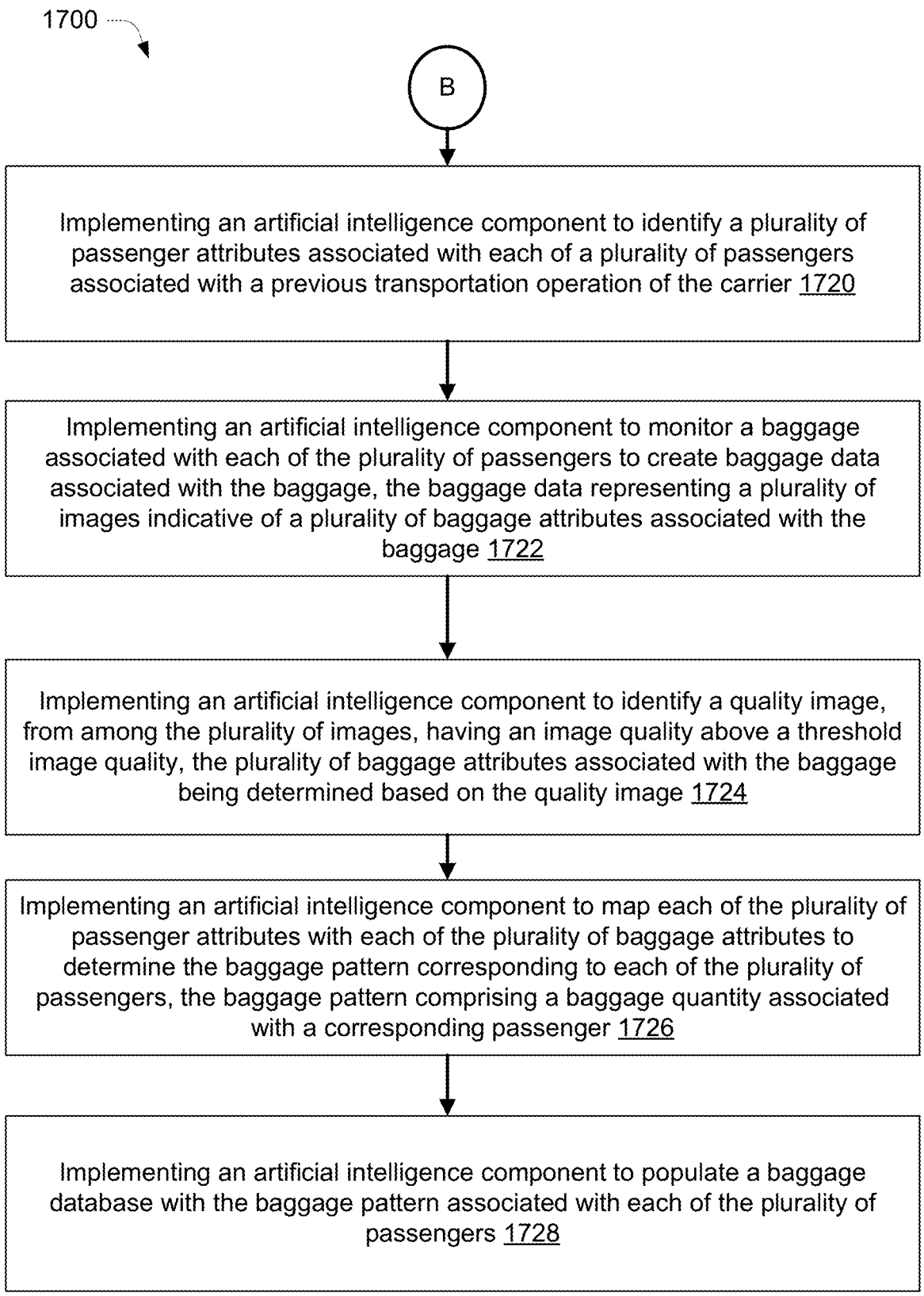
Figure 17D:
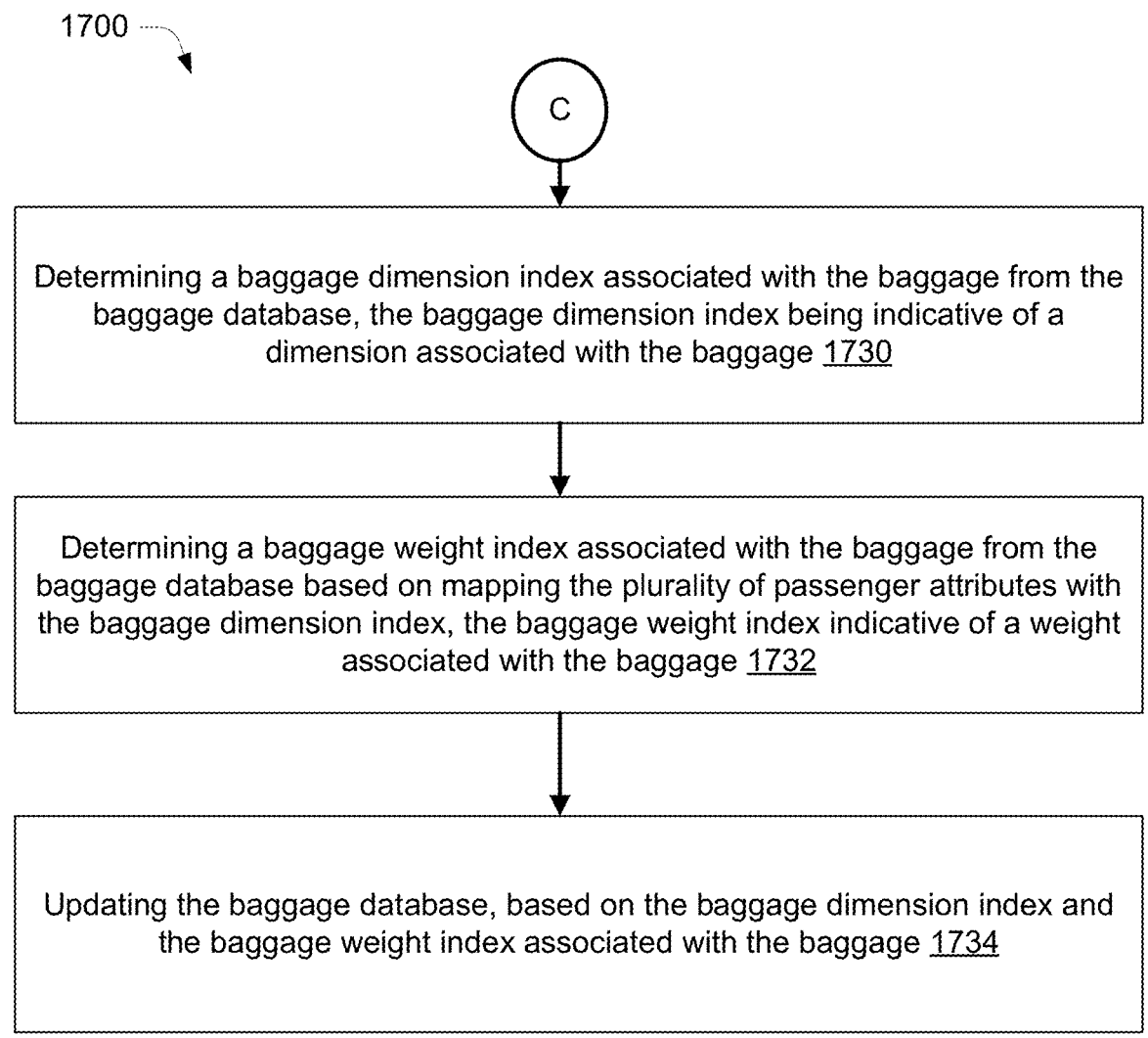

FIG. 16 illustrates a hardware platform 1600 for implementation of the system 110, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1600. The hardware platform 1600 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 16, the hardware platform 1600 may be a computer system 1600 that may be used with the examples described herein. The computer system 1600 may represent a computational platform that includes components that may be in a server or another computer system. The computer system 1600 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1600 may include a processor 1605 that executes software instructions or code stored on a non-transitory computer-readable storage medium 1610 to perform methods of the present disclosure. The software code includes, for example, instructions to gather data and documents and analyze documents. In an example, the data collector 130, the data analyzer 140, and the modeler 150 may be software codes or components performing these steps.

The instructions on the computer-readable storage medium 1610 are read and stored the instructions in storage 1616 or in random access memory (RAM) 1620. The storage 1616 provides a large space for keeping static data where at least some instructions could be stored for later execution. The stored instructions may be further compiled to generate other representations of the instructions and dynamically stored in the RAM 1620. The processor 1605 reads instructions from the RAM 1620 and performs actions as instructed.

The computer system 1600 further includes an output device 1625 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1600 further includes input device 1630 to provide a user or another device with mechanisms for entering data and/or otherwise interact with the computer system 1600. The input device may include, for example, a keyboard, a keypad, a mouse, or a touchscreen. Each of these output devices 1625 and input devices 1630 could be joined by one or more additional peripherals. In an example, the output device 1625 may be used to display the results of the carrier baggage weight prediction requirement 230.

A network communicator 1635 may be provided to connect the computer system 1600 to a network and in turn to other devices connected to the network including other clients, servers, data stores, and interfaces, for instance. A network communicator 1635 may include, for example, a network adapter such as a LAN adapter or a wireless adapter. The computer system 1600 includes a data source interface 1640 to access data source 1645. A data source is an information resource. As an example, a database of exceptions and rules may be a data source. Moreover, knowledge repositories and curated data may be other examples of data sources.

FIGS. 17A, 17B, 17C, and 17D illustrate a process flowchart for baggage weight prediction using the baggage weight prediction system 110, according to an example embodiment of the present disclosure. It should be understood that method steps are shown here for reference only and other combinations of the steps may be possible. Further, the method 1700 may contain some steps in addition to the steps shown in FIGS. 17A, 17B, 17C, and 17D. For the sake of brevity, construction, and operational features of the system 110 which are explained in detail in the description of FIGS. 1-16 are not explained in detail in the description of FIGS. 17A, 17B, 17C, and 17D. The method 1700 may be performed by a component of the system 110.

At block 1702, the carrier baggage weight prediction requirement 230 may be received requesting a total baggage weight to be carried in a future transportation operation by a carrier.

At block 1704, the baggage prediction model 232 may be created associated with each of a plurality of future passengers 240 associated with the future transportation operation, based on a baggage pattern 218. The baggage prediction model 232 may comprise a number of items in a predicted baggage 234 and a predicted weight 244 for each of the items in the predicted baggage 234.

At block 1706, the number of items in the predicted baggage 234 may be sorted into a checked baggage 238 and a carry-on baggage 236, based on the predicted weight 244.

At block 1708, the carry-on baggage weight 248 may be determined associated with the carry-on baggage 236 based on the baggage prediction model 232.

At block 1710, the checked baggage weight may be determined from a plurality of data sources.

At block 1712, the baggage weight ratio 246 may be determined associated with the predicted baggage 234 based on the baggage prediction model 232. The baggage weight ratio 246 may be a quantitative relation between the checked baggage weight and the carry-on baggage weight 248.

At block 1714, the baggage prediction result 250 may be generated comprising the baggage prediction model 232, the carry-on baggage weight 248, and the baggage weight ratio 246 associated with each of the plurality of future passengers 240.

At block 1716, the cumulative carry-on baggage weight 248 and the baggage weight ratio 246 may be determined for the future transportation operation based on the baggage prediction result 250 corresponding to each of the plurality of future passengers 240.

At block 1718, a baggage management action may be performed in the carrier associated with the future transportation operation, based on the cumulative carry-on baggage weight 248 and the baggage weight ratio 246.

At block 1720, the artificial intelligence component 202 may be implemented to identify a plurality of passenger attributes 210 associated with each of a plurality of passengers 208 associated with a previous transportation operation of the carrier.

At block 1722, the artificial intelligence component 202 may be implemented to monitor a baggage associated with each of the plurality of passengers 208 to create baggage data 252 associated with the baggage. The baggage data 252 may represent a plurality of images 216 indicative of a plurality of baggage attributes 214 associated with the baggage.

At block 1724, the artificial intelligence component 202 may be implemented to identify a quality image, from among the plurality of images 216, having an image quality above a threshold image quality. The plurality of baggage attributes 214 associated with the baggage may be determined based on the quality image.

At block 1726, the artificial intelligence component 202 may be implemented to map each of the plurality of passenger attributes 210 with each of the plurality of baggage attributes 214 to determine the baggage pattern 218 corresponding to each of the plurality of passengers 208. The baggage pattern 218 may comprise a baggage quantity associated with a corresponding passenger.

At block 1728, the artificial intelligence component 202 may be implemented to populate a baggage database 220 with the baggage pattern 218 associated with each of the plurality of passengers 208.

At block 1730, the baggage dimension index 222 may be determined associated with the baggage from the baggage database 220. The baggage dimension index 222 may be indicative of a dimension associated with the baggage.

At block 1732, the baggage weight index 226 may be determined associated with the baggage from the baggage database 220 based on mapping the plurality of passenger attributes 210 with the baggage dimension index 222. The baggage weight index 226 may be indicative of a weight associated with the baggage.

At block 1734, the baggage database 220 may be updated based on the baggage dimension index 222 and the baggage weight index 226 associated with the baggage.

In accordance with various embodiments of the present disclosure, the method 1700 may further comprise implementing a passenger facial recognition, a passenger gender detection, and a passenger outerwear detection to identify the plurality of passenger attributes 210 associated with each of the plurality of passengers 208. The method 1700 may further comprise the allocation of the items in the predicted baggage 234 in one of the carry-on baggage space and the checked baggage space, based on the cumulative carry-on baggage weight 248 and the baggage weight ratio 246.

The method 1700 may further comprise identifying a depth parameter value indicative of a distance between each of the plurality of passengers 208 and a motion-sensing device. The depth parameter value may be determined based on a video feed based medium. The method 1700 may include differentiating amongst the plurality of passengers 208 based on the depth parameter value. In accordance with various embodiments of the present disclosure, the method 1700 may include extracting, by the processor, a frame from the video feed based medium. The method 1700 may include performing by the processor, a noise reduction technique on the extracted frame to identify the depth parameter value.

In an example, the method 1700 may be practiced using a non-transitory computer-readable medium. In an example, the method 1700 may be computer-implemented.

The present disclosure provides for the baggage weight prediction system 110 that may generate key insights related to baggage weight prediction with minimal human intervention. Furthermore, the present disclosure may categorically analyze various parameters that may have an impact on deciding potential baggage weight for a future transportation operation.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a modeler coupled to the processor, the modeler to:
   receive a carrier baggage weight prediction requirement requesting a total baggage weight to be carried in a future transportation operation by a carrier;
   create a baggage prediction model associated with each of a plurality of future passengers associated with the future transportation operation, based on a baggage pattern, the baggage prediction model comprising a number of items in a predicted baggage and a predicted weight for each of the items in the predicted baggage;
   sort the number of items in the predicted baggage into a checked baggage and a carry-on baggage, based on the predicted weight;
   determine a carry-on baggage weight associated with the carry-on baggage based on the baggage prediction model;
   determine a checked baggage weight from a plurality of data sources;
   determine a baggage weight ratio associated with the predicted baggage based on the baggage prediction model, the baggage weight ratio being a quantitative relation between the checked baggage weight and the carry-on baggage weight;
   generate a baggage prediction result comprising the baggage prediction model, the carry-on baggage weight, and the baggage weight ratio associated with each of the plurality of future passengers;
   determine a cumulative carry-on baggage weight and the baggage weight ratio for the future transportation operation based on the baggage prediction result corresponding to each of the plurality of future passengers; and
   perform a baggage management action in the carrier associated with the future transportation operation, based on the cumulative carry-on baggage weight and the baggage weight ratio.

2. The system as claimed in claim 1, wherein the system further includes a data collector coupled to the processor to generate the baggage pattern, the data collector to implement an artificial intelligence component to:
   identify a plurality of passenger attributes associated with each of a plurality of passengers associated with a previous transportation operation of the carrier;
   monitor a baggage associated with each of the plurality of passengers to create baggage data associated with the baggage, the baggage data representing a plurality of images indicative of a plurality of baggage attributes associated with the baggage;
   identify a quality image, from among the plurality of images, having an image quality above a threshold image quality, the plurality of baggage attributes associated with the baggage being determined based on the quality image;
   map each of the plurality of passenger attributes with each of the plurality of baggage attributes to determine the baggage pattern corresponding to each of the plurality of passengers, the baggage pattern comprising a baggage quantity associated with a corresponding passenger; and
   populate a baggage database with the baggage pattern associated with each of the plurality of passengers.

3. The system as claimed in claim 2, wherein the system further includes a data analyzer coupled to the processor, the data analyzer to:
   determine a baggage dimension index associated with the baggage from the baggage database, the baggage dimension index being indicative of a dimension associated with the baggage;
   determine a baggage weight index associated with the baggage from the baggage database based on mapping the plurality of passenger attributes with the baggage dimension index, the baggage weight index indicative of a weight associated with the baggage; and
   update the baggage database, based on the baggage dimension index and the baggage weight index associated with the baggage.

4. The system as claimed in claim 2, wherein the data collector implements a passenger facial recognition, a passenger gender detection, and a passenger outerwear detection to identify the plurality of passenger attributes associated with each of the plurality of passengers.

5. The system as claimed in claim 2, wherein the data collector is to:
   identify a depth parameter value indicative of a distance between each of the plurality of passengers and a motion sensing device, the depth parameter value being determined based on a video feed based medium; and
   differentiate amongst the plurality of passengers based on the depth parameter value.

6. The system as claimed in claim 5, wherein the data collector is to:
   extract a frame from the video feed based medium; and
   perform a noise reduction technique on the extracted frame to identify the depth parameter value.

7. The system as claimed in claim 1, wherein the baggage management action comprises allocation of the items in the predicted baggage in one of a carry-on baggage space and a checked baggage space of the carrier, based on the cumulative carry-on baggage weight and the baggage weight ratio.

8. A method comprising:
   receiving, by a processor, a carrier baggage weight prediction requirement requesting a total baggage weight to be carried in a future transportation operation by a carrier;
   creating, by the processor, a baggage prediction model associated with each of a plurality of future passengers associated with the future transportation operation, based on a baggage pattern, the baggage prediction model comprising a number of items in a predicted baggage and a predicted weight for each of the items in the predicted baggage;
   sorting, by the processor, the number of items in the predicted baggage into a checked baggage and a carry-on baggage, based on the predicted weight;

determining, by the processor, a carry-on baggage weight associated with the carry-on baggage based on the baggage prediction model;

determining, by the processor, a checked baggage weight from a plurality of data sources;

determining, by the processor, a baggage weight ratio associated with the predicted baggage based on the baggage prediction model, the baggage weight ratio being a quantitative relation between the checked baggage weight and the carry-on baggage weight;

generating, by the processor, a baggage prediction result comprising the baggage prediction model, the carry-on baggage weight, and the baggage weight ratio associated with each of the plurality of future passengers;

determining, by the processor, a cumulative carry-on baggage weight and the baggage weight ratio for the future transportation operation based on the baggage prediction result corresponding to each of the plurality of future passengers; and performing a baggage management action in the carrier associated with the future transportation operation, based on the cumulative carry-on baggage weight and the baggage weight ratio.

9. The method as claimed in claim 8, wherein the method further comprise generating the baggage pattern, the method to include implementing, by the processor, an artificial intelligence component to:

identify a plurality of passenger attributes associated with each of a plurality of passengers associated with a previous transportation operation of the carrier;

monitor a baggage associated with each of the plurality of passengers to create baggage data associated with the baggage, the baggage data representing a plurality of images indicative of a plurality of baggage attributes associated with the baggage;

identify a quality image, from among the plurality of images, having an image quality above a threshold image quality, the plurality of baggage attributes associated with the baggage being determined based on the quality image;

map each of the plurality of passenger attributes with each of the plurality of baggage attributes to determine the baggage pattern corresponding to each of the plurality of passengers, the baggage pattern comprising a baggage quantity associated with a corresponding passenger; and populate a baggage database with the baggage pattern associated with each of the plurality of passengers.

10. The method as claimed in claim 9, wherein the method further comprise:

determining, by the processor, a baggage dimension index associated with the baggage from the baggage database, the baggage dimension index being indicative of a dimension associated with the baggage;

determining, by the processor, a baggage weight index associated with the baggage from the baggage database based on mapping the plurality of passenger attributes with the baggage dimension index, the baggage weight index indicative of a weight associated with the baggage; and updating, by the processor, the baggage database, based on the baggage dimension index and the baggage weight index associated with the baggage.

11. The method as claimed in claim 9, wherein the method further comprise implementing, by the processor, a passenger facial recognition, a passenger gender detection, and a passenger outerwear detection to identify the plurality of passenger attributes associated with each of the plurality of passengers.

12. The method as claimed in claim 9, wherein the method further comprise:

identifying, by the processor, a depth parameter value indicative of a distance between each of the plurality of passengers and a motion sensing device, the depth parameter value being determined based on a video feed based medium; and differentiating, by the processor, amongst the plurality of passengers based on the depth parameter value.

13. The method as claimed in claim 12, wherein the method further comprise:

extracting, by the processor, a frame from the video feed based medium; and performing by the processor, a noise reduction technique on the extracted frame to identify the depth parameter value.

14. The method as claimed in claim 8, wherein the method further comprise allocating of the items, by the processor, in the predicted baggage in one of a carry-on baggage space and a checked baggage space, based on the cumulative carry-on baggage weight and the baggage weight ratio.

15. A non-transitory computer readable medium including machine readable instructions that are executable by a processor to:

receive a carrier baggage weight prediction requirement requesting a total baggage weight to be carried in a future transportation operation by a carrier;

create a baggage prediction model associated with each of a plurality of future passengers associated with the future transportation operation, based on a baggage pattern, the baggage prediction model comprising a number of items in a predicted baggage and a predicted weight for each of the items in the predicted baggage;

sort the number of items in the predicted baggage into a checked baggage and a carry-on baggage, based on the predicted weight;

determine a carry-on baggage weight associated with the carry-on baggage based on the baggage prediction model;

determine a checked baggage weight from a plurality of data sources;

determine a baggage weight ratio associated with the predicted baggage based on the baggage prediction model, the baggage weight ratio being a quantitative relation between the checked baggage weight and the carry-on baggage weight;

generate a baggage prediction result comprising the baggage prediction model, the carry-on baggage weight, and the baggage weight ratio associated with each of the plurality of future passengers;

determine a cumulative carry-on baggage weight and the baggage weight ratio for the future transportation operation based on the baggage prediction result corresponding to each of the plurality of future passengers; and perform a baggage management action in the carrier associated with the future transportation operation, based on the cumulative carry-on baggage weight and the baggage weight ratio.

16. The non-transitory computer-readable medium of claim 15, wherein the processor is to generate the baggage pattern, the processor is to implement an artificial intelligence component to:

identify a plurality of passenger attributes associated with each of a plurality of passengers associated with a previous transportation operation of the carrier;

monitor a baggage associated with each of the plurality of passengers to create baggage data associated with the baggage, the baggage data representing a plurality of images indicative of a plurality of baggage attributes associated with the baggage;

identify a quality image, from among the plurality of images, having an image quality above a threshold image quality, the plurality of baggage attributes associated with the baggage being determined based on the quality image;

map each of the plurality of passenger attributes with each of the plurality of baggage attributes to determine the baggage pattern corresponding to each of the plurality of passengers, the baggage pattern comprising a baggage quantity associated with a corresponding passenger; and populate a baggage database with the baggage pattern associated with each of the plurality of passengers.

17. The non-transitory computer-readable medium of claim 16, wherein the processor is to:

determine a baggage dimension index associated with the baggage from the baggage database, the baggage dimension index being indicative of a dimension associated with the baggage;

determine a baggage weight index associated with the baggage from the baggage database based on mapping the plurality of passenger attributes with the baggage dimension index, the baggage weight index indicative of a weight associated with the baggage; and update the baggage database, based on the baggage dimension index and the baggage weight index associated with the baggage.

18. The non-transitory computer-readable medium of claim 16, wherein the processor is to implement a passenger facial recognition, a passenger gender detection, and a passenger outerwear detection to identify the plurality of passenger attributes associated with each of the plurality of passengers.

19. The non-transitory computer-readable medium of claim 15, wherein the processor is to:

identify a depth parameter value indicative of a distance between each of the plurality of passengers and a motion sensing device, the depth parameter value being determined based on a video feed based medium; and differentiate amongst the plurality of passengers based on the depth parameter value.

20. The non-transitory computer-readable medium of claim 15, wherein the processor is to allocate of the items in the predicted baggage in one of a carry-on baggage space and a checked baggage space, based on the cumulative carry-on baggage weight and the baggage weight ratio.

* * * * *